US007797367B1

(12) United States Patent
Gelvin et al.

(10) Patent No.: US 7,797,367 B1
(45) Date of Patent: Sep. 14, 2010

(54) APPARATUS FOR COMPACT INTERNETWORKED WIRELESS INTEGRATED NETWORK SENSORS (WINS)

(76) Inventors: David C. Gelvin, 2320 Willow Brook Rd., Escondido, CA (US) 92029; Lewis D. Girod, 4049 Cumberland Ave., Los Angeles, CA (US) 90027; William J. Kaiser, 15520 Casiano Ct., Los Angeles, CA (US) 90077; William M. Merrill, 11160 Westminster Ave. #2, Los Angeles, CA (US) 90077; Fredric Newberg, 11944 Avenida Sivrita, San Diego, CA (US) 92128; Gregory J. Pottie, 12548 Brooklake St., Los Angeles, CA (US) 90066; Anton I. Sipos, 3516 Sawtelle Blvd. #221, Los Angeles, CA (US) 90066; Sandeep Vardhan, 320 Woodruff Dr., Walnut, CA (US) 91789

( * ) Notice: Subject to any disclaimer, the term of this patent is extended or adjusted under 35 U.S.C. 154(b) by 2479 days.

(21) Appl. No.: 09/684,387

(22) Filed: Oct. 4, 2000

Related U.S. Application Data

(60) Provisional application No. 60/158,013, filed on Oct. 6, 1999, provisional application No. 60/170,865, filed on Dec. 15, 1999, provisional application No. 60/208,397, filed on May 30, 2000, provisional application No. 60/210,296, filed on Jun. 8, 2000.

(51) Int. Cl.
*G06F 15/16* (2006.01)
(52) U.S. Cl. ..................................... 709/200
(58) Field of Classification Search ................. 340/539, 340/870; 709/200, 201, 203, 208, 224
See application file for complete search history.

(56) References Cited

U.S. PATENT DOCUMENTS 4,187,492 A * 2/1980 Delignieres ................ 367/127

(Continued)

FOREIGN PATENT DOCUMENTS

CA 2245963 2/2000

(Continued)

OTHER PUBLICATIONS

K. Sohrabi, J. Gao, V. Ailawadhi, G. Pottie, "A Self-Organizing Wireless Sensor Network," Proc. 37th Allerton Conf. On Comm., Control, and Computing, Monticello, IL, Sep. 1999.

(Continued)

*Primary Examiner*—John Follansbee
*Assistant Examiner*—Imad Hussain
(74) *Attorney, Agent, or Firm*—McDonnell Boehnen Hulbert & Berghoff LLP

(57) ABSTRACT

The Wireless Integrated Network Sensor Next Generation (WINS NG) nodes provide distributed network and Internet access to sensors, controls, and processors that are deeply embedded in equipment, facilities, and the environment. The WINS NG network is a new monitoring and control capability for applications in transportation, manufacturing, health care, environmental monitoring, and safety and security. The WINS NG nodes combine microsensor technology, low power distributed signal processing, low power computation, and low power, low cost wireless and/or wired networking capability in a compact system. The WINS NG networks provide sensing, local control, remote reconfigurability, and embedded intelligent systems in structures, materials, and environments.

49 Claims, 50 Drawing Sheets

U.S. PATENT DOCUMENTS

| | | | |
|---|---|---|---|
| 4,406,016 A | 9/1983 | Abrams et al. | 455/19 |
| 4,494,121 A * | 1/1985 | Walter et al. | 343/708 |
| 4,520,674 A | 6/1985 | Canada et al. | 73/660 |
| 4,642,639 A * | 2/1987 | Nelson | 342/47 |
| 4,649,524 A | 3/1987 | Vance | 367/13 |
| 4,812,820 A | 3/1989 | Chatwin | 340/518 |
| 4,855,713 A | 8/1989 | Brunius | 340/506 |
| 4,862,422 A * | 8/1989 | Brac | 367/19 |
| 4,928,246 A | 5/1990 | Crawley et al. | |
| 4,951,029 A | 8/1990 | Severson | 340/506 |
| 4,962,473 A | 10/1990 | Crain | |
| 5,095,531 A * | 3/1992 | Ito | 455/435.3 |
| 5,184,311 A | 2/1993 | Kraus et al. | |
| 5,203,199 A * | 4/1993 | Henderson et al. | 73/865.3 |
| 5,206,806 A * | 4/1993 | Gerardi et al. | 361/679 |
| 5,241,542 A | 8/1993 | Natarajan et al. | 370/95.3 |
| 5,247,564 A | 9/1993 | Zicker | 379/40 |
| 5,295,154 A | 3/1994 | Meier et al. | 375/1 |
| 5,369,584 A | 11/1994 | Kajiwara | |
| 5,420,825 A * | 5/1995 | Fischer et al. | 367/1 |
| 5,428,636 A | 6/1995 | Meier | 375/202 |
| 5,475,687 A | 12/1995 | Markkula, Jr. et al. | 370/85.1 |
| 5,479,932 A * | 1/1996 | Higgins et al. | 600/529 |
| 5,483,827 A * | 1/1996 | Kulka et al. | 73/146.5 |
| 5,534,697 A | 7/1996 | Creekmore et al. | |
| 5,535,380 A | 7/1996 | Bergkvist, Jr. et al. | |
| 5,553,076 A | 9/1996 | Behtash et al. | 370/95.3 |
| 5,563,948 A | 10/1996 | Diehl et al. | |
| 5,615,175 A * | 3/1997 | Carter et al. | 367/124 |
| 5,617,371 A * | 4/1997 | Williams | 367/13 |
| 5,659,195 A | 8/1997 | Kaiser et al. | 257/415 |
| 5,682,142 A * | 10/1997 | Loosmore et al. | 340/572.1 |
| 5,701,120 A | 12/1997 | Perelman et al. | |
| 5,726,911 A | 3/1998 | Canada et al. | 364/550 |
| 5,732,074 A | 3/1998 | Spaur et al. | 370/313 |
| 5,734,699 A | 3/1998 | Lu et al. | |
| 5,737,529 A | 4/1998 | Dolin, Jr. et al. | |
| 5,742,829 A * | 4/1998 | Davis et al. | 717/178 |
| 5,745,758 A | 4/1998 | Shaw et al. | |
| 5,745,759 A | 4/1998 | Hayden et al. | |
| 5,760,530 A | 6/1998 | Kolesar | |
| 5,794,164 A | 8/1998 | Beckert et al. | |
| 5,852,232 A * | 12/1998 | Samsavar et al. | 73/105 |
| 5,852,351 A | 12/1998 | Canada et al. | 318/490 |
| 5,854,994 A | 12/1998 | Canada et al. | 702/56 |
| 5,864,323 A * | 1/1999 | Berthon | 343/788 |
| 5,889,477 A | 3/1999 | Fastenrath | |
| 5,907,491 A | 5/1999 | Canada et al. | 364/468.15 |
| 5,937,163 A | 8/1999 | Lee et al. | |
| 5,946,083 A | 8/1999 | Melendez et al. | |
| 5,946,488 A | 8/1999 | Tanguay et al. | |
| 5,959,529 A | 9/1999 | Kail, IV | |
| 5,973,309 A | 10/1999 | Livingston | |
| 5,978,578 A | 11/1999 | Azarya et al. | |
| 5,987,552 A | 11/1999 | Chittor et al. | |
| 5,991,806 A | 11/1999 | McHann, Jr. | |
| 6,009,363 A | 12/1999 | Beckert et al. | |
| 6,011,787 A * | 1/2000 | Nakano et al. | 370/335 |
| 6,014,406 A * | 1/2000 | Shida et al. | 375/133 |
| 6,023,223 A | 2/2000 | Baxter, Jr. | |
| 6,028,537 A | 2/2000 | Suman et al. | |
| 6,028,857 A | 2/2000 | Poor | 370/351 |
| 6,038,436 A | 3/2000 | Priest | |
| 6,048,276 A * | 4/2000 | Vandergrift | 473/316 |
| 6,061,021 A * | 5/2000 | Zibell | 342/418 |
| 6,078,269 A | 6/2000 | Markwell et al. | 340/825.5 |
| 6,114,970 A | 9/2000 | Kirson et al. | |
| 6,140,957 A | 10/2000 | Wilson et al. | |
| 6,144,905 A | 11/2000 | Gannon | |
| 6,145,082 A | 11/2000 | Gannon et al. | |
| 6,175,789 B1 | 1/2001 | Beckert et al. | |
| 6,175,868 B1 | 1/2001 | Lavian et al. | |
| 6,181,994 B1 | 1/2001 | Colson et al. | |
| 6,184,798 B1 | 2/2001 | Egri | |
| 6,185,491 B1 | 2/2001 | Gray et al. | |
| 6,202,008 B1 | 3/2001 | Beckert et al. | |
| 6,208,247 B1 | 3/2001 | Agre et al. | 340/539 |
| 6,225,901 B1 * | 5/2001 | Kail, IV | 340/539.11 |
| 6,233,610 B1 * | 5/2001 | Hayball et al. | 709/223 |
| 6,236,365 B1 * | 5/2001 | LeBlanc et al. | 342/457 |
| 6,246,688 B1 | 6/2001 | Angwin et al. | |
| 6,246,935 B1 | 6/2001 | Buckley | |
| 6,249,252 B1 * | 6/2001 | Dupray | 342/450 |
| 6,252,544 B1 | 6/2001 | Hoffberg et al. | |
| 6,255,942 B1 * | 7/2001 | Knudsen | 340/506 |
| 6,285,899 B1 * | 9/2001 | Ghaem et al. | 600/391 |
| 6,298,445 B1 | 10/2001 | Shostrack et al. | |
| 6,307,751 B1 * | 10/2001 | Bodony et al. | 361/749 |
| 6,324,650 B1 | 11/2001 | Ogilvie | |
| 6,327,607 B1 | 12/2001 | Fant | |
| 6,330,499 B1 | 12/2001 | Chou et al. | |
| 6,341,288 B1 | 1/2002 | Yach et al. | |
| 6,343,218 B1 * | 1/2002 | Kaneda et al. | 455/522 |
| 6,351,776 B1 | 2/2002 | O'Brien et al. | |
| 6,389,483 B1 | 5/2002 | Larsson | |
| 6,392,692 B1 | 5/2002 | Monroe | |
| 6,400,953 B1 * | 6/2002 | Furukawa | 455/442 |
| 6,414,955 B1 * | 7/2002 | Clare et al. | 370/390 |
| 6,425,004 B1 | 7/2002 | Hardjono | |
| 6,430,164 B1 | 8/2002 | Jones et al. | |
| 6,437,692 B1 * | 8/2002 | Petite et al. | 340/540 |
| 6,452,910 B1 | 9/2002 | Vij et al. | |
| 6,453,910 B1 | 9/2002 | Lloyd | |
| 6,469,639 B2 * | 10/2002 | Tanenhaus et al. | 340/870.16 |
| 6,477,143 B1 | 11/2002 | Ginossar | |
| 6,480,900 B1 | 11/2002 | Habert | |
| 6,496,575 B1 | 12/2002 | Vasell et al. | |
| 6,499,027 B1 | 12/2002 | Weinberger | |
| 6,504,631 B1 | 1/2003 | Barry et al. | |
| 6,505,086 B1 | 1/2003 | Dodd, Jr. et al. | |
| 6,505,100 B1 | 1/2003 | Stuempfle et al. | |
| 6,507,810 B2 | 1/2003 | Razavi et al. | |
| 6,532,494 B1 | 3/2003 | Frank et al. | |
| 6,545,601 B1 | 4/2003 | Monroe | |
| 6,546,419 B1 * | 4/2003 | Humpleman et al. | 709/223 |
| 6,550,012 B1 | 4/2003 | Villa et al. | |
| 6,563,796 B1 * | 5/2003 | Saito | 370/252 |
| 6,580,979 B2 | 6/2003 | Payton et al. | |
| 6,584,382 B2 | 6/2003 | Karem | |
| 6,615,088 B1 * | 9/2003 | Myer et al. | 700/20 |
| 6,615,099 B1 | 9/2003 | Muller et al. | |
| 6,640,145 B2 | 10/2003 | Hoffberg et al. | |
| 6,661,773 B1 | 12/2003 | Pelissier et al. | |
| 6,662,091 B2 | 12/2003 | Wilson et al. | |
| 6,678,250 B1 | 1/2004 | Grabelsky et al. | |
| 6,697,824 B1 | 2/2004 | Bowman-Amuah | |
| 6,715,077 B1 | 3/2004 | Vasudevan et al. | |
| 6,728,514 B2 | 4/2004 | Bandeira et al. | |
| 6,735,630 B1 * | 5/2004 | Gelvin et al. | 709/224 |
| 6,738,814 B1 | 5/2004 | Cox et al. | |
| 6,779,004 B1 | 8/2004 | Zintel | |
| 6,801,662 B1 | 10/2004 | Owechko et al. | |
| 6,809,653 B1 * | 10/2004 | Mann et al. | 340/870.28 |
| 6,813,542 B2 | 11/2004 | Peshkin et al. | |
| 6,826,607 B1 * | 11/2004 | Gelvin et al. | 709/224 |
| 6,829,437 B2 | 12/2004 | Kirby | |
| 6,832,251 B1 * | 12/2004 | Gelvin et al. | 709/224 |
| 6,859,831 B1 * | 2/2005 | Gelvin et al. | 709/224 |
| 6,891,838 B1 * | 5/2005 | Petite et al. | 370/401 |
| 6,911,997 B1 | 6/2005 | Okamoto et al. | |
| 6,990,080 B2 | 1/2006 | Bahl et al. | |
| 7,020,701 B1 * | 3/2006 | Gelvin et al. | 709/224 |
| 7,027,773 B1 | 4/2006 | McMillin | |
| 7,049,953 B2 | 5/2006 | Monroe | |

| | | | |
|---|---|---|---|
| 7,069,188 | B2 | 6/2006 | Roberts |
| 7,103,511 | B2 * | 9/2006 | Petite .......................... 702/188 |
| 7,104,955 | B2 | 9/2006 | Bardy |
| 7,109,859 | B2 | 9/2006 | Peeters |
| 7,158,758 | B2 | 1/2007 | Lim et al. |
| 7,161,926 | B2 | 1/2007 | Elson et al. |
| 7,207,041 | B2 | 4/2007 | Elson et al. |
| 7,305,467 | B2 | 12/2007 | Kaiser et al. |
| 7,383,341 | B1 | 6/2008 | Saito et al. |
| 7,484,008 | B1 | 1/2009 | Gelvin et al. |
| 7,577,872 | B2 | 8/2009 | DiBartolomeo et al. |
| 2001/0056540 | A1 | 12/2001 | Ober et al. |
| 2002/0036750 | A1 | 3/2002 | Eberl et al. |
| 2002/0067475 | A1 | 6/2002 | Waibel et al. |
| 2002/0111213 | A1 | 8/2002 | McEntee et al. |
| 2002/0154631 | A1 | 10/2002 | Makansi et al. |
| 2002/0181501 | A1 | 12/2002 | Nova et al. |
| 2003/0222819 | A1 * | 12/2003 | Karr et al. .................. 342/457 |
| 2004/0006424 | A1 | 1/2004 | Joyce et al. |
| 2004/0008651 | A1 | 1/2004 | Ahmed |
| 2004/0049248 | A1 | 3/2004 | Schonborn |
| 2005/0267638 | A1 | 12/2005 | Peshkin et al. |
| 2006/0083217 | A1 | 4/2006 | Bae |
| 2006/0206576 | A1 | 9/2006 | Obradovich et al. |
| 2007/0060056 | A1 | 3/2007 | Whitaker |
| 2008/0015748 | A1 | 1/2008 | Nagy |
| 2008/0126565 | A1 | 5/2008 | Osano |
| 2008/0261529 | A1 | 10/2008 | Rosenblatt |
| 2009/0122723 | A1 | 5/2009 | Hirano |
| 2009/0221275 | A1 | 9/2009 | Trip |
| 2009/0282458 | A1 | 11/2009 | Hjelm |
| 2009/0304009 | A1 | 12/2009 | Kolhi |
| 2010/0057290 | A1 | 3/2010 | Brillhart |

FOREIGN PATENT DOCUMENTS

| | | |
|---|---|---|
| DE | 19743137 A1 | 4/1999 |
| EP | 0814393 | 12/1997 |
| WO | 9917477 | 4/1999 |
| WO | 0054237 | 9/2000 |

OTHER PUBLICATIONS

D.J. Baker and A. Ephremides, "The Architectural Organization of a Mobile Radio Network via a Distributed Algorithm," IEEE Transactions on Communications, vol. Com-29, No. 11, Nov. 1981, pp. 1694-1701.

J. Elson, L. Girod, and D. Estrin, "Fine-Grained Network Time Synchronization Using Reference Broadcasts," submitted to SIGCOMM 2002.

W. Merrill, K. Sohrabi, L. Girod, J. Elson, F. Newberg, and W. Kaiser, "Open Standard Development Platforms for Distributed Sensor Networks," Aerosense Conference, Orlando, FL, Apr. 2002.

M. Gerla and J. Tzu-Chieh Tsai, "Multicluster, Mobile, Multimedia Radio Network," ACM-Baltzer Journal of Wireless Networks, vol. 1, No. 3, pp. 255-265, 1995.

C. R. Lin and M. Gerla, "Adaptive Clustering for Mobile Wireless Networks."

S. Natkunanathan, et al., "A Signal Search Engine for Wireless Integrated Network Sensors", ASFL Annual Symposium, Mar. 2000, pp. 1-4.

Michael J. Dong, et al., "Low Power Signal Processing Architectures for Network Microsensors", 1997 International Symposium on Low Power Electronics and Design; Digest of Technical Papers (1997) pp. 173-177.

Tsung-Hsien Lin, et al., "CMOS Front End Components for Micropower RF Wireless Systems", Proceedings of the 1998 International Symposium on Low Power Electronics & Design, pp. 11-15, Aug. 1998.

G. Asada, et al.., "Wireless Integrated Network Sensors: Low Power Systems on a Chip", Proceedings of the 1998 European Solid State Circuits Conference (ESSCIRC), pp. 1-8 The Hague, The Netherlands, Sep. 22-24, 1998.

Gregory J. Pottie, R&D Quarterly and Annual Status Report for AWAIRS, pp. 1-28; Jan. 1, 1999-Apr. 31, 1999.

Gregory J. Pottie, et al., Wireless Integrated Network Sensors: Towards Low Cost and Robust Self-Organizing Security Networks, SPIE Conference on Sensors, C3I, Information and Training Tech. for Law Enforcement, Boston, MA.; pp. 1-10; Nov. 3-5, 1998.

Loren P. Clare, et al., "Self-Organizing Distributed Sensor Networks", SPIE 13$^{th}$. Annual Symposium on Aerosense/Defense Sensing, Simulation and Controls, UGS Technologies and Applications Conference, Orlando, Florida; pp. 1-9; Apr. 5-9, 1999.

J. Agre, et al., "Autoconfigurable Distributed Control Systems", Proceedings of the 2$^{nd}$. International Symposium on Autonomous Decentralized Systems (ISADS 95), Phoenix, Arizona; pp. 1-8; Apr. 25-27, 1995.

Jonathan R. Agre, et al., "Development Platform for Self-Organizing Wireless Sensor Networks", SPIE 13$^{th}$. Annual Symposium on Aerosense/Defense Sensing, Simulation and Controls, Unattended Ground Sensor Technologies adn Applications Conference, Orlando, Florida; pp. 1-12; Apr. 5-9, 1999.

Ann Bhatnagar, et al., "Layer Net: A New Self-Organizing Network Protocol"; 1990 IEEE Military Communications Conference, Monterey, CA., Sep. 30 thru Oct. 3; pp. 845-849.

Norman Abramson, "The Throughput of Packet Broadcasting Channels", IEEE Transactions on Communications, vol. Com-25, No. 1, Jan. 1977, pp. 117-128.

C. David Young, "USAP: A Unifying Dynamic Distributed Multichannel TDMA Slot Assignment Protocol", Milcom 96 Conference Proceedings, Oct. 22-24, 1996, pp. 235-239.

G. Asada, et al."Low Power Wireless Communication and Signal Processing Circuits for Distributed Microsensors", Proceedings of 1997 IEEE International Symposium on Circuits and Systems; Jun. 9-12, 1997, Hong Kong, pp. 2817-2820.

K. Bult, et al."Low Power Systems for Wireless Microsensors", 1996 International Symposium on Low Power Electronics and Design; pp. 17-21.

Anthony Ephremides, et al."A Design Concept for Reliable Mobile Radio Networks with Frequency Hopping Signaling"; Proceedings of the IEEE, vol. 75, No. 1, Jan. 1987; pp. 56-73.

K. Bult, et al., "Wireless Integrated Microsensors"; Solid-State Sensor and Actuator Workshop, Hilton Head South Carolina, Jun. 3-6, 1996, pp. 205-210.

C. David Young, "A Unifying Dynamic Distributed Multichannel TDMA Slot Assignment Protocol", Rockwell International Working Paper, Oct. 25, 1995, pp. 1-29.

Tsung-Hsien Lin, et al, "Wireless Integrated Network Sensors (WINS) for Tactical Information Systems", Rockwell Science Center, Thousand Oaks, Jan. 1998, pp. 1-6.

Michael J. Dong, et al."Low Power Signal Processing Architectures for Network Microsensors"; University of California, Los Angeles, ISLPED 97, International Symposium on Low Power Electronics and Design, Jan. 1998, pp. 1-5.

Asada, G., et al., "Wireless Integrated Network Sensors (WINS)" Proceedings of the SPIE, SPIE, Bellingham, VA 3673:11-18 (1999).

Lohle, H., et al., "Bordermaster 2000—An Advanced Border Surveillance System", Electrical Communication, Alcatel. Brussels, BE 153-158 (1994).

Wesson et al., "Network Structures for Distributed Situation Assessment," IEEE Transactions on Systems, Man, and Cybernetics, vol. SMC-11, 1:5-23 (Jan. 1981).

Iyengar et al., "Information Routing and Reliability Issues in Distributed Sensor Networks," IEEE Transactions on Signal Processing, 40(12):3012-3021 (Dec. 1992).

U.S. Appl. No. 09/685,831, filed Oct. 4, 2000.
U.S. Appl. No. 09/684,742, filed Oct. 4, 2000.
U.S. Appl. No. 09/684,388, filed Oct. 4, 2000.
U.S. Appl. No. 09/684,162, filed Oct. 4, 2000.
U.S. Appl. No. 09/680,608, filed Oct. 4, 2000.

Pottie et al., "Wireless Integrated Network Sensors," Communications of the ACM, 43(5):51-58 (May 2000).

Asada et al., "Solid-State Circuits Conference," ESSCIRC '98. Proceedings of the 24th European Sep. 22-24, 1998, pp. 9-16.

Vardan et al., "WINS: Distributed in Situ Sensing for Mission and Flight Systems," Aerospace Conference Proceedings, IEEE, 7:459-463, Mar. 18-25, 2000.

International Search Report for PCT/US00/27764 mailed Feb. 1, 2001.

International Search Report for PCT/US00/27515 mailed Oct. 18, 2001.

International Search Report for PCT/US00/27514 mailed Oct. 18, 2001.

International Search Report for PCT/US00/27513 mailed Oct. 18, 2001.

International Search Report for PCT/US00/27675 mailed Oct. 18, 2001.

International Search Report for PCT/US00/27793 mailed Oct. 23, 2001.

International Search Report for PCT/US00/27763 mailed Oct. 23, 2001.

International Search Report for PCT/US00/27604 mailed Oct. 18, 2001.

International Search Report for PCT/US00/27603 mailed Oct. 18, 2001.

International Search Report for PCT/US00/27602 mailed Oct. 23, 2001.

International Search Report for PCT/US00/27601 mailed Oct. 23, 2001.

International Search Report for PCT/US00/27600 mailed Oct. 18, 2001.

* cited by examiner

| LENGTH (LOW ORDER BYTE) | LENGTH (HIGH ORDER BYTE) | DESTINATION ADDRESS | SOURCE ADDRESS | DATA (UP TO 2048 BYTES) | CHECKSUM |
|---|---|---|---|---|---|

APPARATUS FOR COMPACT INTERNETWORKED WIRELESS INTEGRATED NETWORK SENSORS (WINS)

RELATED APPLICATIONS

This application claims the benefit of U.S. Provisional Application No. 60/158,013, filed Oct. 6, 1999, U.S. Provisional Application No. 60/170,865, filed Dec. 15, 1999, U.S. Provisional Application No. 60/208,397, filed May 30, 2000, U.S. Provisional Application No. 60/210,296, filed Jun. 8, 2000, U.S. patent application Ser. No. 09/684,706, filed Oct. 4, 2000, now pending, U.S. patent application Ser. No. 09/684,565, filed Oct. 4, 2000, now U.S. Pat. No. 7,072,701, issued Mar. 28, 2006, U.S. patent application Ser. No. 09/685,020, filed Oct. 4, 2000, now U.S. Pat. No. 6,832,251, issued Dec. 14, 2004, U.S. patent application Ser. No. 09/685,019, filed Oct. 4, 2000, now U.S. Pat. No. 6,826,607, issued Nov. 30, 2004, U.S. patent application Ser. No. 09/684,490, filed Oct. 4, 2000, now U.S. Pat. No. 7,484,008, issued Jan. 27, 2009, U.S. patent application Ser. No. 09/684,742, filed Oct. 4, 2000, now pending, U.S. patent application Ser. No. 09/680,550, filed Oct. 4, 2000, now U.S. Pat. No. 6,735,630, issued May 11, 2004, U.S. patent application Ser. No. 09/685,018, filed Oct. 4, 2000, now U.S. Pat. No. 6,859,831, issued Feb. 22, 2005, U.S. patent application Ser. No. 09/684,388, filed Oct. 4, 2000, now pending, U.S. patent application Ser. No. 09/684,162, filed Oct. 4, 2000, now inactive, and U.S. patent application Ser. No. 09/680,608, filed Oct. 4, 2000, now pending, all of which are incorporated by reference.

GOVERNMENT LICENSE RIGHTS

The United States Government may have certain rights in some aspects of the invention claimed herein, as the invention was made with United States Government support under award/contract number DAAD16-99-C-1024 issued by US AMCAC NATICK Contracting Division.

BACKGROUND

1. Field of the Invention

This invention relates to the field of intelligent networks that include connection to the physical world. In particular, the invention relates to providing distributed network and Internet access to sensors, controls, and processors that are embedded in equipment, facilities, and the environment.

2. Description of the Related Art

Sensor networks are a means of gathering information about the physical world and then, after computations based upon these measurements, potentially influencing the physical world. An example includes sensors embedded in a control system for providing information to a processor. The Wireless Integrated Network Sensor (WINS) development was initiated in 1993 under Defense Advanced Research Projects Agency (DARPA) program support. The Low-power Wireless Integrated Microsensors (LWIM) program pioneered the development of WINS and provided support for the development of fundamental low power microelectromechanical systems (MEMS) and low power electronics technology. The LWIM program supported the demonstration of the feasibility and applicability of WINS technology in defense systems. See: K. Bult, A. Burstein, D. Chang, M. Dong, M. Fielding, E. Kruglick, J. Ho, F. Lin, T.-H. Lin, W. J. Kaiser, H. Marcy, R. Mukai, P. Nelson, F. Newberg, K. S. J. Pister, G. Pottie, H. Sanchez, O. M. Stafsudd, K. B. Tan, C. M. Ward, S. Xue, J. Yao, "Low Power Systems for Wireless Microsensors", Proceedings of International Symposium on Low Power Electronics and Design, pp. 17-21, 1996; J. G. Ho, P. R. Nelson, F. H. Lin, D. T. Chang, W. J. Kaiser, and O. M. Stafsudd, "Sol-gel derived lead and calcium lead titanate pyroelectric detectors on silicon MEMS structures", Proceedings of the SPIE, vol. 2685, pp. 91-100, 1996; D. T. Chang, D. M. Chen, F. H. Lin, W. J. Kaiser, and O. M. Stafsudd "CMOS integrated infrared sensor", Proceedings of International Solid State Sensors and Actuators Conference (Transducers '97), vol. 2, pp. 1259-62, 1997; M. J. Dong, G. Yung, and W. J. Kaiser, "Low Power Signal Processing Architectures for Network Microsensors", Proceedings of 1997 International Symposium on Low Power Electronics and Design, pp. 173-177, 1997; T.-H. Lin, H. Sanchez, R. Rofougaran, and W. J. Kaiser, "CMOS Front End Components for Micropower RF Wireless Systems", Proceedings of the 1998 International Symposium on Low Power Electronics and Design, pp. 11-15, 1998; T.-H. Lin, H. Sanchez, R. Rofougaran, W. J. Kaiser, "Micropower CMOS RF components for distributed wireless sensors", 1998 IEEE Radio Frequency Integrated Circuits (RFIC) Symposium, Digest of Papers, pp. 157-60, 1998; (Invited) G. Asada, M. Dong, T. S. Lin, F. Newberg, G. Pottie, H. O. Marcy, and W. J. Kaiser, "Wireless Integrated Network Sensors: Low Power Systems on a Chip", Proceedings of the 24th IEEE European Solid-State Circuits Conference, 1998.

The first generation of field-ready WINS devices and software were fielded in 1996 and later in a series of live-fire exercises. The LWIM-II demonstrated the feasibility of multihop, self-assembled, wireless network nodes. This first network also demonstrated the feasibility of algorithms for operation of wireless sensor nodes and networks at micropower level. The original WINS architecture has been demonstrated in five live fire exercises with the US Marine Corps as a battlefield surveillance sensor system. In addition, this first generation architecture has been demonstrated as a condition based maintenance (CBM) sensor on board a Navy ship, the USS Rushmore.

Prior military sensor systems typically included sensors with manual controls on sensitivity and radio channel selection, and one-way communication of raw data to a network master. This is wasteful of energy resources and inflexible. In the LWIM network by contrast, two-way communication exists between the sensor nodes and the master, the nodes contain signal processing means to analyze the data and make decisions on what is to be communicated, and both the communications and signal processing parameters can be negotiated between the master and the sensor nodes. Further, two-way communications enables consideration of more energy-efficient network topologies such as multi-hopping. The architecture is envisioned so that fusion of data across multiple types of sensors is possible in one node, and further, so that the signal processing can be layered between special purpose devices and the general-purpose processor to conserve power. The LWIM approach to WINS represented a radical departure from past industrial and military sensor network practice. By exploiting signal processing capability at the location of the sensor, communications energy and bandwidth costs are greatly reduced, allowing the possibility of scalably large networks.

The DARPA sponsored a second program involving both UCLA and the Rockwell Science Center called Adaptive Wireless Arrays for Interactive Reconnaissance, surveillance and target acquisition in Small unit operations (AWAIRS), whose genesis was in 1995. Its focus has been upon the development of algorithms for self-assembly of the network and energy efficient routing without the need for masters, cooperative signal processing including beamforming and data fusion across nodes, distributed self-location of nodes, and development of supporting hardware. A self-assembling network has been demonstrated. Moreover, the AWAIRS program includes notions such as layered signal processing of signals (including use of multiple processors within nodes, as in LWIM), and data aggregation to allow scaling of the network. A symposium was held in 1998 to discuss the implications of such sensor networks for a wide variety of applications, including military, health care, scientific exploration, and consumer applications. The AWAIRS nodes have also been used in condition based maintenance applications, and have a modular design for enabling various sensor, processing, and radio boards to be swapped in and out. There is now a confirmed set of WINS applications within the Department of Defense for battlefield surveillance and condition based maintenance on land, sea and air vehicles, and WINS technology is being considered as a primary land mine replacement technology. See: J. R. Agre, L. P. Clare, G. J. Pottie, N. P. Romanov, "Development Platform for Self-Organizing Wireless Sensor Networks," Aerosense '99, Orlando, Fla., 1999; K. Sohrabi, J. Gao, V. Ailawadhi, G. Pottie, "A Self-Organizing Sensor Network," Proc. 37th Allerton Conf. on Comm., Control, and Computing, Monticello, Ill., September 1999; University of California Los Angeles Electrical Engineering Department Annual Research Symposium, 1998; K. Yao, R. E. Hudson, C. W. Reed, D. Chen, F. Lorenzelli, "Blind Beamforming on a Randomly Distributed Sensor Array System," IEEE J. Select. Areas in Comm., vol. 16, no. 8, Oct. 1998, pp. 1555-1567.

There are also a number of commercial sensor technologies that are related to WINS, in that they include some combination of sensing, remote signal processing, and communications. Some of these technologies are described herein, along with some expansion upon the specific features of LWIM and AWAIRS.

FIG. 1 is a prior art control network 100. The network 100 typically includes sensors 102, a master 104, and possibly a plurality of actuators 106 that are tightly coupled, a configuration that results in a low delay in the feedback loop. Typically, the sensors 102 have parameters that are controlled by the master 104. The network may include a number of controllers and actuators. Results of actuation are detected by the sensors 102, which, together with the logic in the master 104, results in a control loop. Typically, raw measurements are forwarded to the master 104 with little or no processing (e.g., low pass or passband filtering). The master 104 reports the results to a computer network 108. Furthermore, the master 104 accepts new programming from that network 108.

FIG. 2 is a prior art sensor network 200. The typical network includes a number of sensor nodes 202, a master 204, and a user interface 206. The master 204 is often just another sensor node, or may be a more sophisticated device. The elements of the network 200 are hand registered, and there is limited self-assembly and reconfiguration capability residing in the network 200 (e.g., updating of addresses as new nodes are registered). Typically, the parameters of the sensors 202 are controlled by the master 204, and raw measurements are forwarded to the master 204 with little or no processing. For example, in remote meter reading applications the meter value at some particular time is sent. However, in LWIM networks extensive processing is performed to make decisions, and thus reduce the communications traffic and relieve the burdens of the master. The master 204 reports the results to the user interface 206, following some computation, using a long range communication link 208. The limitation that inheres is that the interface 206 allows for downloading of new programming (for example, on a laptop computer) via the master 204. In a typical military or meter-reading system however, there is only one-way communication upwards from the sensor 202 to the master 204, and thus no tuning of node parameters is possible.

FIG. 3 is a prior art AWAIRS sensor network 300. The sensor nodes 302 of the AWAIRS network 300 include extensive signal processing in order to reduce communications. The sensor nodes 302 can include multiple processors of differing types, and can progress through several levels of signal processing in performing target detection and identification. The sensor nodes 302 can also include ranging devices for position location. Moreover, the sensor nodes 302 enable cooperative behaviors such as data fusion, beamforming, and cooperative communications. The network 300 is self-organizing, and will establish routing to minimize energy consumption. Multihop routing is supported. The network 300 does not require long-range links, but can include them, and may directly connect to a computer and user interface 306. Moreover, the sensor nodes 302 may interact with a number of user interfaces 306. Data aggregation may be included in a path from the remote sensors to an end destination.

FIG. 4 is an example of a prior art sensor network 400 using distributed signal processing. Source 1 emits a signal that is detected by sensors 1, 2, and 3. Sensor node 1 can become designated as a fusion center to which some combination of data and decisions are provided from sensor nodes 2 and 3. Sensor node 1 then relays the decision towards the end user using a specific protocol. Source 2 emits a signal that is detected by sensor node 4. Sensor node 4 performs all processing and relays the resulting decision towards the end user.

Sensor node 6 receives the signals emitted by both sensors 1 and 4. Sensor node 6 may pass both decisions or perform some further processing, such as production of a summary activity report, before passing information towards the end user. The end user may request further information from any of the sensor nodes involved in processing data to produce a decision.

FIG. 5 is an example scenario for self-organization in a prior-art sensor network such as AWAIRS. In the limit of short hops the transceiver power consumption for reception is nearly equal to that of transmission. This implies that the protocol should be designed so that radios are off as much of the time as possible, that is, the Media Access Controller (MAC) should include some variant of Time-Division Multiple Access (TDMA). This requires that the radios periodically exchange short messages to maintain local synchronism. It is not necessary for all nodes to have the same global clock, but the local variations from link to link should be small to minimize the guard times between slots, and enable cooperative signal processing functions such as fusion and beamforming. The messages can combine health-keeping information, maintenance of synchronization, and reservation requests for bandwidth for longer packets. The abundant bandwidth that results from the spatial reuse of frequencies and local processing ensures that relatively few conflicts will result in these requests, and so simple mechanisms can be used.

To build this TDMA schedule, the self-organization protocol combines synchronism and channel assignment functions. It supports node-to-node attachment, node-to-network attachment, and network-to-network attachment. The distributed protocol assigns progressively less of the TDMA frame to invitations and listening as the network becomes more connected. The result is contention-free channel assignments for the sensor nodes in a flat (peer-to-peer) network, where the channels consist of some combination of time and frequency assignments. Invitation slots are allocated even when the network is mature to allow for reconfiguration.

Upon construction of the set of links, the routing is then built. If the nodes are powered by batteries, the network will have a life-cycle which begins in a boot-up, proceeds through a phase of maximum functionality, decline, and finally failure. Every bit that is exchanged hastens the end of the network. Particular nodes may be more heavily stressed by traffic than others (e.g., those in the vicinity of a gateway or other long-range link). Thus, routing protocols must to some extent be energy-aware, to sustain useful operation as long as possible. The minimum energy path is not necessarily the most desirable. Rather routes are ordinarily chosen to extend operation, although high priority messages may be routed for low latency, even if this exhausts precious network resources. The predictability of flow to and from a relatively small number of gateways enables infrequent construction of sets of paths to these data points, minimizing overhead.

FIG. 6 is an example scenario of self-location in a prior art sensor network. In this scenario, sensor nodes 2, 5, 8, and 9 contain an absolute position reference mechanism, for example Global Position System (GPS) or hand registration of position. Furthermore, all sensor nodes include transducers and receivers for radio frequency (RF) or acoustic ranging. As such, the network elements are homogeneous except possibly for nodes 2, 5, 8, and 9, as these nodes provide position and timing reference. Sensor node algorithms estimate ranges to neighboring sensor nodes using a time difference of arrival (TDOA) scheme. The results are used to set up either linear or non-linear systems of equations using either distributed or centralized algorithms. For example, if all nodes can hear the four references, standard GPS algorithms can be used independently by each node. If nodes can only hear near neighbors, iterative procedures may be employed. Using this system, a position determination is made when a sensor node hears at least four neighboring sensor nodes. While four nodes are required for an absolute position determination in a three-dimensional system, results are better when more than four nodes are detected. Also, only a small percentage of the sensor nodes of a network are required to make an absolute position determination.

FIG. 7 is an example of sensor/internet connections in a prior art sensor network 700. The sensor nodes 702 may be cameras, interfaced to a computer by means of an electronic card. The interface card 704 allows for control by a computer 706 of a limited number of parameters. The network interface 708 includes, for example, a modem card in a computer, telephone line access, or access to an Internet Service Provider (ISP). The images processed by the host computer 706 can be viewed remotely by users with similar Internet access, for example when the images are placed on a publicly available World Wide Web (web) site. The images placed on a web site may be downloaded and modified using remote computers 714 and interfaces 712 with web site access. While this network makes use of standard software, it requires an expensive interface between the computer 706 and each sensor node 702. Furthermore, manual configuration of the connection and the software is typically required to attach each sensor node 702 to the network 710.

As another example, in a prior art system designed for airport security, a seismic sensor and energy detector circuit is used to trigger a digital camera under the control of a computer. The image and seismic record are conveyed by wireless means to another computer, and from there posted to a web site. The trigger level can be controlled remotely via the web site. However, only one remote unit is supported, with no networking of multiple sensors, and with the requirement of a costly interface platform, or computer, at both ends.

While these examples indicate some aspects of wireless sensor network technology, many desirable features are absent. Each of these systems either lacks ease of use, ability to use standard development tools to extend them, and/or ability to operate in variable or hostile environments. For example, the wireless communications technique may be vulnerable to jamming or interference, or the platform may consume too much energy for long-term remote operation, or it may lack simple connectivity to the Internet or support for database services, or only support a limited number of sensing modes.

Wireless network technology has progressed so that the WINS platform or set of platforms is required to support standard operating systems and development environments, and be capable of being easily integrated into larger networks. Only in this fashion can the physical world be seamlessly connected to the many resources available through the Internet and other networks. In particular, the WINS platforms are required to provide a familiar and convenient research and development environment. The cumbersome embedded systems of past implementations are not appropriate for this next generation of progress. The custom operation systems developed for past generations of low power sensor nodes have an inconvenient development environment and are not supported by the familiar, high productivity, powerful, development tools needed by the research and development community. Furthermore, conventional approaches would yield a system where a platform operating with a conventional embedded operating system would require excessive operating power. This prevents developers from facing and solving the challenges of low power system design. The development of these essential capabilities requires a fundamentally different WINS node and network architecture.

SUMMARY

The Wireless Integrated Network Sensor Next Generation (WINS NG) sensors and nodes provide distributed network and Internet access to sensors, controls, and processors that are deeply embedded in equipment, facilities, and the environment. The WINS NG network is a new monitoring and control capability for applications in such sectors as transportation, manufacturing, health care, environmental monitoring, and safety and security. Wireless Integrated Network Sensors combine microsensor technology, low power signal processing, low power computation, and low power, low cost wireless (and/or wired) networking capability in a compact system. The WINS NG networks provide sensing, local control, and embedded intelligent systems in structures, materials, and environments.

The WINS NG networks provide a more efficient means of connecting the physical and computer worlds. Sensor nodes self-organize to form a network, and seamlessly link to the Internet or other external network via a gateway node, which can be of the same type or different from the sensor nodes. The sensor nodes can themselves be of the same type or a variety of types. Network resources such as databases are available to the sensor network and the remote user through the Internet or other external network.

The sensor nodes are constructed in a layered fashion, both with respect to signal processing and network protocols, to enable use of standard tools, ease real-time operating systems issues, promote adaptability to unknown environments, simplify reconfiguration, and enable lower-power, continuously vigilant operation. High reliability access to remote WINS NG nodes and networks enables remote interrogation and control of the sensor network; this reliability is achieved using a plurality of couplings, with automatic adjustment of the processing and communications to deal with failures of any of these couplings. Linkage to databases enables extra resources to be brought to bear in analysis and archiving of events, and database methods can be used to control the entire network in a more transparent manner, to enable more efficient control and design.

The WINS NG technology incorporates low-energy circuitry and components to provide secure communication that is robust against deliberate and unintentional interference, by means for example of new algorithms and antenna designs. The network can further include distributed position location functionality that takes advantage of the communications and sensing components of the individual nodes, to simplify deployment and enable location of targets.

The sensor nodes can be of a variety of types, including very simple nodes that may, for example, serve as tags. These nodes can be constructed on flexible polymer substrates, a material that may be used for a wide variety of synergistic uses. This construction results in more compact and capable systems, providing sensors, actuators, photo-cells and structural properties. Compact antennas for such packages have been developed. The network includes both wireless and wired communications capability, using a common protocol and automatically choosing the more secure or lower power mode when it is available, providing more robust and long-lived operation in potentially hostile environments. The network enables a wide variety of users with different data rate and power requirements to coexist as, for example, in wired or wireless mode vehicular applications. The flexibility of the design opens a wide variety of applications.

In another aspect, the layering of the WINS nodes with respect to processing and signal processing facilitates the rapid design of new applications. Layering further facilitates self-organization of complete applications, from network connections through to interoperation with remote databases accessed through external networks such as the Internet. With this layering, the cost of deployment is radically reduced even while remote operation is enabled.

The descriptions provided herein are exemplary and explanatory and are intended to provide examples of embodiments of the claimed invention.

BRIEF DESCRIPTION OF THE FIGURES

The accompanying figures illustrate embodiments of the claimed invention. In the figures:

FIG. 24 shows a WINS NG data frame format of an embodiment.

DETAILED DESCRIPTION

Figure 1:
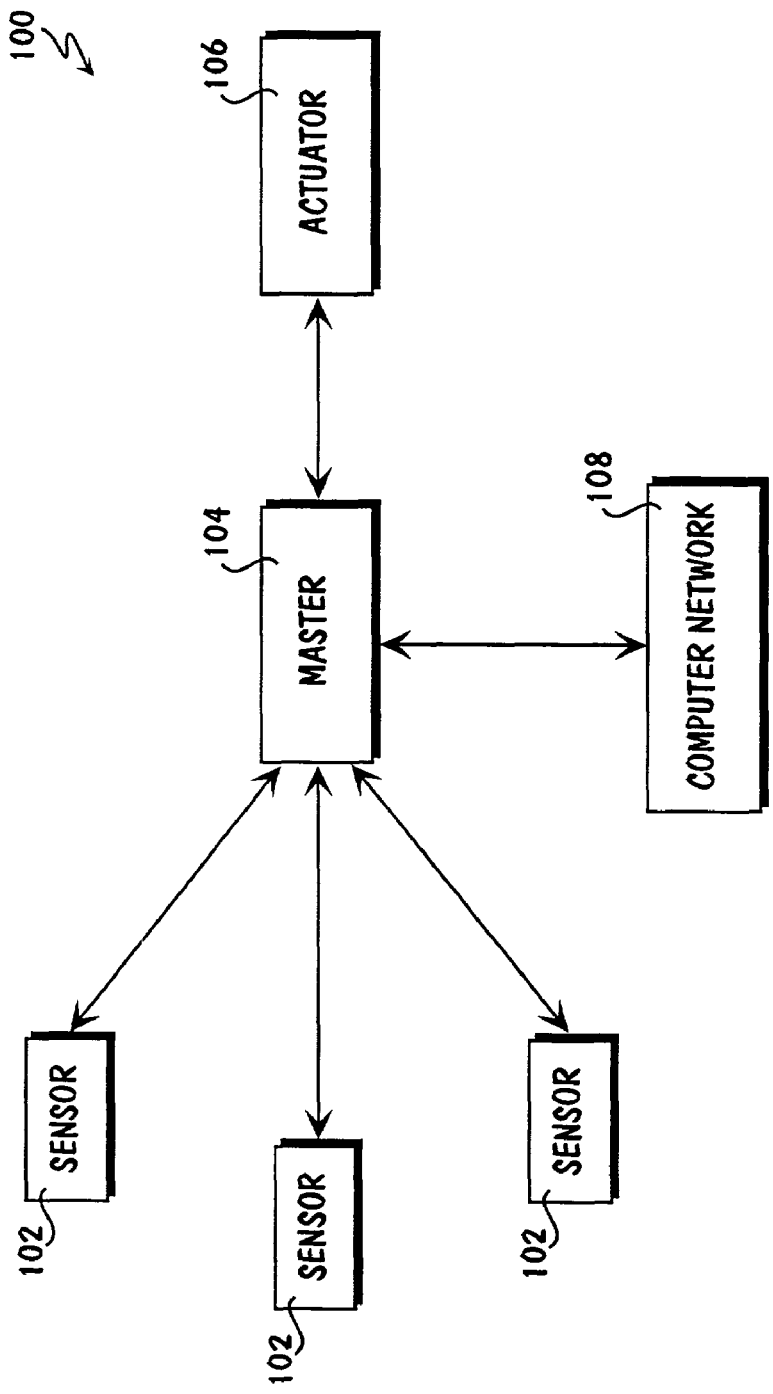
FIG. 1 is a prior art control network.
Figure 2:
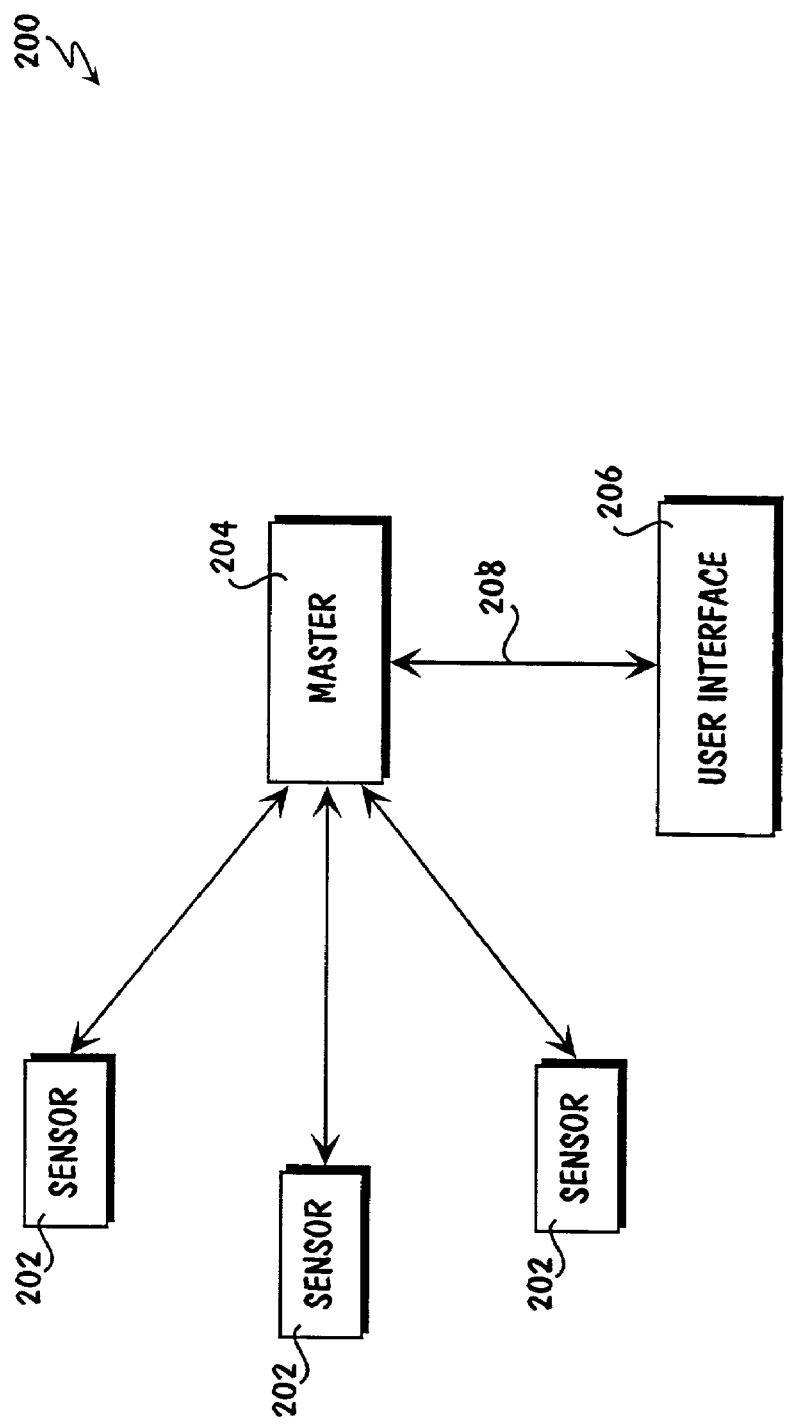
FIG. 2 is a prior art sensor network.
Figure 3:
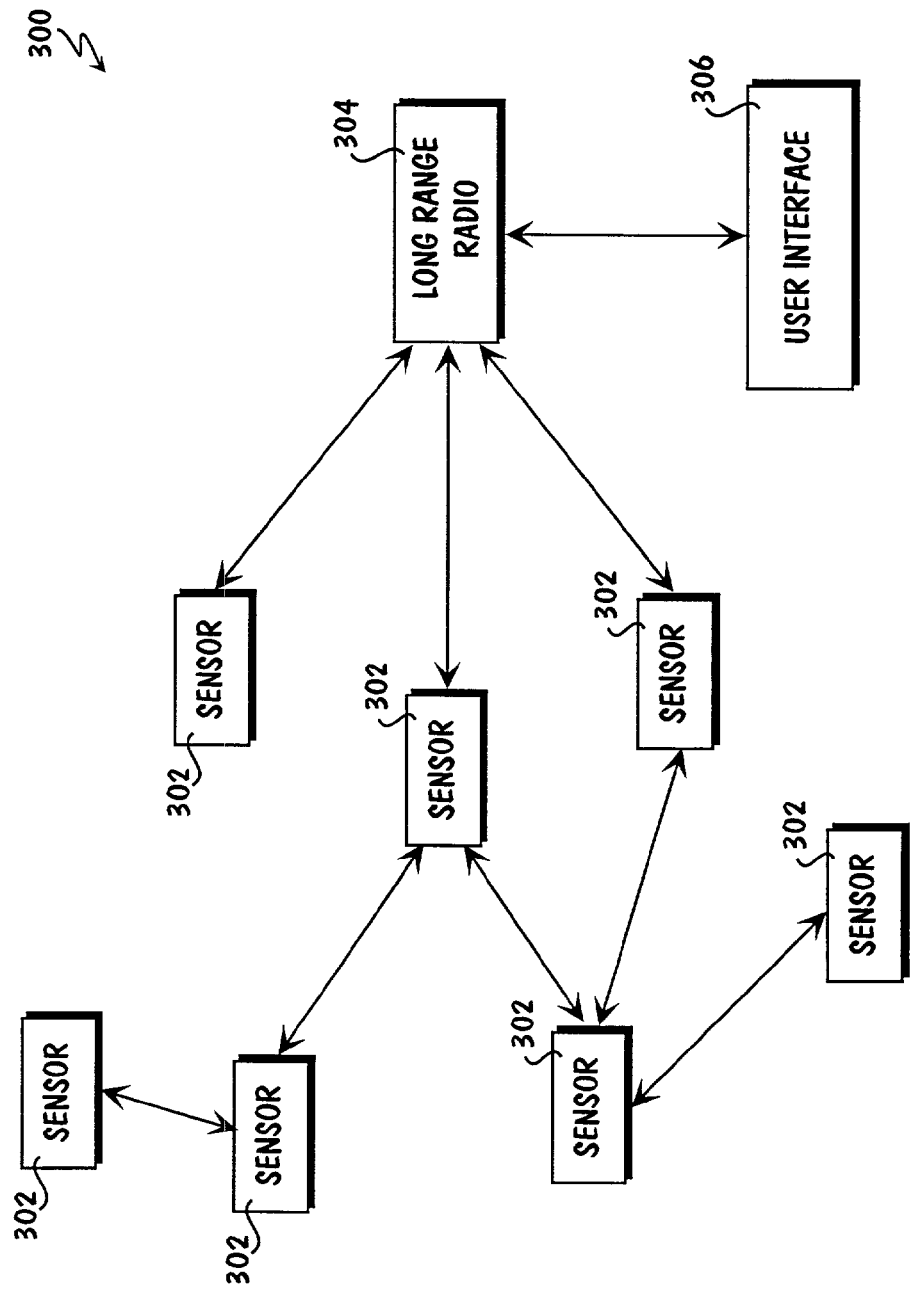
FIG. 3 is a prior art Adaptive Wireless Arrays for Interactive Reconnaissance, surveillance and target acquisition in Small unit operations (AWAIRS) sensor network.
Figure 4:
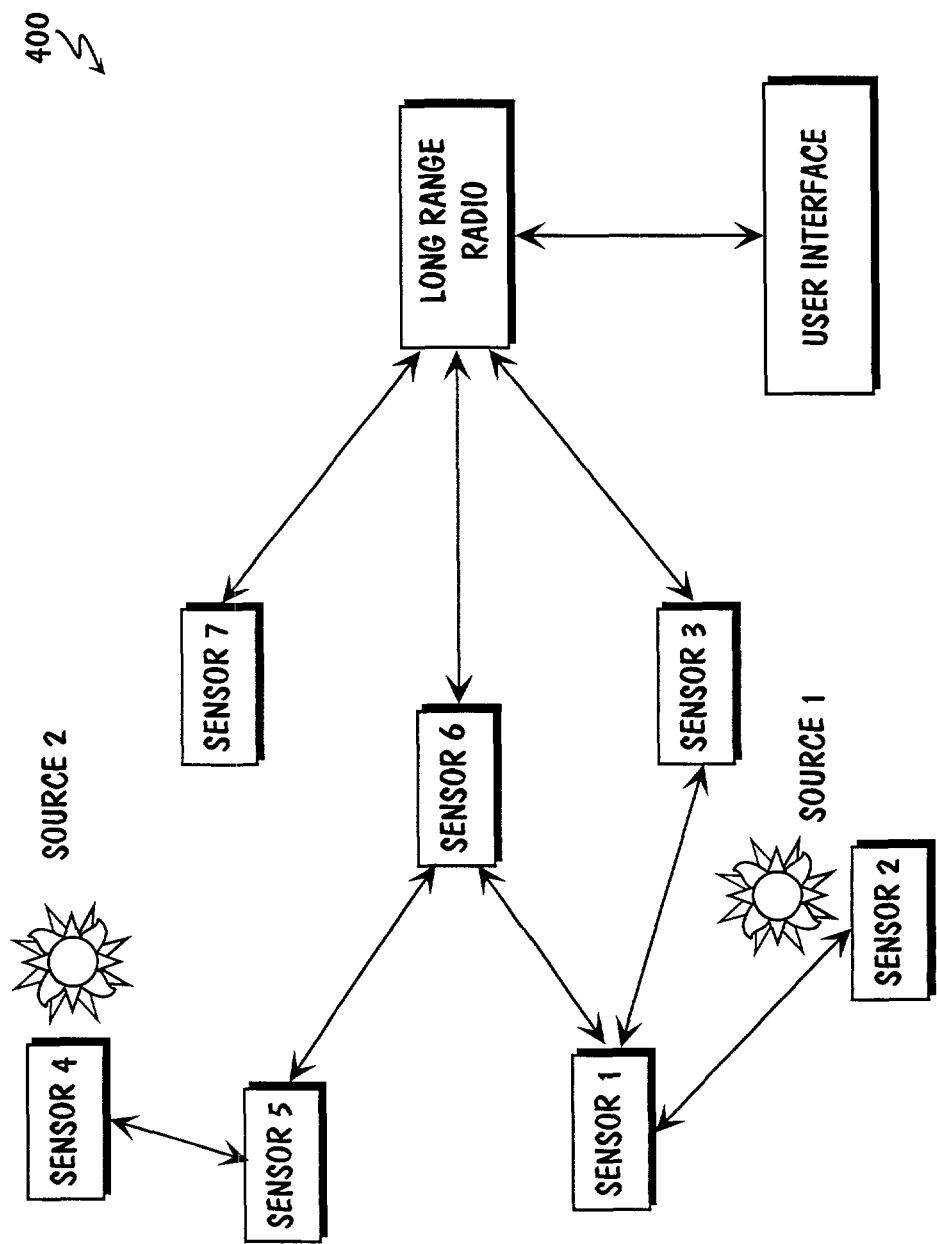
FIG. 4 is an example of a prior art sensor network using distributed signal processing.
Figure 5:
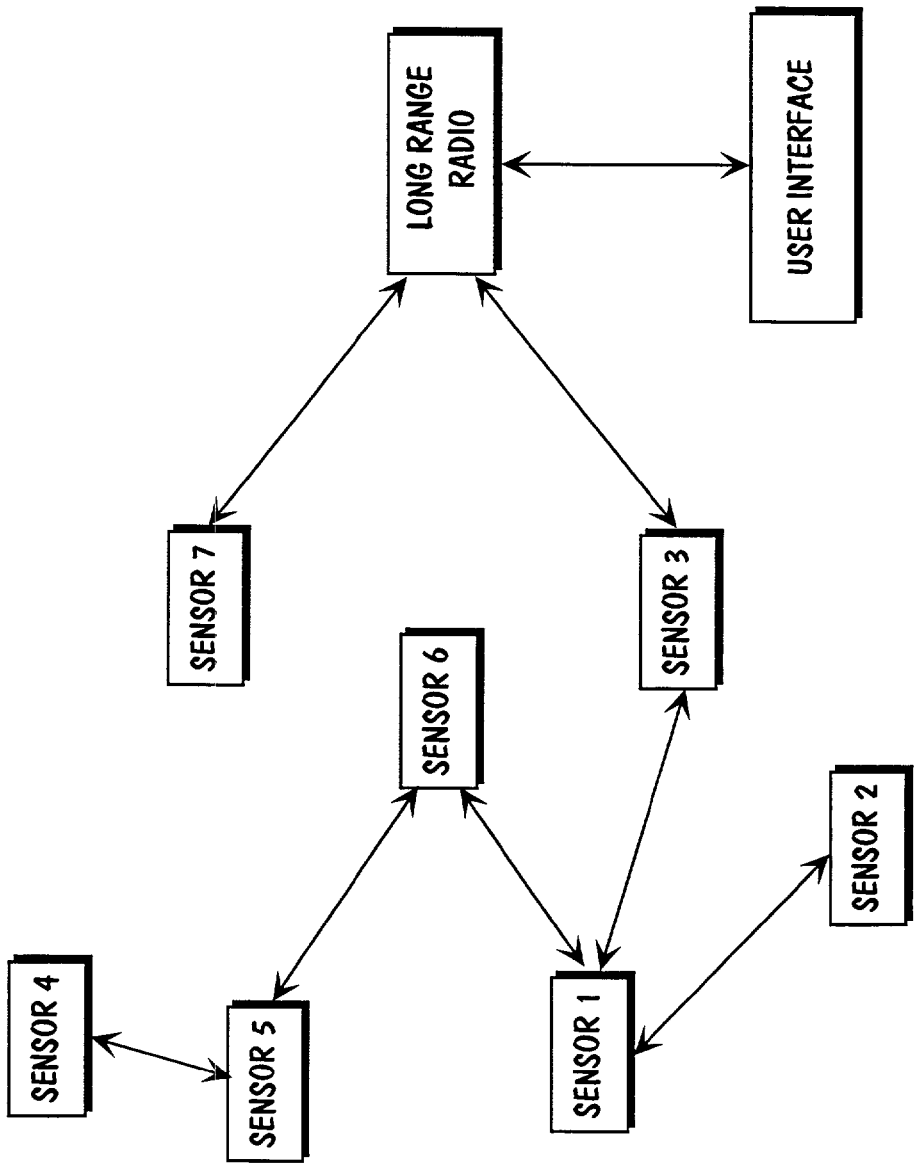
FIG. 5 is an example scenario for self-organization in a prior-art sensor network such as AWAIRS.
Figure 6:
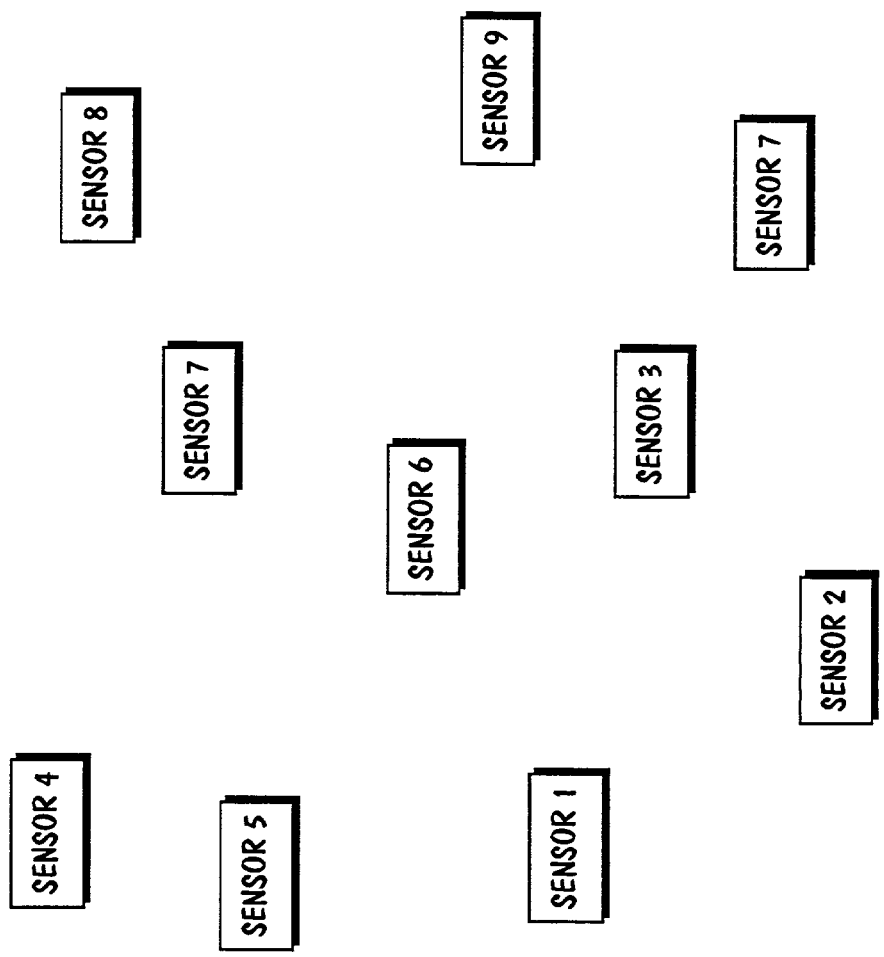
FIG. 6 is an example scenario of self-location in a prior art sensor network.
Figure 7:
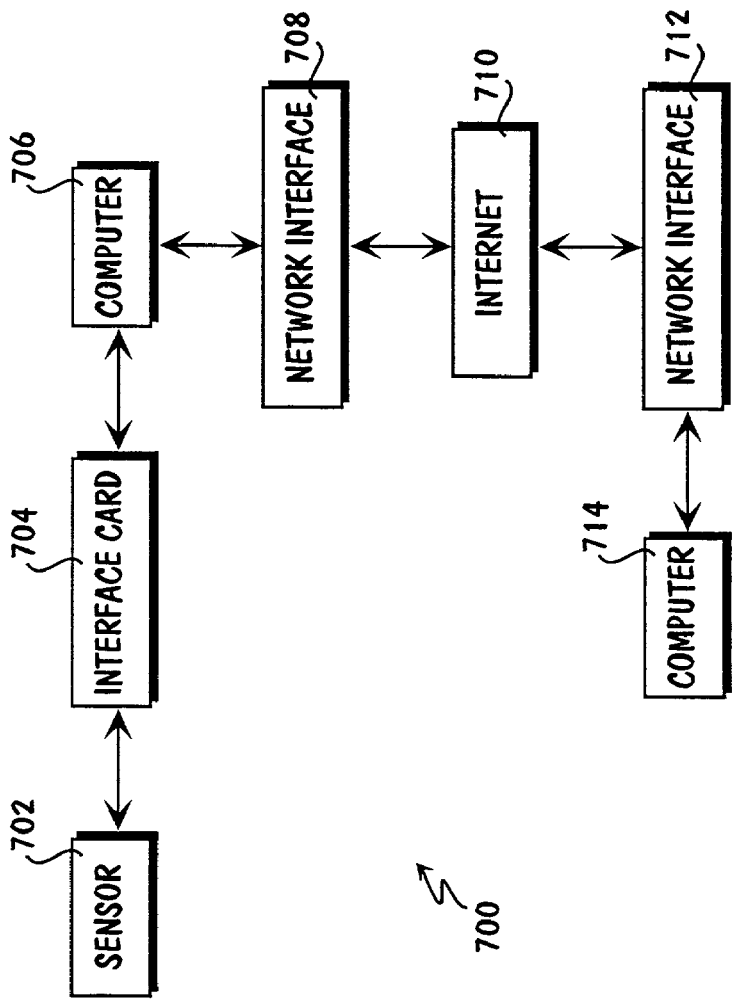
FIG. 7 is an example of sensor/internet connections in a prior art sensor network.

I. The Wireless Integrated Network Sensor Next Generation (WINS NG) Technology The Wireless Integrated Network Sensor Next Generation (WINS NG) nodes of an embodiment combine sensing, signal processing, decision capability, and wireless networking capability in a compact, low power system. Recent advances in integrated circuit technology enable construction of far more capable sensors, radios, and processors at low cost, thereby enabling mass production of sophisticated systems that link the physical world to networks. Compact geometry and low cost allows WINS NG to be embedded and distributed at a small fraction of the cost of conventional wireline sensor and actuator systems.

WINS NG is a fundamental advance for network access to densely and deeply distributed sensing, control, and processing systems. Applications for WINS NG extend from a local scale to a global scale. For example, on a local, wide-area scale, battlefield situational awareness provides personnel health monitoring and enhances security and efficiency. On a local, enterprise scale, WINS NG creates a manufacturing information service for cost and quality control. On a local machine scale, WINS NG condition-based maintenance devices equip power plants, appliances, vehicles, and energy systems with enhanced reliability, reductions in energy usage, and improvements in quality of service. On a national scale, transportation systems, and borders can be monitored for efficiency, safety, and security. Also, on a metropolitan scale, new traffic, security, emergency, and disaster recovery services are enabled by WINS NG. In the biomedical area, WINS NG connects patients in the clinic, ambulatory outpatient services, and medical professionals to sensing, monitoring, and control. On a global scale, WINS NG permits environmental monitoring of land, water, and air resources. It is, thus, fundamentally a technology that efficiently links networks to the physical world.

WINS NG is provided in one embodiment in a scalable, low cost, sensor network architecture that conveys sensor information to the user at a low bit rate with low power transceivers. Continuous sensor signal processing is provided to enable constant monitoring of events in an environment. Thus, for all of these applications, local processing of distributed measurement data is used for a low cost, scalable technology. Distributed signal processing and decision making enable events to be identified at the remote sensor. Thus, information in the form of decisions is conveyed in short message packets. Future applications of distributed embedded processors and sensors will require massive numbers of devices. Conventional methods for sensor networking present impractical demands on cable installation and network bandwidth. By reducing the requirements for transmission of measured data, the WINS of described embodiments reduce the burdens on communication system components, networks, and human resources.

The WINS NG network devices support local sensing and control with response requirements ranging from real-time through latency tolerant processes. A function of WINS NG networks is supporting constantly vigilant signal processing and event recognition associated with this sensing and control. Furthermore, WINS NG systems support applications at multiple tiers. For example, the applications that include geographically wide distribution of WINS NG technology support long range wireless communication links. In contrast, applications in factory automation or health care are supported using local area networks. In these applications, as will be described herein, WINS NG networks exploit the advantages of short range, robust, multihop wireless networks.

The deployment of WINS NG networks for a variety of applications is enabled by the low cost, scalable, self-installing architecture of embodiments described herein. The scalability of a WINS NG network is provided by powerful local computation ability, adaptation to the environment, remote reconfigurability, and communication security. Multiple users interact with the WINS NG network, monitor and control the network, and query for events, locations, data, and configuration via the Internet. The design of such systems formerly required expertise ranging from sensing and radio communication to high level network abstractions. Relatively few design teams possess all the necessary capabilities. This disadvantage of prior systems is addressed by an embodiment of WINS NG that enables designers to work mainly at the levels above the data link layer, with standard software tools.

Figure 8:
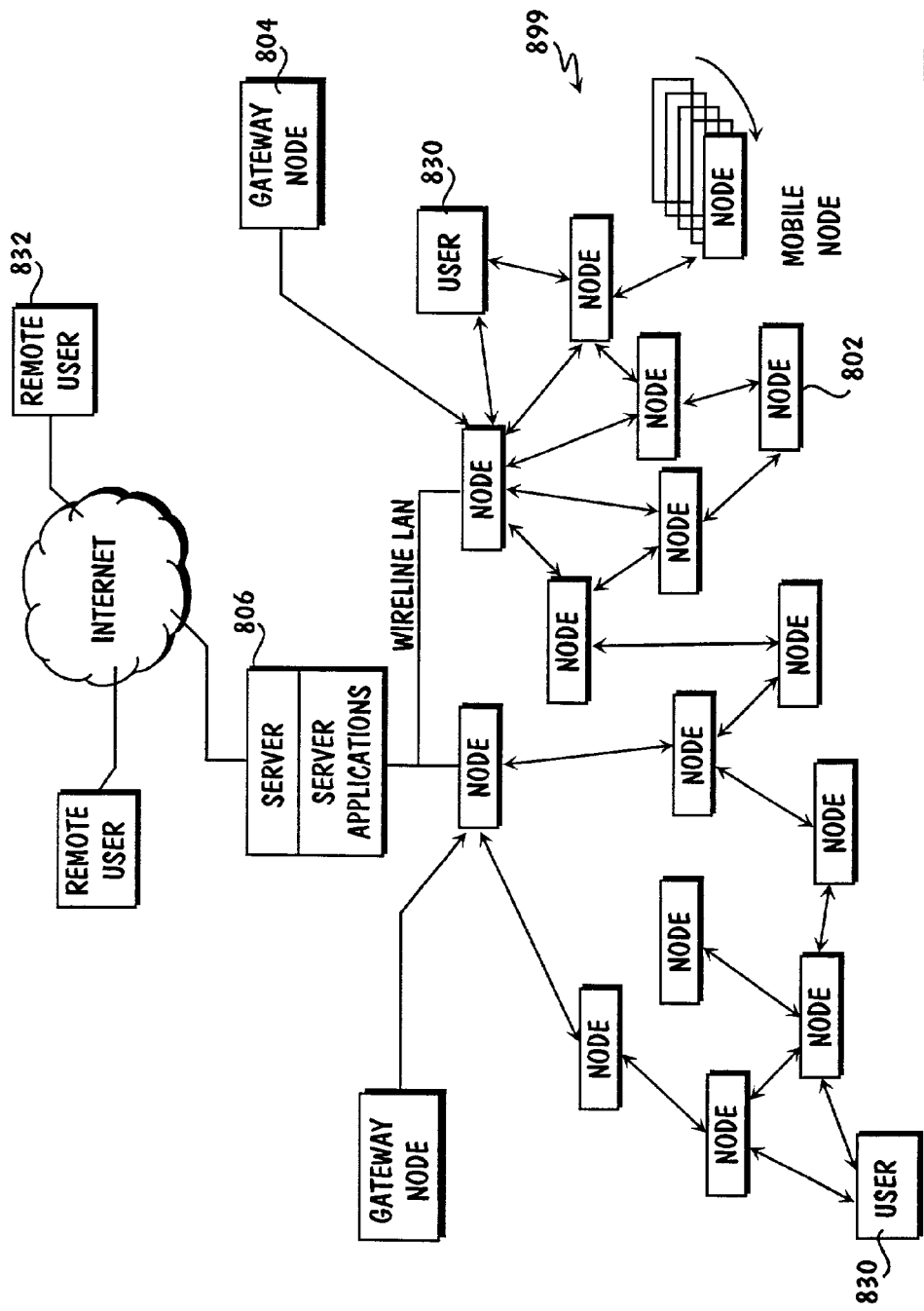
FIG. 8 is an embodiment of a WINS NG network.
Figure 9:
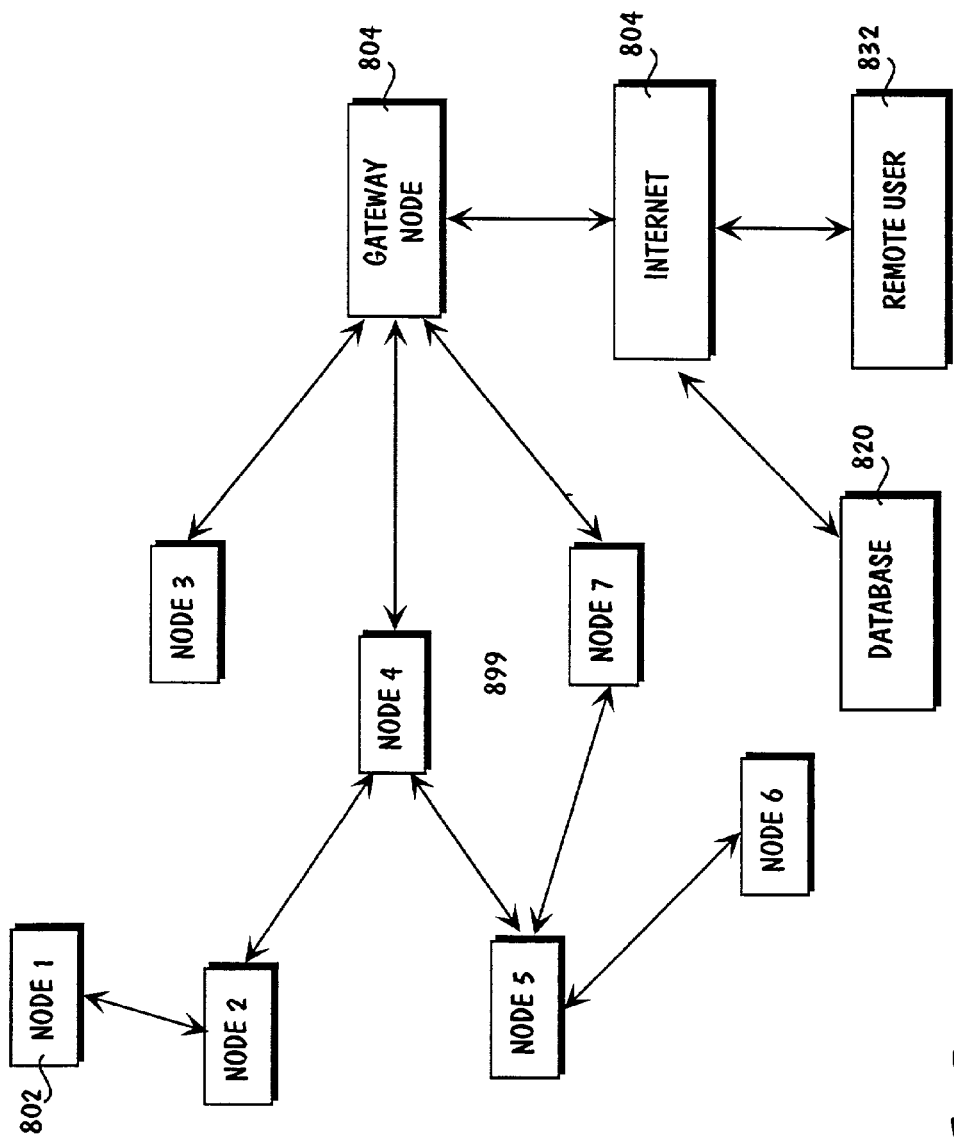
FIG. 9 is another embodiment of a WINS NG network.

FIGS. 8 and 9 show embodiments of a WINS NG network. The network includes nodes 802, gateway nodes 804, server 806, and web assistants or node control web or browser pages (not shown), but is not so limited. The sensor nodes 802 include any combination of actuators, sensors, signal processors, energy or power supplies, data storage devices, wireless communication devices, wireline communication devices, and self-location capabilities. The sensor nodes 802 are distributed in an environment 899 that is to be monitored or controlled. The network can include heterogeneous elements. Local users 830 may interact, if authenticated, with the network via the nodes 802 themselves through a local display and user interfaces (UIs). Non-local users can interact with the network through gateways 804. Thus, connections to servers 806, database services 820, and other network resources are available, and user 832 can access the network with standard tools. The user or client computer can access the WINS network continuously or intermittently, and may interface via processors of vastly different capabilities according to a particular application (e.g., personal computers, personal digital assistants (PDAs), or bi-directional pagers). A complete sensor network may, in one embodiment, be viewed as a distributed but active database that answers questions about the physical world, and acts upon the questions through the actuators. Multihop communication permits low power operation of dense WINS sensor networks.

The network architecture of FIGS. 8 and 9 is self-organizing with respect to an ability to distribute some combination of information and energy. The network interacts with remote users 832 and databases 820 when coupled to the Internet 810 or other networks using a gateway 804. The WINS node data is transferred over the possibly asymmetric wireless link to an end user 832 or to a conventional wireless network service, for example an Internet Protocol network 810, through a WINS gateway 804 or a network bridge. Internetworking provides remote accessibility via web-based tools to data (e.g., signals and images), code (e.g., signal processing, decision support, and database elements), management (e.g., node and network operation), and security functions.

The sensor nodes of an embodiment are remotely programmable. Furthermore, software is downloadable from storage locations in the sensor node network, or via the Internet from remote user locations or databases. Moreover, results or data products of sensor nodes may be remotely queried. Additionally, the network is capable of supporting distributed processing and data storage functions in accordance with varying sensor node capabilities and application demands.

Figure 10:
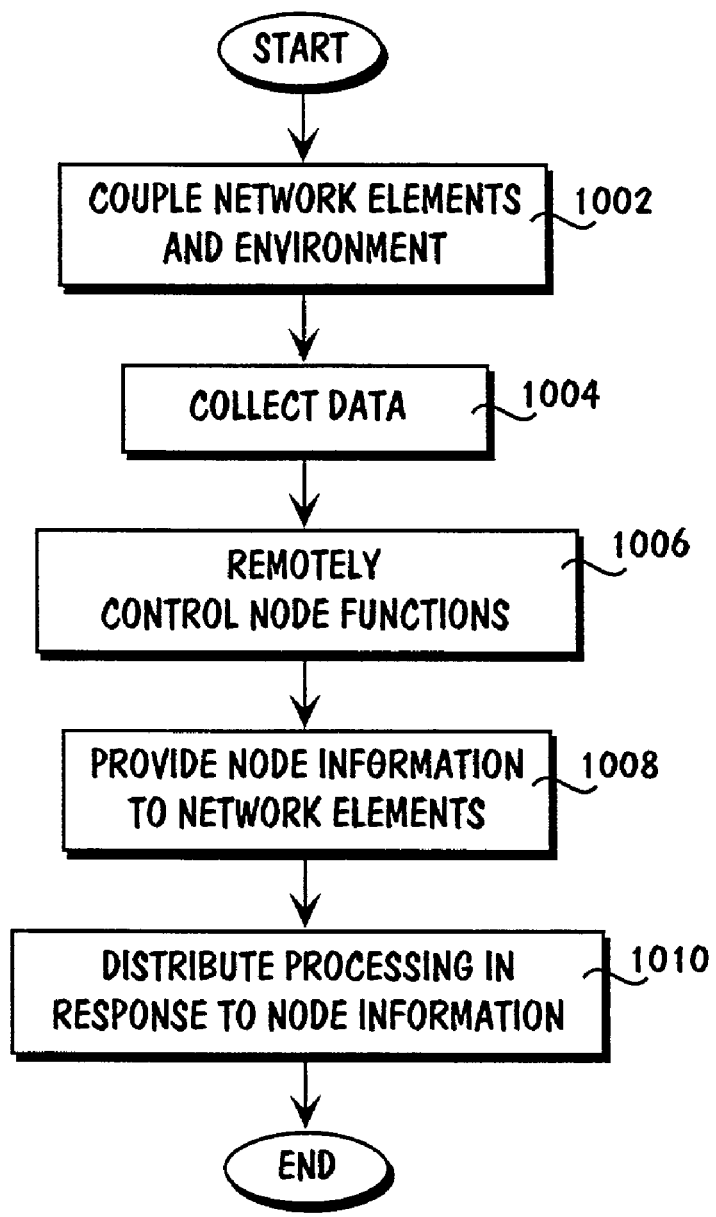
FIG. 10 is a block diagram of WINS NG operation of an embodiment.

FIG. 10 is a block diagram of WINS NG operation of an embodiment. Operation begins by coupling the WINS NG network elements or nodes to an environment to be monitored 1002. Data is collected from the monitored environment using some combination of the WINS NG network elements or nodes 1004. The functions of the network elements or nodes are remotely controlled/manipulated or programmed by a user through a client computer 1006. The client computer can include a number of processing devices from portable processing devices like personal digital assistants, pagers, or personal computers to servers. Information is distributed among the WINS NG network elements or nodes 1008, information that includes, but is not limited to, raw data collected, processed data, and node resource information. Data processing is distributed among various combinations of the WINS NG network elements or nodes in response to the node resource information 1010.

The descriptions herein include physical embodiments of the nodes, signal processing architecture, network architecture, methods for ensuring reliability of access, linkage to databases, security methods, and position location functions.

Signal Processing Architecture

A requirement in a security application is constant vigilance by at least a subset of the sensors, so that all threats are detected. However, the most sophisticated detection algorithm does not need to run all the time. A low false alarm or misidentification probability is desired along with a high detection probability. This is provided using queued data and energy-efficient procedures and/or algorithms. Simple algorithms of this type are well-suited to dedicated processors. Energy thresholding and limited frequency analysis on low-sampling rate magnetic, acoustic, infrared, or seismic sensors are in need of such solutions, having both low circuit complexity and clock rates. Having passed this test, other sensors that consume more energy can be turned on, and higher levels of processing and fusion invoked.

Figure 11:
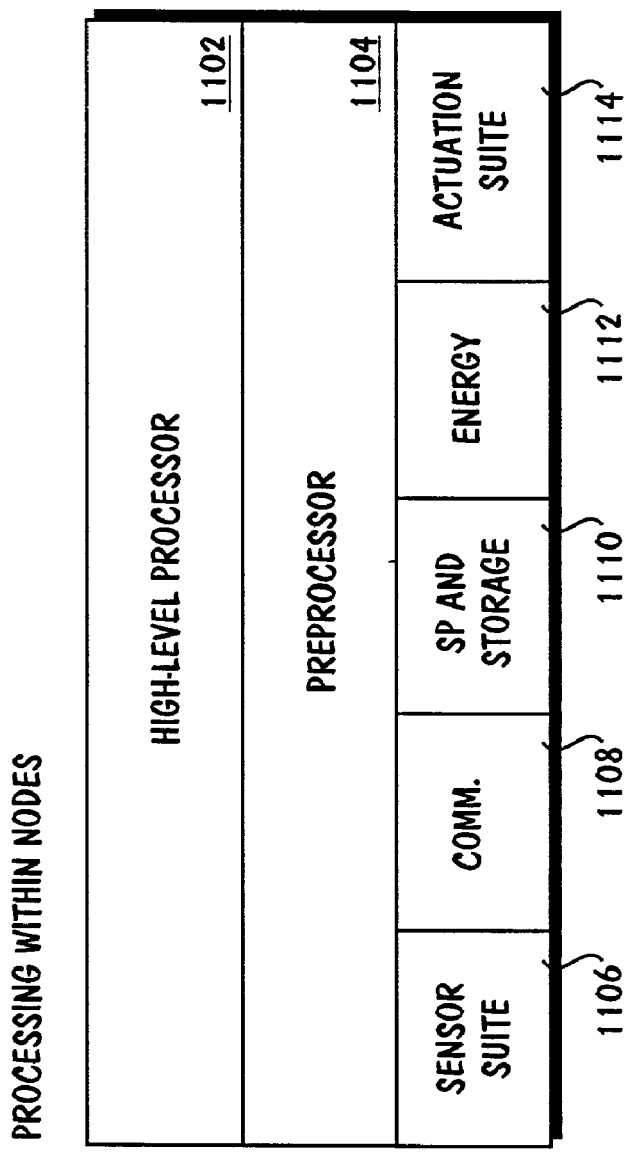
FIG. 11 is a block diagram of processing within a WINS NG sensor node of an embodiment.

FIG. 11 is a block diagram of processing within a WINS NG sensor node 1100 of an embodiment. The sensor node 1100 includes various signal processing, sensing, information storage, energy supply, and communications capabilities. Support is provided for multiple layers within individual sensor nodes 1100 and also for multiple layers among different sensor nodes 1100. Physical interfaces and software interfaces allow plug and play interoperability by all classes of node devices. Consequently, processing may be distributed across node devices in the same category, or across node devices in multiple categories.

Particular application program interfaces (APIs) are provided that allow for higher level programming of this distributed processing. For example, APIs are provided for control of sensor nodes, actuators, communications, special purpose processors, information storage, and energy management. Moreover, the APIs permit downloading of new instructions to control these operations. In an embodiment, resource usage parameters flow up through the network from the physical layer to the application layer. Furthermore, parameters that set priorities for networking behavior including signal processing, data transfer, data storage, and data aggregation flow down from the application to the physical layer. These parameters apply to many levels of the network, and the API framework of an embodiment makes it convenient to operate at any subset of these levels.

The preprocessor 1104 of an embodiment is a hardware device that facilitates the separation between lower level programming and higher level programming, while also permitting lower power operation. The preprocessor 1104 is coupled between at least one high level processor 1102 and devices or functions of the network that are linked to the physical world and require real-time operation. The devices or functions of the network that are linked to the physical world include, but are not limited to, the sensor suite 1106, the communication devices 1108, the signal processors and storage devices 1110, the power or energy supplies 1112, and the actuation suite 1114. Each node may include a number of combinations and variations of the sensor suite 1106, the communications devices 1108, the signal processors and storage devices 1110, the power supplies 1112, and the actuation suite 1114.

At some point in processing, a threshold may be crossed whereby a sensor node seeks information from nearby sensors, for purposes of data fusion or coherent beamforming. Because communication of raw data is very costly in terms of energy, this should occur later in the processing chain. Additionally, the processing requirements at this level are very large. Ultimately, a classification decision might be made using a large neural network or some other equally computationally hungry procedure for situations in which less sophisticated processing is unable to provide an answer with the required degree of certainty. In the worst case, raw data may be hopped back to a remote site where a human being performs analysis including pattern recognition.

Two points emerge regarding processing. First, networks of nodes of an embodiment exploit the probabilities of the events of interest in order to process only to the extent required. Most of the time, there are no targets, and thus no need to apply the most expensive algorithm in terms of processing expense. Also, there will be too many circumstances in which the least expensive algorithm will fail. A processing hierarchy leads to huge cost reductions while assuring the required level of reliability. Second, the processing hierarchy is intertwined with networking and data storage issues. How long and where data is queued depends on location in the processing hierarchy. Whether a node communicates and to what set of neighboring nodes depends on the signal processing task that is required. The communications costs in turn affect the processing strategy (e.g., willingness to communicate, and whether processing is centralized or distributed). All of this rests on physical constraints, and therefore the physical layer intrudes up through to applications.

Figure 12:
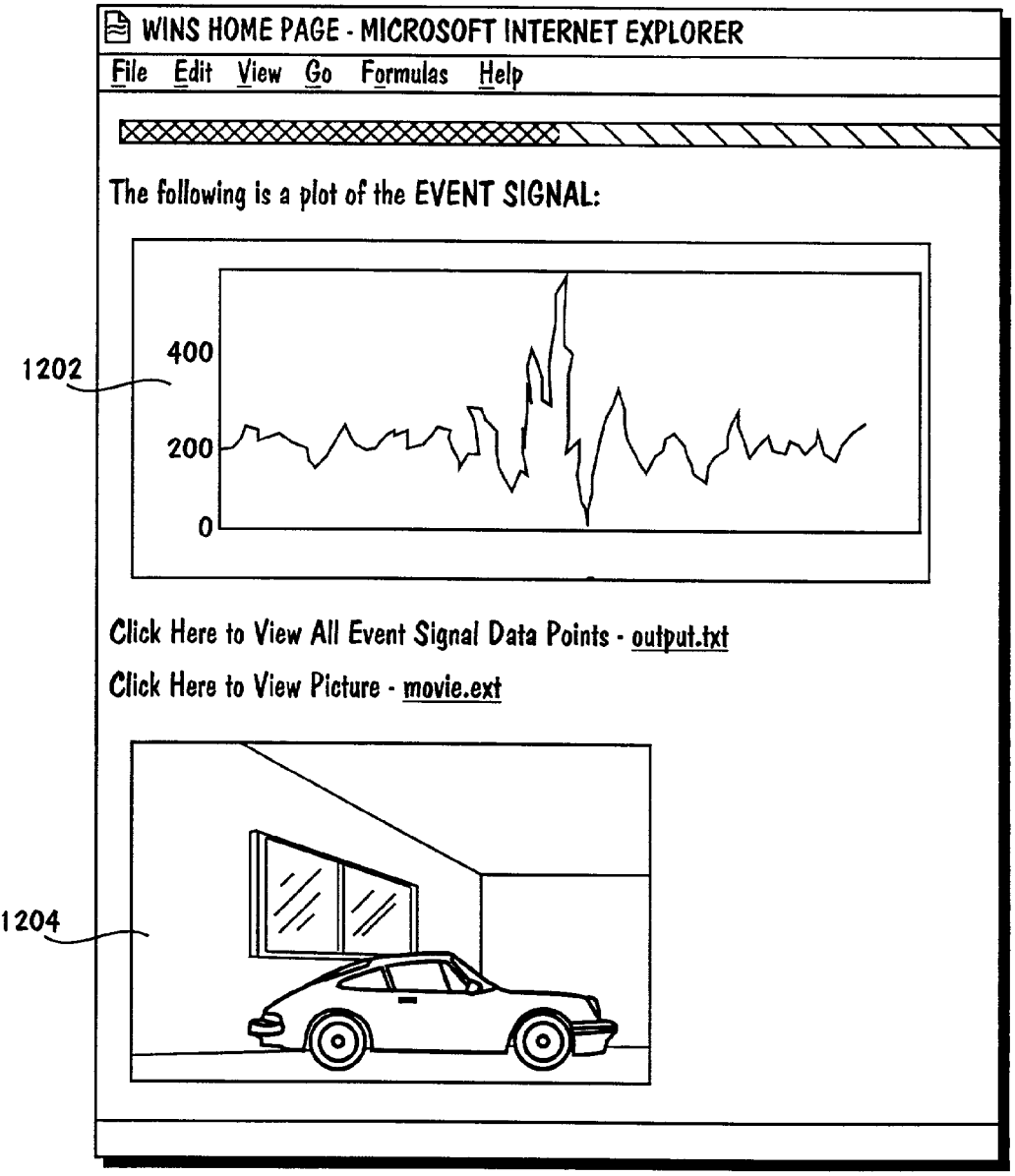
FIGS. 12 and 13 show browser screen images or pages associated with remote Internet operation of a WINS NG node of an embodiment.
Figure 13:
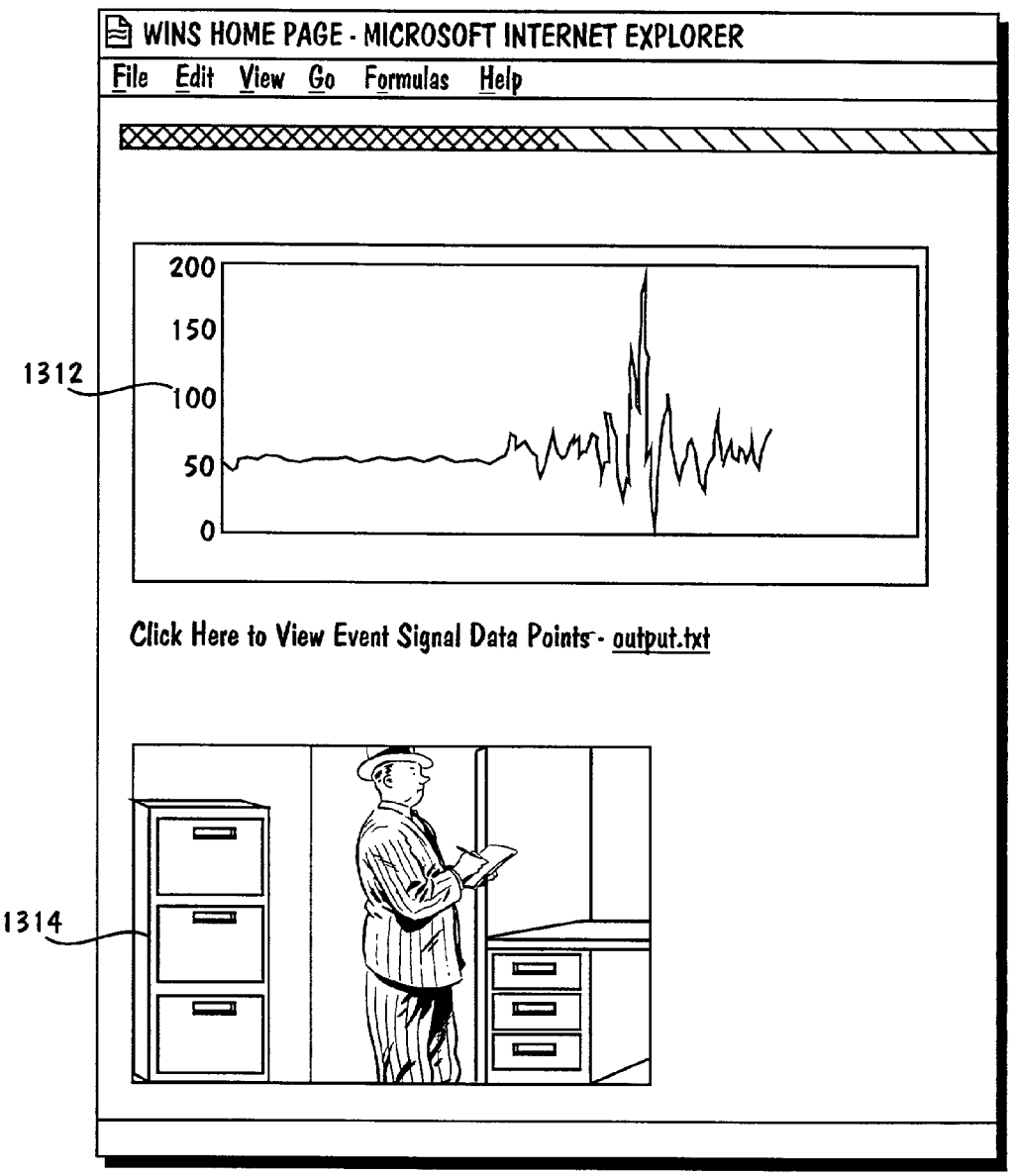

Indeed, it is through exploitation of the application that low-power design becomes possible. It is not necessary to perform general purpose signal processing in all of the nodes, nor do the networks need to be general-purpose and high-bandwidth. FIGS. 12 and 13 show browser screen images or pages associated with remote Internet operation of a WINS node of an embodiment.

In this system, the WINS node includes two sensors with seismic and imaging capability, but is not so limited. The seismic sensor is constantly vigilant, as it requires little power. Simple energy detection is used to trigger the operation of the camera. The image and the seismic record surrounding the event are then communicated to a remote observer. In this way, the remote node need only perform simple processing at low power, and the radio does not need to support continuous transmission of images. The networking allows human or machine observers to be remote from the scene, and allows archival records to be stored. The image data allows verification of events, and is usually required in security applications that demand a human response. Both the seismic record 1202 and 1312 and an image creating the record 1204 and 1314 are shown. FIG. 12 shows a vehicle 1204, and FIG. 13 shows a running individual 1314.

The WINS node and WINS gateway node control web pages permit direct and remote control of event recognition algorithms via the WINS network and the Internet. For example, the seismic energy threshold for triggering an image is controllable remotely. WINS NG node control and management web pages, respectively, provide networking, communication, sensor signal processing, and sensor interface reconfigurability. A user wishing to modify the WINS NG protocols, node code and data objects, and to deploy new code libraries does so using the WINS NG Web Assistant, but is not so limited.

Figure 14:
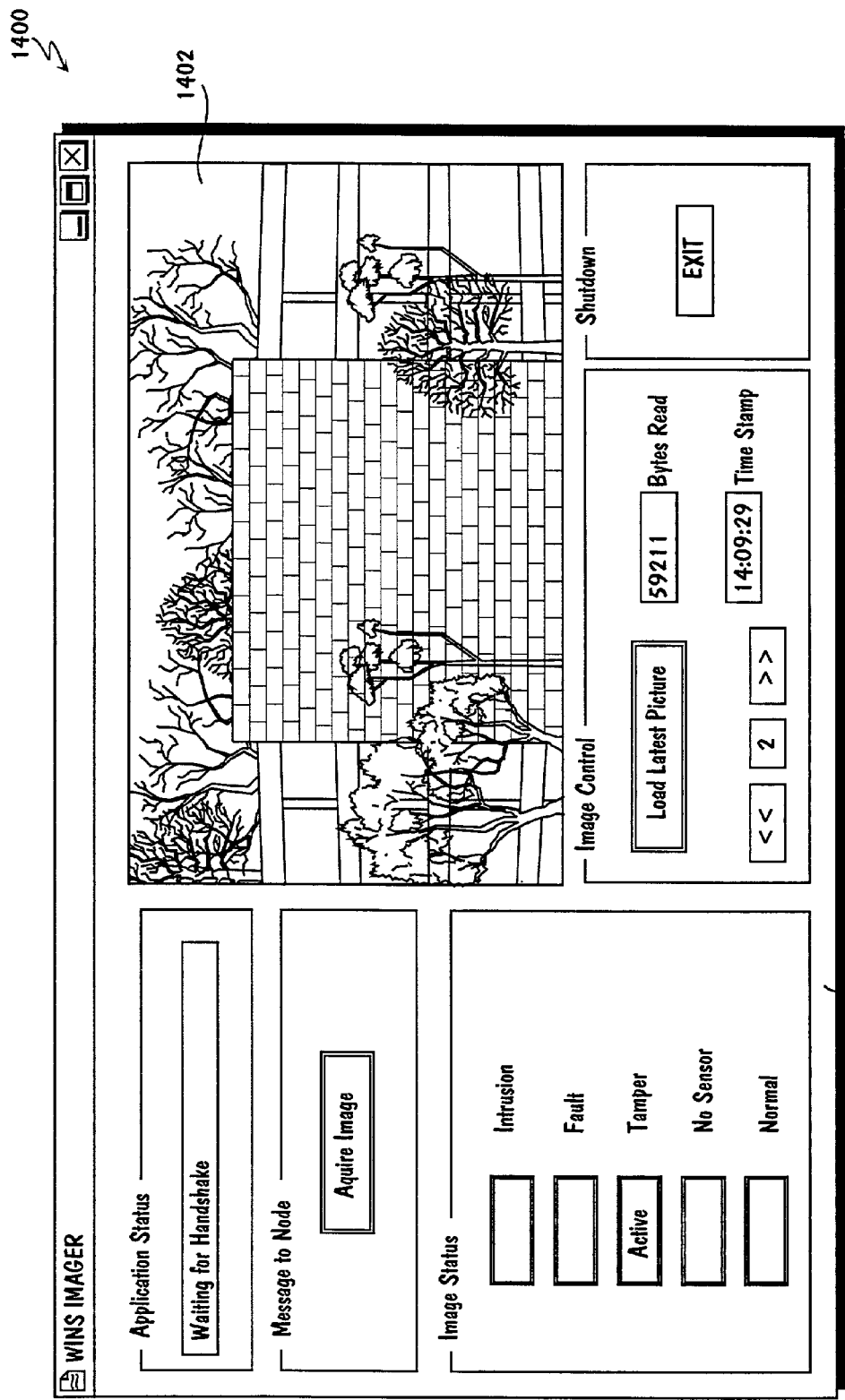
FIG. 14 is a browser screen image of an embodiment including an acquired image.

When using a visible WINS imager, the browser screen image displays a user interface with an image acquired from the camera. FIG. 14 is a browser screen image 1400 of an embodiment including an acquired image 1402. The user interface 1404 of an embodiment allows the user to zoom and pan through the image, as well as to apply image processing functions. In an alternative embodiment, the number of images transmitted is further reduced with an increased sensor suite of short-range detectors (e.g., infrared or magnetic), or by adding more sophisticated processing within the nodes. Different applications demand quite different solutions, many of which are accommodated within the hierarchical processing framework. For example, images might be queued at nodes pending decisions from groups of sensors. With the addition of satellite communication interfaces, the sensor network may be located at any point on the globe and the remote client access and control may occur from any other point and with a large number of users.

Figure 15:
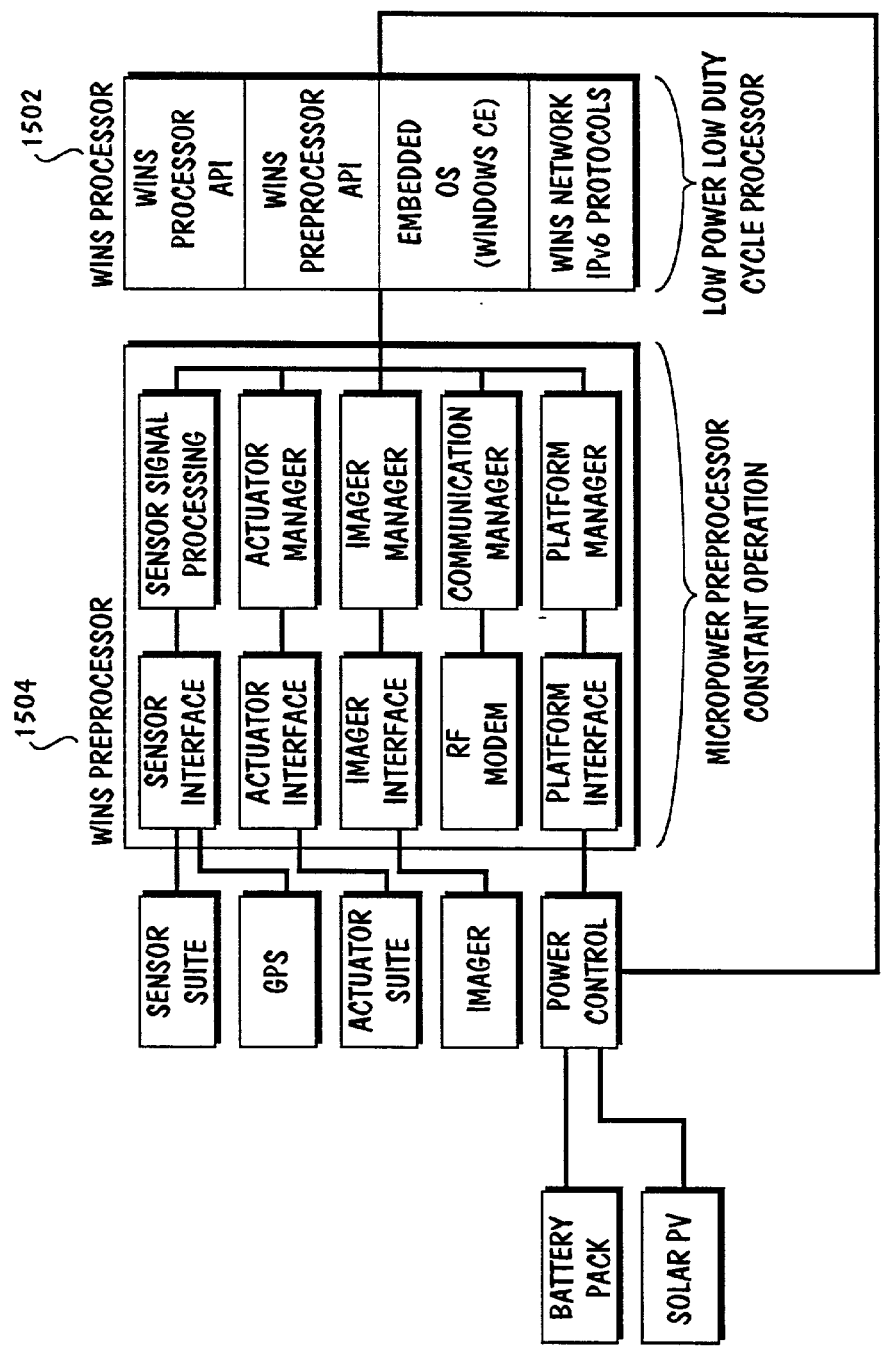
FIG. 15 is a block diagram of a WINS NG node of an embodiment that enables rapid development of high performance signal processing applications, while preserving low-power operation.

FIG. 15 is a block diagram of a WINS NG node of an embodiment that enables rapid development of high performance signal processing applications, while preserving low-power operation. The WINS processor 1502, is a low power, low cost, conventional microprocessor system with a well-supported standard operating system platform. The WINS preprocessor 1504 is a low power system that includes sensing, signal processing, communication, and platform management hardware and firmware. In addition to the sensing and communication functions, the platform management capability enables the WINS preprocessor 1504 to manage the WINS processor 1502 power and operation maintaining low duty cycle, and therefore, low energy.

Figure 16:
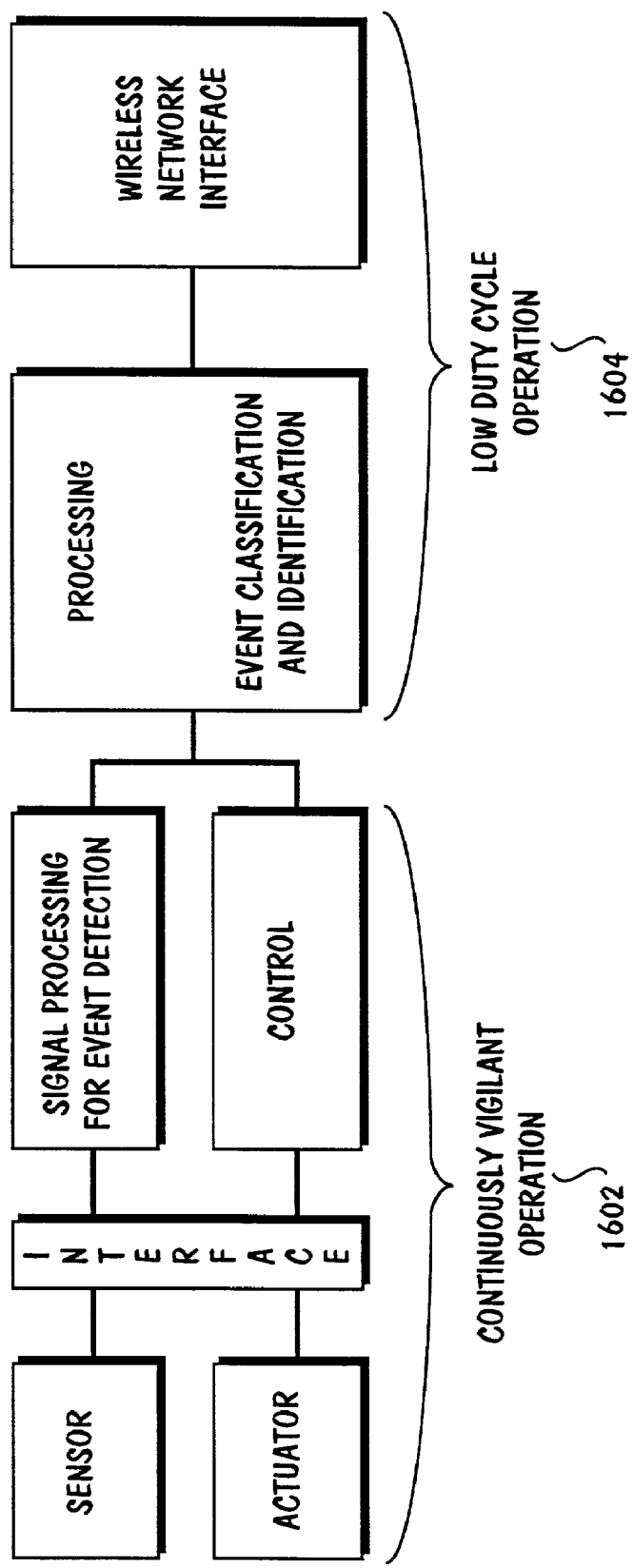
FIG. 16 shows the WINS NG architecture partitioning of an embodiment.

FIG. 16 shows the WINS NG architecture partitioning of an embodiment. The WINS NG architecture partitioning provides critical advantages for operating power and performance, rapid software system development, and upgrade capabilities. First, the WINS preprocessor platform management control enables the WINS node to selectively operate in a state of continuous vigilance 1602. For continuous monitoring, the WINS preprocessor operates its micropower sensing, and signal processing, and actuator control front end continuously. However, the WINS preprocessor also manages the WINS Platform 1604 and enables its cycling into and out of a power-down state. This enables the WINS processor to operate at low duty cycle 1604. The preprocessor also provides supervisory functions for the processor and memory systems, providing additional levels of robustness, and also supervising radio and other communications systems operation. The WINS processor is available when required, for the computationally intensive functions of signal identification, cooperative behaviors, database management, adaptation, reconfiguration, and security functions. By moving these functions to a general purpose processor, software development is eased. In another embodiment, some of the more frequently invoked of these functions can be performed by special purpose processors, to reduce power consumption at the cost of reduced flexibility.

By encapsulating the sensing, communication, and platform functions, the WINS NG architecture also provides a critical advantage for development. In conventional single processor architectures, the WINS developer would be faced with the requirements of managing real-time sensing and actuation threads while operating in the background on essential high level functions. The WINS NG architecture enables the developer to choose between multiple paths. For example, the developer may focus completely on high level information technology research and development while exploiting full access to the physical world via open interfaces. Alternatively, the developer may choose to build low level applications, (in addition to high level systems) by working through the WINS preprocessor open interfaces. By encapsulating real-time function details, development resources may be focused on delivering the most valuable software information technology products.

The WINS NG architecture permits multiple upgrade and modification paths. The preprocessor includes standard interfaces including serial interfaces. This permits the preprocessor to be used with the processor (a Windows CE platform in one embodiment), or a wide range of other platforms, for example, open source embedded operating systems or Linux. The WINS NG node can be upgraded or modified by substituting the processor component or upgrading only the preprocessor.

An embodiment of the WINS NG gateway includes a WINS NG Radio Frequency (RF) modem. In this gateway, the WINS NG sensing functions are replaced by network gateway functions for the interface between the low power distributed sensor network and a 10 Mbps Ethernet 10baseT networks, as described herein. Other embodiments of the WINS NG gateway can include access and support of a plurality of wired networks, long range tactical radio networks (e.g. satellite communication), and/or access to telephony.

Figure 17:
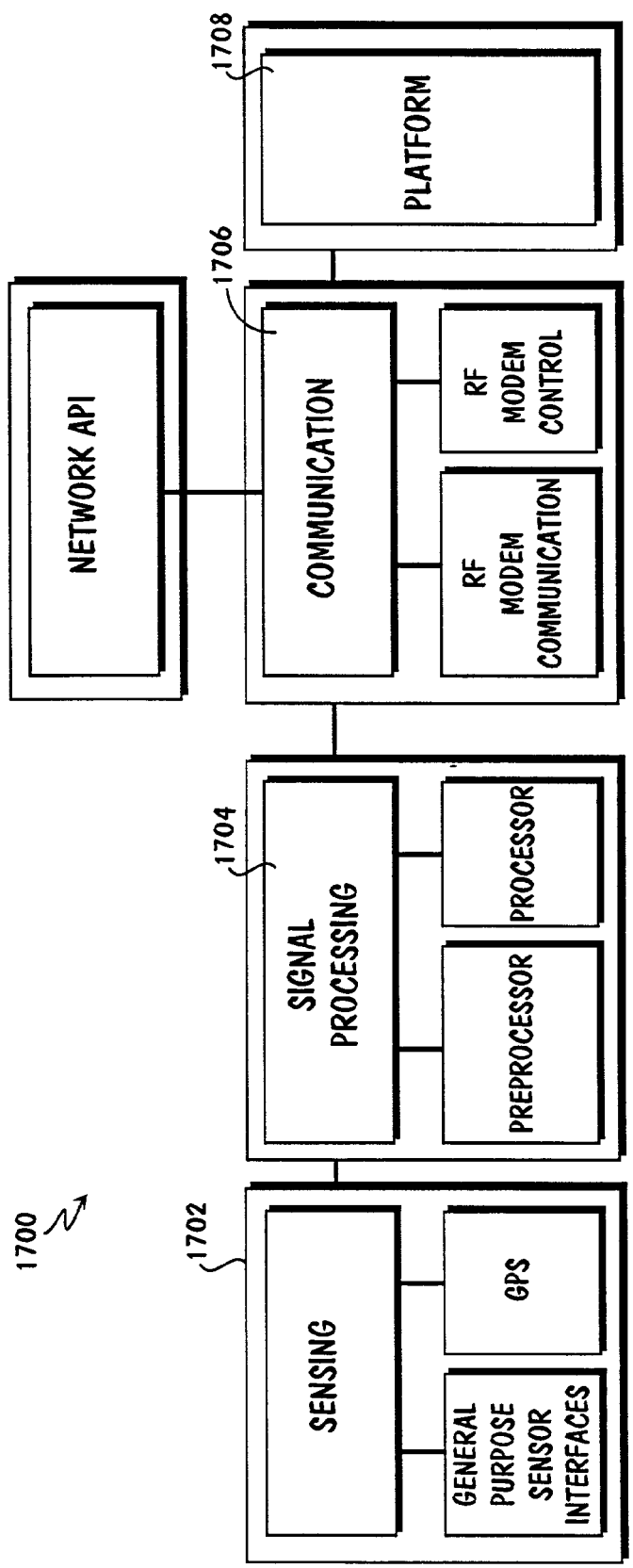
FIG. 17 is a block diagram of a WINS NG application programming interface (API) of an embodiment.

FIG. 17 is a block diagram of a WINS NG API 1700 of an embodiment. The WINS NG API provides the capability for development of tactical sensing applications with the WINS NG Platform. The API includes sensing 1702, signal processing 1704, communication 1706, platform control 1708, and networking, but is not so limited. The WINS NG API receives resource usage parameters from lower-levels or physical layers of the network. Furthermore, parameters that set priorities for signal processing, information routing, and resource usage through the network flow down from the API layer to the physical layers. Thus, the WINS NG API framework makes it convenient to operate an any subset of these levels.

Figure 18:
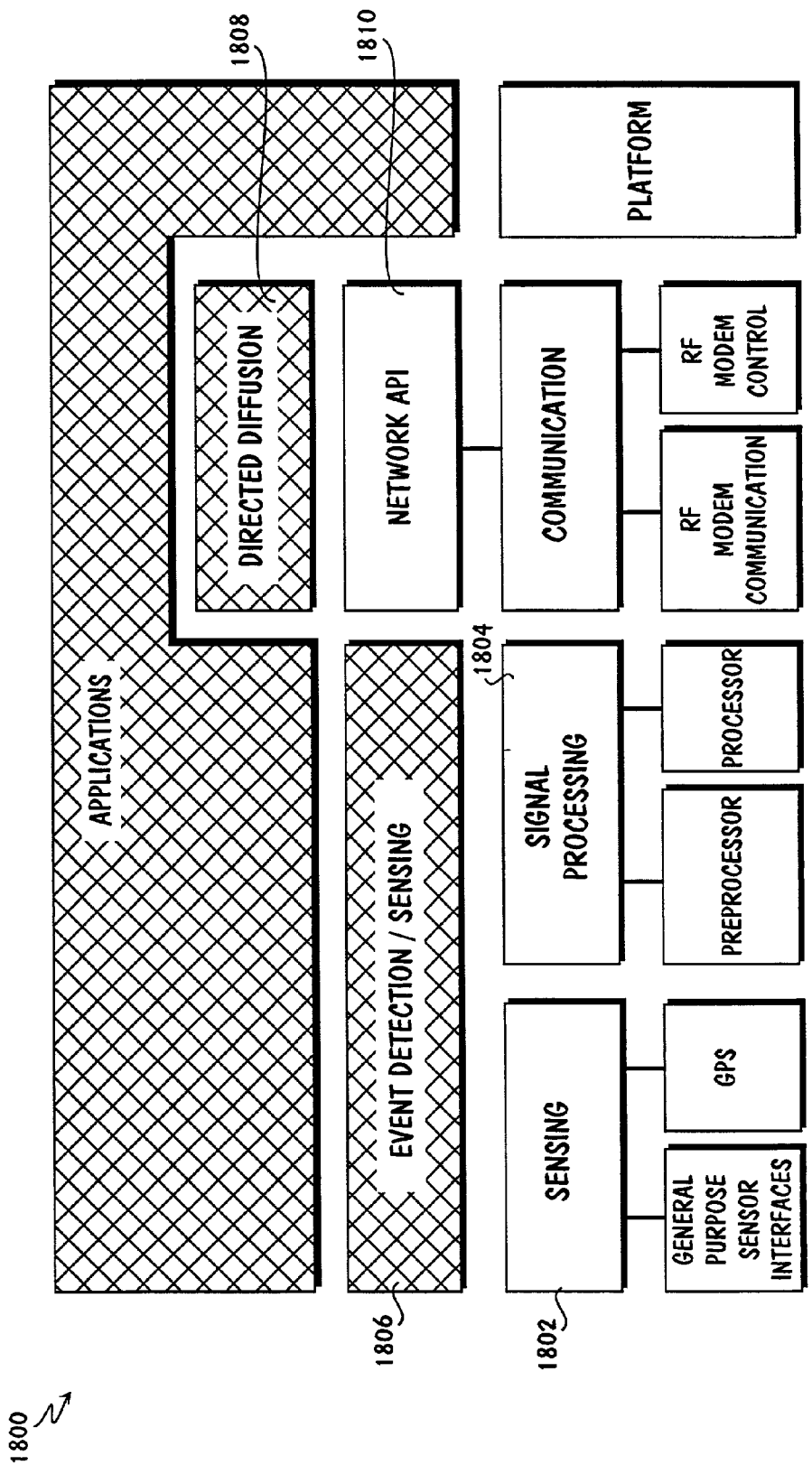
FIG. 18 is a block diagram of a distributed system application of an embodiment.

FIG. 18 is a block diagram of a distributed system application 1800 of an embodiment. The tactical sensor application provides novel sensing 1802, signal processing 1804 and event detection 1806 methods that rely on cooperative sensing exploiting database technologies for non-local event correlation. In addition, networking methods relying on methods including directed diffusion 1808 are supported, by reporting physical parameters such as link quality of service, energy costs, message priority, and other variables related to computational or communications resources through the WINS NG network using the APIs 1810. The complete distributed system application of WINS NG combines this technology with remote server and remote user access systems.

A description of individual components and functions of the WINS NG API of an embodiment follows.

a. BOOL Gate_Acquisition: Initiates data acquisition by a Sensor Interface Processor. Sampled data is transferred to a data buffer in the preprocessor. Member variables include: Initial measurement gain (which may be later updated by automatic gain control (AGC) if AGC is enabled by SET_AGC), channel select, sample rate, and number of samples. This function is used for continuous or burst sampling of data with signal processing and other functions operating in the preprocessor. This is appropriate for low power operation in a continuously vigilant state.

b. BOOL Gate_Streaming_Acquisition: Initiates data acquisition by the sensor interface processor. Sampled data is transferred to a data buffer in the processor. Member variables include: Initial measurement gain (which may be later updated by AGC if AGC is enabled by AGC_SET), channel select, sample rate, and number of samples. This function is used for continuous or burst sampling of data with signal processing and other functions operating in the processor. This is appropriate for development, testing, and operation in a high performance alarm state.

c. BOOL Set_AGC: Enables and configures Automatic Gain Control (AGC) state. Member functions and variables include: Enable AGC, high level amplitude threshold, low level amplitude threshold, sampling window number of samples, and filter settings. This function configures the AGC system. A high level threshold value determines the time-averaged amplitude level of input signals above which a lower input gain value is applied. A low level threshold value determines the time-averaged amplitude level of input signals below which a higher input gain value is applied. Time averaging of signals is set by the sampling window number of samples. The high and low level thresholds may be equal, or separated to create a hysteresis in operation to avoid frequent and unnecessary changes in gain value. A filter may be applied to input signals to focus AGC control on a particular frequency band.

d. BOOL Set_Alarm_Trigger: Enables and configures the Alarm Trigger function state. Member variables include: high level amplitude threshold, low level amplitude threshold, sampling window number of samples, and filter settings. This function configures the Alarm Trigger system. A high level threshold value determines the time-averaged amplitude of input signals above which a Trigger signal is generated. A low level threshold value determines the time-averaged amplitude level of input signals below which a Trigger Signal is generated. Time averaging of signals is set by the sampling window number of samples. The high and low level thresholds may be equal, or separated to create a hysteresis in operation to avoid frequent and unnecessary changes in gain value. A filter may be applied to input signals to focus Alarm Trigger attention on a particular frequency band. The Alarm Trigger signal may be used to initiate operation of WINS NG platform operations due to the receipt of an input signal amplitude excursion. Use of this function permits algorithms to control power status and reaction to potential threat-induced signals.

e. BOOL Transfer_Data_Buffer: Initiates transfer of preprocessor data buffer to processor. Member variables include channel select. This function is used for transfer of buffered sensor data stored in the preprocessor. An example application of this function is the acquisition of data streams occurring prior to an alarm condition.

f. BOOL GPS_CONFIGURE: Enables and opens a configuration channel to a GPS device. Configuration commands include the standard NMEA (National Marine Electronics Association) GPS function calls.

g. BOOL GPS_COMMAND: Opens a command and data acquisition channel to a GPS device. Command and data acquisition commands include the standard NMEA (National Marine Electronics Association) GPS function calls including: UTC Time, Latitude, Longitude, Course over ground, and ground speed.

h. BOOL SPECTRUM ANALYZER: Computes power spectral density (PSD) of sensor data time series record of length $2^N$. Variable window choices, and PSD averaging are selectable.

i. BOOL FIR_GEN: Generates or computes FIR filter coefficients for specified filter characteristics.

j. BOOL FIR_Filter: Operates on sensor data time series input and computes filtered output according to FIR filter coefficients. Coefficients may be stored, communicated to the WINS NG node, or computed locally.

k. BOOL INITIALIZE_WINS_RF_MODEM: Initializes RF modem operation and sets RF modem configuration. Member variables and functions include: Addressing mode selection (Unicast or Broadcast), Packet retransmission attempt count, Master or Slave mode selection, and RF Section Enable. Packet retransmission attempt count is the number of automatic retransmission attempts in the event of packet errors. In the Master operating mode, the node controls the frequency hopping pattern for all participating nodes within reception range. In the Slave mode, the node acquires and follows the hopping pattern of a Master. Radio frequency Section Enable allows control of receive and transmit RF sections. This is useful for power management of communication functions.

l. BOOL NODE_IN_RANGE: Indicates whether the node received signal strength is at a level sufficient to support link to the gateway.

m. BOOL RECEIVE_DATA: Returns array with current RF modem receive data buffer values. Includes source address of received packet.

n. BOOL TRANSMIT_DATA: Transmits data buffer to RF modem and initiates communication to remote node or gateway.

o. BOOL Node_Search: Initiates search of network for participating nodes that are in range of and have been acquired by the local gateway.

p. BOOL Node_Cluster_Report: Returns list of node addresses and gateway address for local node cluster q. BOOL WINS_Modem_Power_Control: Sets WINS RF Modem power state (selections include full power, standby, and power off). This is applied for power management of the RF Modem in TDMA networks.

r. BOOL Modem_GPS_PowerControl: Sets power state of the GPS device. This is applied for implementation of low duty cycle clock or position updates.

s. BOOL Processor_Power_Control: Sets power state of the processor. This function enables the processor to enter a suspend state (e.g., at 0.1 percent of full power) for a specified period. This function also provides a supervisory reboot capability for the processor.

These APIs also enable preprocessor control of the processor, in the form of a software watchdog. The processor operating system can fail during operation due to application software errors that are not apparent at compile time. To ensure a robust and reliable platform, in an embodiment a software watchdog is run on the preprocessor that periodically sends "ping" commands to the processor. If the processor does not respond with an acknowledgement within a specific time period as configured by the application programmer, the preprocessor has the ability to reboot the processor.

The APIs further enable programming of the preprocessor in more convenient forms than assembly code. For example, hosted on the processor, WINS Basic is a macro language that supports programming of the preprocessor at a very high level. It provides a mechanism that enables execution of numerous code modules that pre-exist on the preprocessor, thereby hiding the challenges of real-time programming at the preprocessor level. WINS Basic can handle platform management, communication, networking and sensing, or it can be extended to fit custom requirements, as more experienced software developers can enhance or create new software modules for the preprocessor.

The language operates by mapping processor level functions to preprocessor level software modules. Executing a WINS Basic function on the processor generates a command that is sent to the preprocessor, which in turn calls the appropriate software module. Support for passing parameters to such a module is also provided. Collectively, a sequence of processor level functions forms a WINS Basic program that executes on the preprocessor and features unique behaviors desired by the processor level programmer.

WINS Basic programs run in two basic fashions. First, as WINS Basic functions are called on the processor, the preprocessor simultaneously executes corresponding software modules. Second, a series of functions on the processor are mapped into preprocessor commands and sent to the preprocessor collectively. The preprocessor stores this information as a WINS Basic program in dynamic memory. A programmer wishing to launch a program simply calls a run function on the processor that instructs the preprocessor which WINS Basic program it should execute.

The layered architecture together with the APIs of the WINS NG embodiment thus enable developers to work at the level of the processor, the preprocessor, or both, making use of a variety of development tools. In particular, in an embodiment, developers may make use of the widely available and low-cost Microsoft Windows CE™ tools. These include: MS Visual Studio™ including MS Visual C++™, MS Windows CE Toolkit for Visual C++™, and the Microsoft Developers Network (MSDN) subscription which provides valuable references. The WINS NG Development Platform can be a conventional PC with the Windows NT Workstation™ or Windows NT™ operating system. Development may be done using the Windows CE platform emulator provided in the Toolkit above. Also, development may be accomplished via serial (and ethernet) link to the processor. The Toolkit includes program upload and remote diagnostics tools including a remote debugger, process viewer, and other tools. When working at this level, developers are shielded from real-time operator system concerns, and may program in high-level languages for greater efficiency. Additionally, operating systems may be supported, with the development of the appropriate APIs.

The preprocessor development is optional. The WINS NG API supports access to all sensing, communication, and platform control functions. Other embodiments provide API upgrades that add additional functionality. One to available tool for development at the preprocessor in this embodiment is Dynamic C™ from Z-World.

Regarding the electronics employed in an embodiment of the WINS NG nodes, the sensors and sensor interfaces meet the specifications of devices used in the leading Department of Defense reference tactical sensor data acquisition systems. These sensor systems meet or exceed the performance of the tactical sensors that are currently in the field. The threat detection sensors include seismic, acoustic, and infrared motion devices. Global Positioning System (GPS) modules are included as well for location and time references. In this embodiment of the WINS NG node, up to four sensors may be attached, with software controlling which sensor is sampled. Each WINS NG node carries a GPS receiver. Sensors may be located near the WINS NG node but need not be located directly on or in the WINS NG package. This provides critical deployment flexibility for optimally locating the tactical sensor because frequently the typical node package is not optimally located for seismic, acoustic, or infrared motion sensing. Examples of sensors that can be used include, but are not limited to: geophones for seismic detection; infrared sensors based on pyroelectrics; and compact electet microphones for acoustics. The GPS unit supports standard National Marine Electronics Association (NMEA) protocols.

Figure 19:
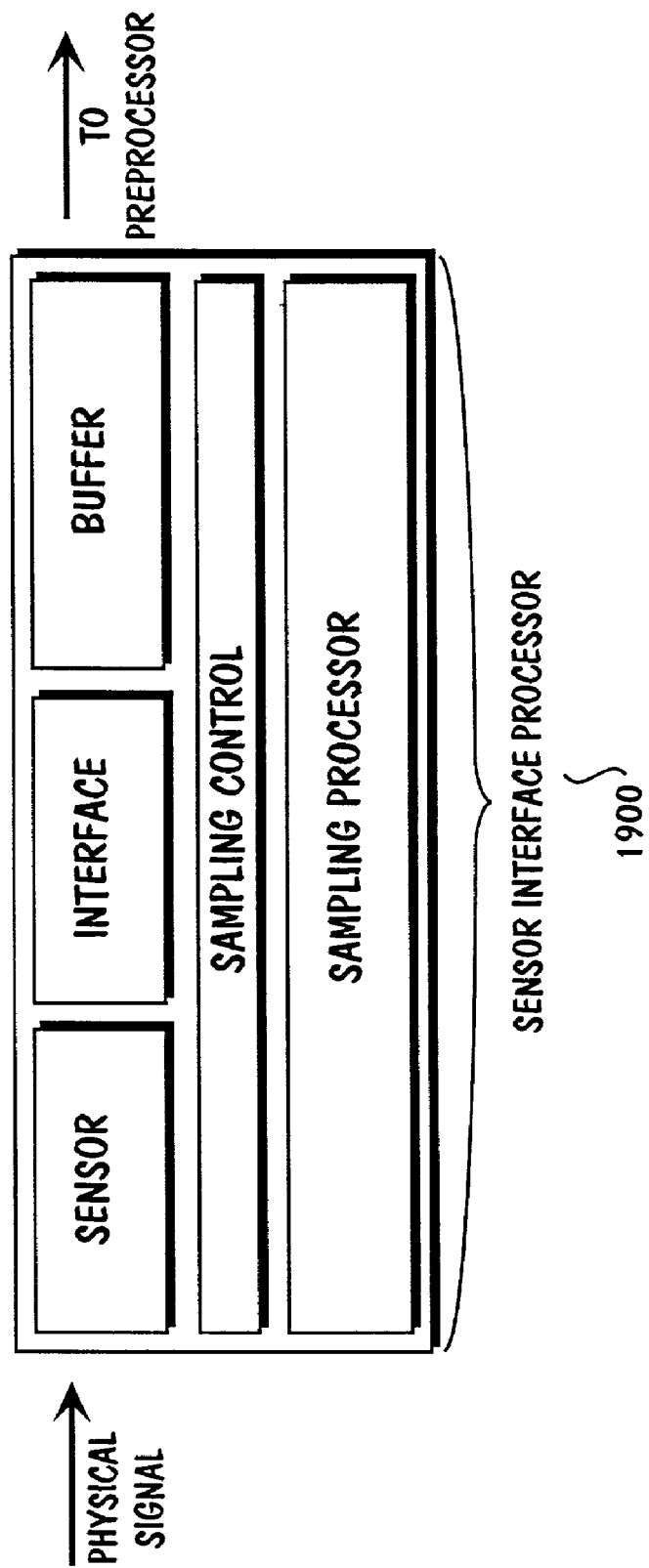
FIG. 19 is a block diagram of a Sensor Interface Processor (SIP) of an embodiment.

In an embodiment, the WINS NG preprocessor is a multi-processor system that includes a Sensor Interface Processor (SIP) and a Control Processor. FIG. 19 is a block diagram of a Sensor Interface Processor (SIP) 1900 of an embodiment. Sensors are coupled to the WINS NG Sensor Interface Processor (SIP) 1900, which operates as a component of the preprocessor. The SIP 1900 includes sensor preamplifiers, anti-aliasing filters, analog multiplexers, data converters, digital buffers, and dedicated processors. The SIP 1900 ensures the ability to acquire synchronous sampled sensor data. In an embodiment, the analog input has variable gain, the anti-aliasing filter is programmable for different sampling rates, an RS232 Serial port is provided for GPS (or other uses if GPS is not present), and there is a digital input/output with 8 uncommitted digital lines.

The control processor can be implemented using a low power processor such as the Z180, supplemented by flash memory and static random access memory (SRAM), three serial ports at the SIP 1900, and a real time clock. This allows the preprocessor to exercise functions such as wake up for the processor, so that the latter can be in sleep mode with high duty cycle, conserving energy.

The processor can be any of a number of commercial platforms, such as the Uniden PC-100 or equivalent. It is supplemented by random access memory (RAM) and read-only memory (ROM). In one embodiment, the processor system also includes a serial RS-232 port, Compact Flash Slot, user interfaces in the form of Display, Touch Screen, Microphone, Audio Output, and employs as its Operating System Windows CE 2.0. If the node is to serve as a gateway, it can include a gateway Ethernet interface, using for example a compact flash card Ethernet network interface adapter, supporting NE2000 Compatible 10baseT Ethernet Interface (IEEE 802.3), using twisted pair cables, a standard RJ-45 8-pin female connector, and interfacing to the Compact Flash slot at the WINS NG processor.

The WINS NG system can operate with a constantly vigilant preprocessor sampling all sensor data. The preprocessor is responsible for data acquisition as well as alert functions. Specifically, in the event that a threshold excursion is observed, the preprocessor detects and alerts the processor. The processor, which may have been operating in a sleep state, is now available for signal processing and event identification. Further, high level functions including cooperative detection, database transactions and other services may now be negotiated by the processor. At all times, the algorithms may be implemented to minimize power dissipation.

The layering of the processing functions in the WINS NG system enables continuous vigilance at low power operation, while preserving the ability for more sophisticated signal processing on node, and the use of standard software tools for the development of these higher level functions. At the same time, the software interfaces allow access to the levels more deeply connected to the physical world so that the complete processing stack can be tuned. The layering of processing functions extends well beyond the nodes, through cooperative processing among nodes in the sensor network, and through connections to external networks.

Collaborative processing can extend the effective range of sensors and enable new functions while being pursued at many levels of processing. For example, consider target location. With a dense array, one method of tracking target position in an embodiment is for all nodes which detect a disturbance to make a report. The centroid of all nodes reporting the target is one possible estimate of the position of the target; the responses of the nodes might alternatively be weighted according to reported signal strength or certainty of detection. Relatively few bits of information are exchanged per node with this target location method.

More precise position estimates can be achieved in an embodiment by beamforming, a method that exchanges time-stamped raw data among the nodes. While the processing is relatively more costly, it yields processed data with a higher signal to noise ratio (SNR) for subsequent classification decisions, and enables estimates of angles of arrival for targets that are outside the convex hull of the participating nodes. Two such clusters of nodes can then provide for triangulation of distant targets. Further, beamforming enables suppression of interfering sources, by placing nulls in the synthetic beam pattern in their directions. Thus, although beamforming costs more in signal processing and communications energy than the simplified location estimator, it provides additional capabilities.

Another use of beamforming is in self-location of nodes when the positions of only a very small number of nodes are known. The tracking and self-location problems are closely connected, and it is possible to opportunistically locate nodes that would otherwise provide auxiliary information to a target location operation. Thus, targets are used to provide the sounding impulses for node location. Depending on the application, it might be advantageous to use sparse clusters of beamforming-capable nodes rather than a dense deployment of less-intelligent nodes, or it may be advantageous to enable both sets of functions. For example, a sparse network of intelligent nodes can be overlaid on a dense network of simpler nodes, enabling control of the simpler nodes for collection of coherent data for beamforming. The simple nodes might be data collection boxes with flow control capability and limited decision making power; other capabilities are built on top of them by adding appropriate processing and control node networks. Those skilled in the art will realize that there are many architectural possibilities, but allowing for heterogeneity from the outset is a component in many of the architectures.

A WINS NG node can include a radio frequency (RF) modem. In an embodiment, the RF modem includes a frequency hopped spread spectrum system operating in the unlicensed 2.4 GHz industrial, scientific and medical (ISM) band. Specifications for this RF modem include Binary Frequency Shift Keying (BFSK) modulation, frequency hopping among 50 channels, and programmable addressing of 6 byte IEEE 802.3 addresses. The modem operates in a master/slave hierarchy where the master modem provides synchronization for many slave modems. By default, the gateway modem may function as a master. However, this is not required nor always optimal. The master/slave hierarchy can be exploited for design of multihop networks, as described herein, using the ability to promote a modem from a slave to a master state or demote it from a master to a slave state.

In one embodiment, the WINS NG node is contained in a sealed, waterproof system. The package contains the WINS preprocessor, processor, and sensors. Sensors may also be deployed externally to the package, particularly in the case of acoustic and infrared motion sensors. While equipped with rechargeable batteries, a battery eliminator is included with WINS NG for operation during development.

Figure 20:
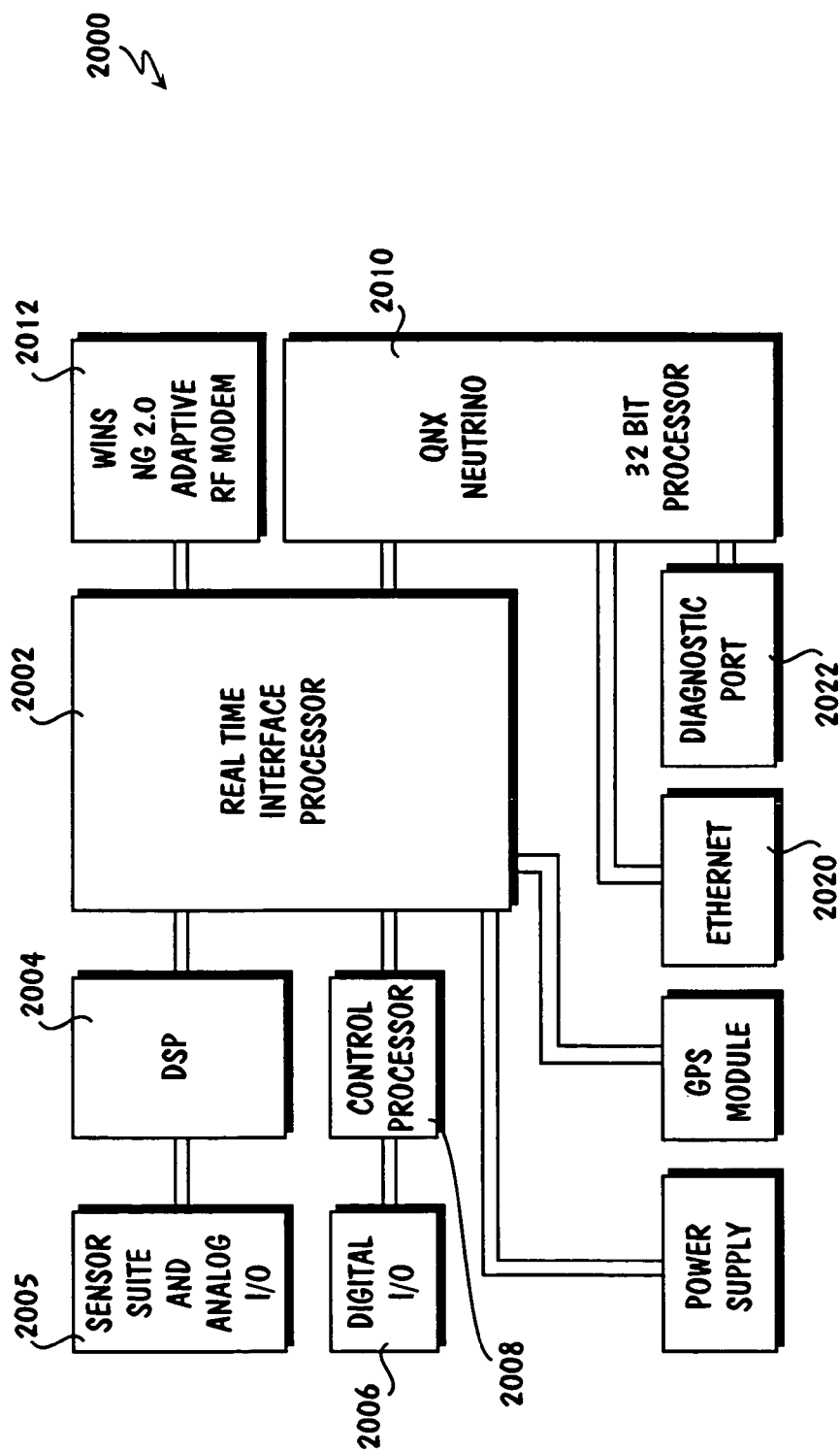
FIG. 20 is a WINS NG node of an alternate embodiment.

FIG. 20 is a WINS NG node 2000 of an alternate embodiment. This node 2000 provides high performance analog sensor sampling, sensor signal processing, wireless network support, a 32-bit application processor and a POSIX-compliant real-time operating system. The node platform includes a real-time interface processor (RTIP) 2002 that supports high-speed multi-port sampling integrated with both a high speed DSP 2004 and direct digital I/O 2006. The RTIP 2002 together with the associated DSPs 2004 and control processors 2008 constitutes the preprocessor of the node. The architecture also includes a 32-bit application processor 2010 with RAM, ROM, and flash memory. Digital I/O and GPS geolocation capability is provided with a coupled active antenna. The wireless network interface includes an adaptive dual mode RF modem system 2012 that provides a solution for scalable, multihop networking with spread spectrum signaling.

The analog sensor interfaces 2005 include two sets of interfaces, but are not so limited. One set provides sampling rates from 1-25 kHz at 12-bit resolution, and the second set provides sampling from 1.88 to 101.1 Hz at 16-bit resolution, both with selectable gains. This provides support for a wide range of sensors. The sensor front-end high-speed input sample rate is accommodated in a power-efficient approach with a dedicated programmable digital signal processor (DSP) 2004, for example the industry standard Texas Instruments 5402. This DSP is supplied with an integrated development environment. The DSP code may be communicated to the platform via a developer port or directly via the wireless network.

The application processor 2010, for example the Motorola Power PC MPC 823 Rev A supplemented by 16 MB RAM and 8 MB flash memory, supports the QNX Neutrino POSIX-compliant, microkernel real time operating system (RTOS). QNX follows the detailed standards set for modern UNIX systems. QNX provides C++ development with STL support as well as Java language support from IBM/OTI. Thus, applications can be readily constructed, and capability is provided for conveniently porting software among nodes. Alternatively, an embedded Linux may be used as the operating system.

Integrated within each node is a dual mode RF modem 2012. The modems 2012 can be integrated into a scalable multi-cluster, multi-hop network. The new dual mode approach solves the long-standing problem that restricts most commercial spread spectrum modem solutions to local cluster/star networks. Here, the modem is a significant advance in that it may simultaneously join two clusters. The system operates in the 2.4-2.4835 GHz ISM band transmitting at 100 mW or 10 mW on dual channels, using frequency hopped spread spectrum with transmission rates up to 56 kbps on each channel. The network is self-assembling to adapt to any deployment configuration in which node-to-node connectivity is established. The system also provides wireline interfaces with both 10 Mb Ethernet and RS-232 serial port access.

Node development can be conducted through the node Ethernet port 2020 or an RS232 diagnostic port 2022. With the QNX Neutrino operating system, standard UNIX tools are available at no cost facilitating software development. Development may be performed in a self-hosted Neutrino environment, on a workstation running QNX. The node can mount a file structure on a remote machine, and development and file transfer is facilitated by the nodes capability to run telnet, tftp, and other file transfer protocols. For development, IBM/OTI Java with IDE, Microanalyzer, and other tools are available.

The WINS NG node of an alternate embodiment is constructed using a modular software framework. This framework enables the development of software that is modular, reusable, and portable across platforms.

Software developed within this framework is composed of modules. A module is a piece of software that presents one or more clearly defined interfaces and maintains internal state. The framework defines a standard form for these interfaces so that modules can be reused by changing the inter-module connections. Interfaces between modules are defined by the types of data they send and receive and, loosely, by the commands they accept. Any two modules that support compatible interfaces can be connected together, enabling activation and data to flow from one module to the other.

For example, consider a framing layer for a network device. The "upper" interface of the module sends and receives packets of data to be framed and sent. The "lower" interface sends and receives buffers of serial data containing framed data packets. The module itself performs the framing and deframing function: buffers arriving from below are parsed to extract data packets which can be sent upwards, while packets arriving from above are composed into frames and sent down. If a system using this framing module needed to change its framing algorithm, an alternative framing scheme could be implemented in a module with identical interfaces and swapped in with no other coding requirements. Modules can even be swapped in dynamically at runtime.

The modular framework is implemented as a single-threaded system with a scheduler, but is not so limited. Before the system is started, it is configured. Module interfaces are coupled together and are registered as event handlers. When the system is running, it waits in the scheduler until an event occurs. Events can be timer expirations or I/O events such as a file descriptor becoming readable or writable. When one of these events occurs, the appropriate handler function is called, and this activation propagates through the network of coupled modules, doing work along the way, and returning error codes on the way back.

Activation and data is passed through module interfaces using callback functions that conform to standard semantics. This interface is defined by three functions:

int recv(void*self, DataType data)
    int unblock(void*self)
    int ctrl(void*self, int function, void*args, int nbytes, int*rbytes)

The recv( ) callback gets called when there is new data that is to be pushed to the module. This method is sometimes called a "push" model. Data arriving at the edges of the system is immediately pushed through the system until it is sent out of the system, consumed, or buffered. The recv( ) callback may return EOK to indicate success, EAGAIN to indicate that the data could not be processed at that time and is to be sent again at a later time, or another error code to indicate an error condition.

The unblock( ) callback gets called when the module coupled to this interface previously refused to accept a pushed message and is now requesting that the message be sent again.

In response to this request, the unblock( ) callback attempts to push more data through the interface by invoking the other module's recv( ) callback.

The ctrl( ) callback gets called when there is an out-of-band control message that is to be sent to the module. The implementation of this callback checks the function code, and if it is a function that the module supports, causes some effect. Arguments may be included in a pointer to an argument buffer, as defined by the implementation.

For convenience, there are three standard methods of the module interface of an embodiment that call through the interface to the callback functions on the other side. These functions are:

int Send(DataType data)→calls recv( )
    int UnblockSend( )→calls unblock( )
    int Ctrl(int function, void*args, int nbytes, int*rbytes)→ calls ctrl( )

Therefore, a module can cause data to flow through associated interfaces to the module on the other side using the Send ( ) call. If buffer space opens up, enabling the module to accept new data, it can signal this with UnblockSend( ) which causes any buffered data to be sent. Ctrl( ) can be used to send a control message through the interface to the other module.

The implementation of modules in an embodiment is formulated as a state machine. The implementation of callbacks and other code within a module does not wait or block. If a delay is required as part of a sequence of steps, a timer is set and the call returns with no delay. The sequence then continues, invoked from a timer callback. In some cases, the outcome of a process cannot be known immediately. In these cases, the message invoking the process will include a callback that is called asynchronously to return a result when the process is complete.

In some cases, the state-machine implementation, while efficient, may be cumbersome. For instances where the task at hand is better implemented procedurally, an independent thread can be encapsulated within the framework. This thread can then make blocking I/O calls through an adaptation layer that connects to the standard module interface scheme.

The nodes of an embodiment are implemented within QNX Neutrino, but are not so limited. The scheduler implementation masks the developer from the system-specific details of timers and de-multiplexing asynchronous I/O events. The inter-module interface also matches quite well to the inter-process file interface defined for device drivers in POSIX systems. This makes it relatively easy to change the location of process boundaries in the system, without changing the design of individual modules. The system-specific layer can also be ported to other operating systems, and can be remoted over a network interface.

WINS NG Network Architecture

In contrast to conventional wireless networks using voice and data protocols to support communication over long ranges with link bit rates over 100 kbps, the WINS NG network supports large numbers of sensors in a local area with short range and low average bit rate communication. The bit rate of an embodiment is less than 1-100 kbps, but is not so limited. The WINS NG network design services dense sensor distributions with an emphasis on recovering environment information. The WINS NG architecture, therefore, exploits the small separation between WINS nodes to provide multi-hop communication.

One embodiment of the WINS NG network uses multihop communication to yield large power and scalability advantages. For example, RF communication path loss has been a primary limitation for wireless networking, with received power, $P_{REC}$, decaying as transmission range. R, as $P_{REC} \propto R^{-\alpha}$ (where a varies from 3-5 in typical indoor and outdoor environments). However, in a dense WINS network, multihop architectures permit N communication link hops between N+1 nodes. In the limit where communication system power dissipation (receiver and transceiver power) exceeds that of other systems within the WINS node, the introduction of N equal range hops between any node pair reduces power by a factor of $N^{\alpha-1}$ in comparison to a single hop system. Multihop communication, therefore, provides an immediate advance in capability for the WINS narrow bandwidth devices. By extension, WINS NG multihop communication networks permit large power reduction and the implementation of dense node distribution.

The WINS NG architecture design addresses the constraints on robust operation, dense and deep distribution, interoperability with conventional networks, operating power, scalability, and cost. Robust operation and dense, deep distribution benefit from a multihop architecture where the naturally occurring short range links between nodes are exploited to provide multiple pathways for node-to-node, node-to-gateway, and gateway-to-network communication. The WINS NG gateways provide support for the WINS NG network and access between conventional network physical layers and their protocols and the WINS NG physical layer and its low power protocols. Multihop communication also enables low power operation by reducing range and exploiting the power-law dependence of received RF signal strength on transmission range. The reduction in link range afforded by multihop communication is of particular benefit to the WINS NG applications that are tolerant of communication latency. Communication latency in the WINS NG network is, in turn, tolerable due to the inherent latency associated with the response of conventional networks. The reduction in link range is exploited in WINS system design to provide advantages that may be selected from the set of: reduced operating power, improved bit rate, improved bit error rate, improved communication privacy through reduction of transmit power, simplified protocols, and reduced cost.

Figure 21:
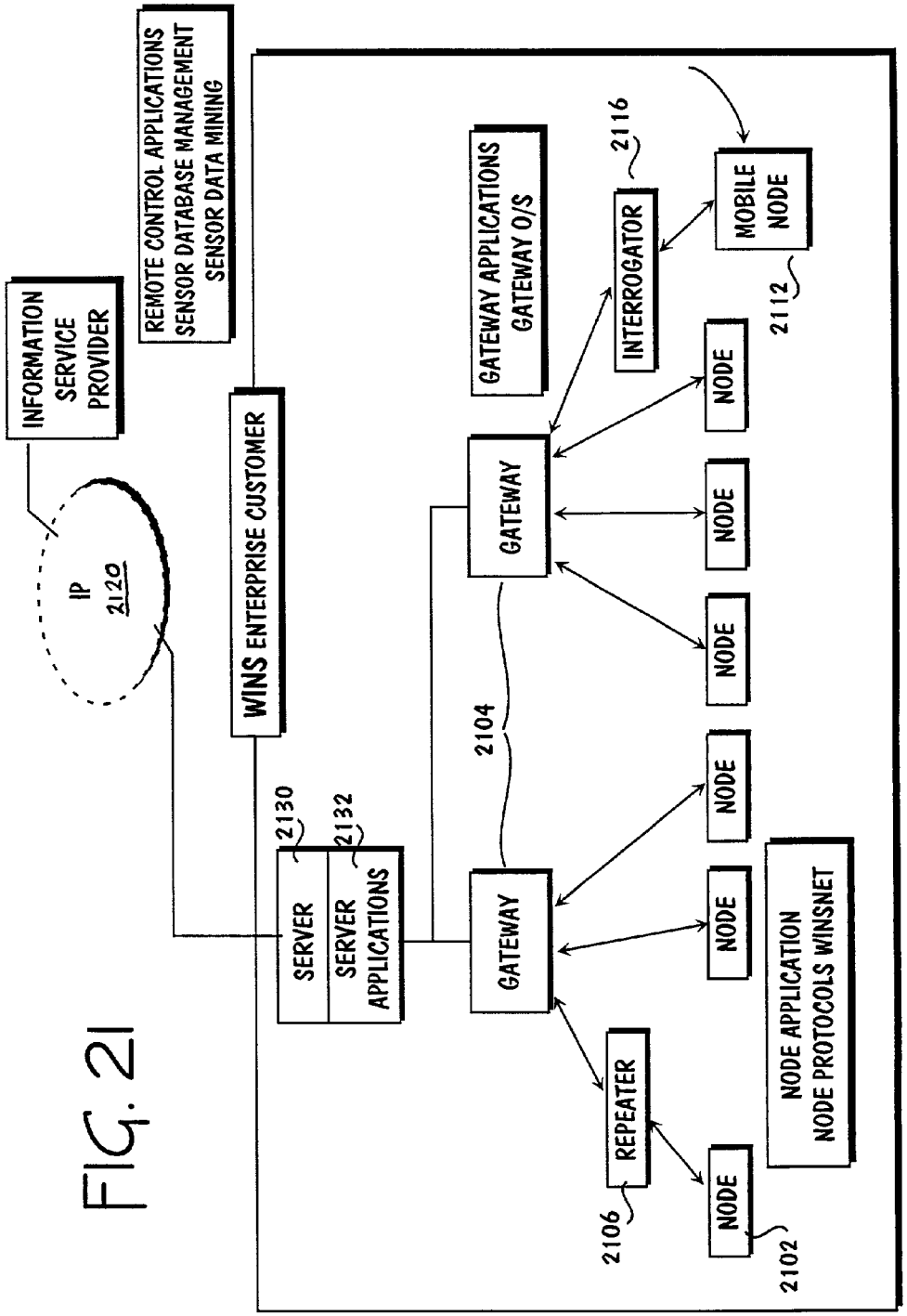
FIG. 21 is a WINS NG network architecture of an alternate embodiment.

FIG. 21 is a WINS NG network architecture of an alternate embodiment. Within this architecture nodes 2102 are coupled to gateways 2104 using repeaters 2106. Furthermore, mobile nodes 2112 are coupled to gateways 2104 using interrogators 2116. The gateways 2104 are coupled to a network 2120 through a server 2130 hosting server applications 2132. The network serves to couple the nodes to an information service provider.

An important capability provided by the WINS technology is enabling a vast, scalable number of sensors to maintain real-time, local contact with the physical world. This is accomplished with access both from the distributed sensor nodes to remote users (such as data centers), and from remote users to nodes. A critical characteristic for distributed sensor networks is the ratio of bits processed at the sensor interface to bits communicated to the user. In such situations, there is no neat separation of signal processing and networking. A figure of merit is the information content per bit. Distributed sensor systems may be scalable only if information technology is applied at the node, gateway, and server to permit large numbers of sensors (e.g., $10^3$-$10^6$) to communicate with relatively few data centers (e.g., $10^1$).

At the sensor node, the information per bit value may become very low. Specifically, in the case of surveillance, in the circumstance that no event, or threat, is present, the bits produced by the sensor interface may carry only background noise. It is optimal in this case if the sensor data is processed, a decision is reached at the node, and a short summary message indicating nominal status is forwarded through the network. While the sensor interface may be sampling at 10 kbps, the actual rate of communication via the network may, on average, only be 0.01-1 bps. This same consideration applies to condition based maintenance where monitoring of equipment may be continuous, whereas the rate of failures may be very low.

Bandwidth in the distributed sensor network of an embodiment is preserved for scalability and energy reasons. In addition, bandwidth is conserved for the migration of code and data objects for management and control. It is critical to note the data sources and bottlenecks where bandwidth considerations apply. Sensors and data acquisition are the data sources. Typical sampling rates are 1 Hz to 25 kHz in various embodiments of WINS NG. This data is only rarely propagated directly through the network. Rather, information processing is applied to reduce data sets and recognize events that occur in the environment, for example, using the layered sequence of operations described previously. After identification, only an agreed upon identifying code (e.g., a codebook pointer) need be propagated through the network.

Sensor node-to-gateway communication is a constraining bottleneck for multiple reasons. These include power constraints associated with node processing and RF communication power, and power and processing constraints at the gateway where information from many nodes may aggregate. The gateway to the remote monitoring site can also be a bottleneck if connected, for example, by low-speed telephony through land-line or satellite. In some embodiments the gateway can link one or more high speed networks, but manage the links using low speed long range connections.

Figure 22:
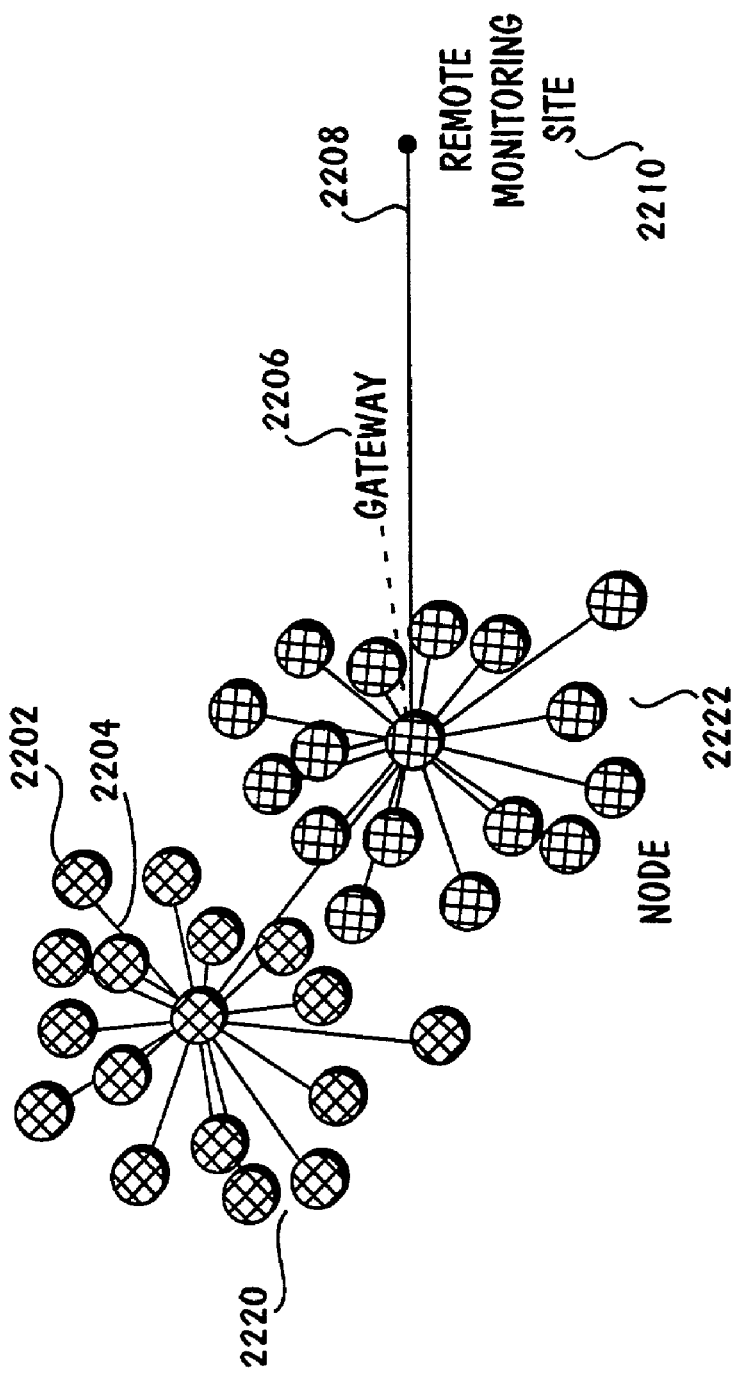
FIG. 22 is a multicluster network architecture supported in an embodiment.

FIG. 22 is a multicluster network architecture supported in an embodiment. In this multicluster architecture, nodes 2202 are dispersed in an environment with local communication 2204 between nodes 2202 and gateways 2206. Long range communication 2208 occurs between the gateway 2206 and a remote data user site 2210 (e.g., using a high power RF modem). In this embodiment, robust, frequency hopped spread spectrum transceivers are employed. The WINS NG RF modems operate in a master/slave hierarchy where the master modem provides synchronization for many slave modems. By default, the gateway modem may function as a master. However, this is not required nor always optimal.

Multihop routing occurs between the clusters 2220 and 2222 that are defined by the current status of the RF modems. Here, two star networks 2220 and 2222 are joined. Nodes from these two networks may be intermingled in space (they are shown as separate networks, for clarity). Note that any modem in the group may perform as a master or a slave RF modem. The configuration shown can vary frequently according to operational requirements of the network and the arrival or departure of nodes.

Scalability challenges in this architecture include constraining the data transfer rate between nodes for reasons that include the bandwidth constraint and power dissipation at the gateway, and bandwidth limitations for the long-range link. Furthermore, there is a scalability issue associated with the arrival of data from many other clusters at the remote monitoring site 2210.

These scalability issues are addressed in the WINS NG network using extensive signal processing at the source, and by the management of the entire network as a distributed and active database. Additionally, these issues are addressed by alternative network topologies, such as multi-hop networks which avoid the bottleneck of the long-range link. Such networks permit multiple paths for propagation of data from a source to an end destination. However, in general, the scalability problem cannot be solved purely at the level of the network; signal processing and data management issues must be addressed.

Figure 23:
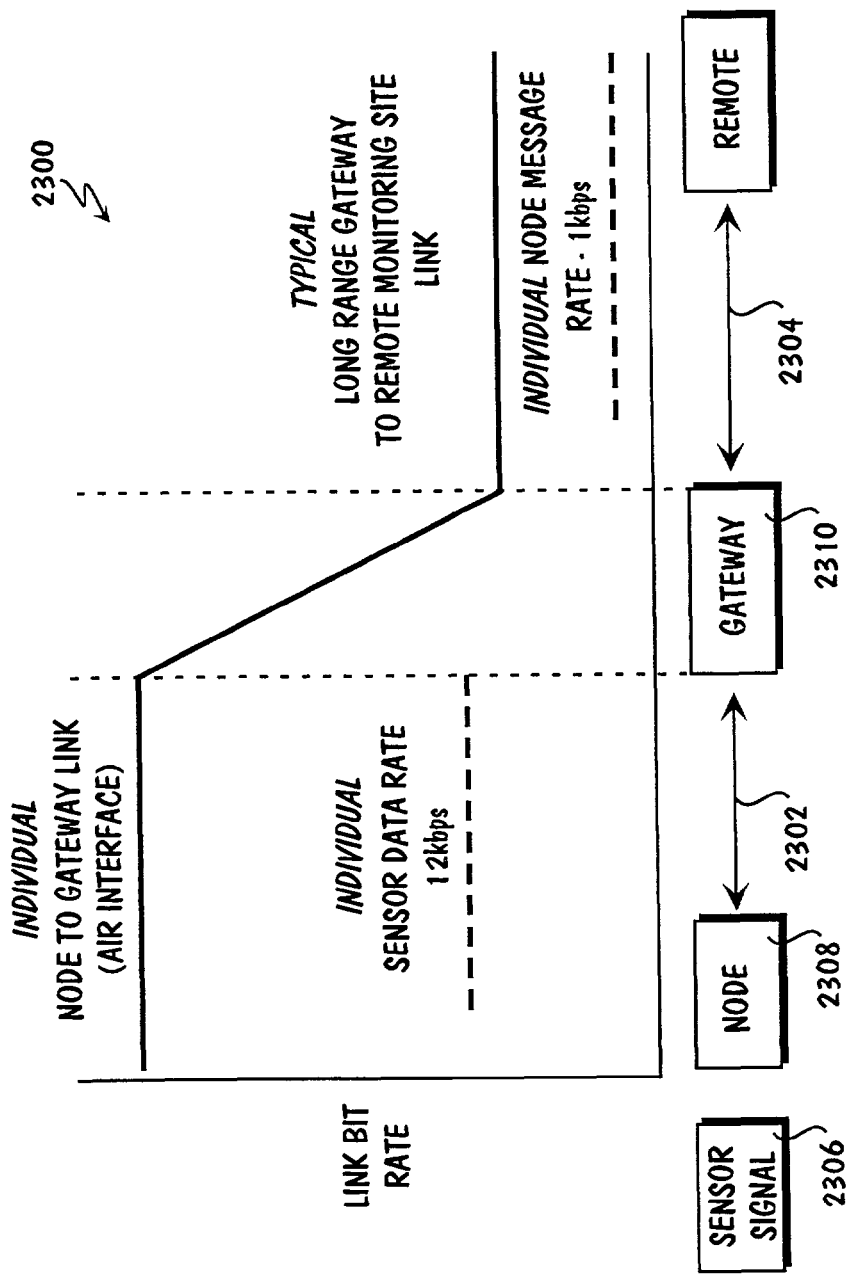
FIG. 23 is a bandwidth budget for a distributed sensor network of an embodiment.

FIG. 23 is a bandwidth budget 2300 for a distributed sensor network of an embodiment. Node-to-gateway communication links 2302 have a higher bit rate than the long range gateway-to-remote monitoring site communication link 2304 due to the large power cost associated with the long-range link. Local communication between nodes, exploiting the higher bit rate at low power associated with the short range link 2302, permits local cooperation among nodes for the purposes of reaching a local event detection and identification solution.

The bandwidth budget 2300 shows the sequence from sensor signal 2306 through node 2308 (corresponding to a maximum rate of 12 kbps, followed by the low power air interface link to the gateway 2310). Finally, after aggregation of data at a gateway 2310, long range, high power RF links 2304 will carry summary messaging. Note that the aggregate sensor data rate is 12 kbps. This provides a significant margin below the node-to-gateway communication link 2302 (with an air interface data rate of 100 kbps). This margin is not normally required since it is the goal of processing at the node 2308 to always reduce this data rate. However, while not advisable for optimal network operation, multiple sensors may simultaneously be queried for testing, and higher rates may be needed on occasion for local cooperative functions, such as beamforming.

The estimated node message bit rate corresponds to the bit rate generated by a cluster of nodes exchanging low duty cycle status and configuration messaging. In an embodiment, the preprocessor to modem interface data rates are lower than the air interface data rate. Applications support the filling of the RF modem transmit buffer over a period, followed by communication of the buffer over a short interval available in an appropriate TDMA frame. Multiple user inputs are allowed at the gateway modem. FIG. 24 shows a WINS NG data frame format 2400 of an embodiment. This data frame format 2400 supports both unicast and broadcast.

The multicluster network is but one of many possible embodiments for the WINS NG network. The layering of software interfaces enables a variety of link-layer protocols that can be used in combination with standard network protocols such as Internet Protocol Version 4 (IPv4) or Version 6 (IPv6). For example, the basic link layer protocol can have a flat hierarchy, and use a wide variety of error correction methods, yet still enable standard protocols to be used from the network layer up. Alternatively, specialized protocols could be employed which take advantage of the APIs that enable access to lower levels in the protocol stack.

Another issue related to scalability is the development of distributed self-organization and reconfiguration algorithms. As a network grows in size, it becomes difficult to centrally organize node connection and deletion, synchronism, resource management, and issues related to network maintenance. Thus, distributed protocols are required for large networks.

Figure 25:
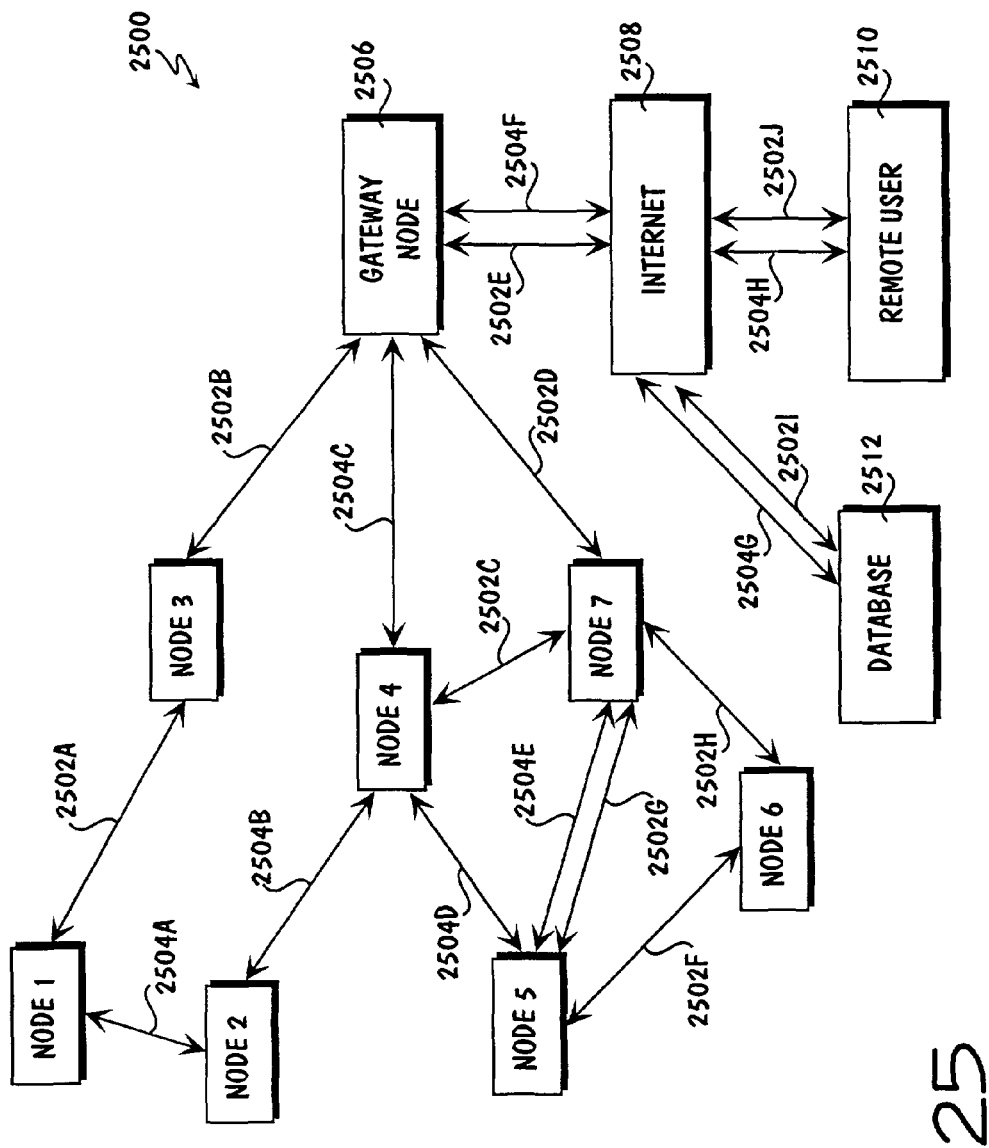
FIG. 25 is an example of self-configuration in a WINS NG network of an embodiment.

FIG. 25 is an example of self-configuration in a WINS NG network 2500 of an embodiment. Network 2500 includes gateway node 2506, database 2512, and remote user interface 2510 connected to Internet 2508. Gateway node 2506 is a gateway to the Internet 2508 for nodes 1-7. The network 2500 is self-organizing with respect to the ability to distribute some combination of information and energy, and in determining where and how the processing and storage are to be accomplished. The network 2500 programs and directs network resources to tasks according to priorities provided to the network in response to the addition and deletion of network resources. The self-organization of the embodiment accounts for heterogeneity and inclusion of interaction with outside resources via networks like the Internet. The network 2500 is treated as a distributed and active database with the entire application built in a distributed fashion. Consequently, there are distributed algorithms for all application components.

The network 2500 is constructed using a distributed resource management protocol that operates on individual elements in order to assemble a complete application. The network 2500 elements may be reused among different applications, or used in multiple classes of applications. For example, connections 2502A-2502J indicate participation in a first class of applications, while the connections 2504A-2504H indicate participation in a second class of applications. Both the first and second class applications are subject to reconfiguration when nodes are added to or deleted from the network.

Figure 26:
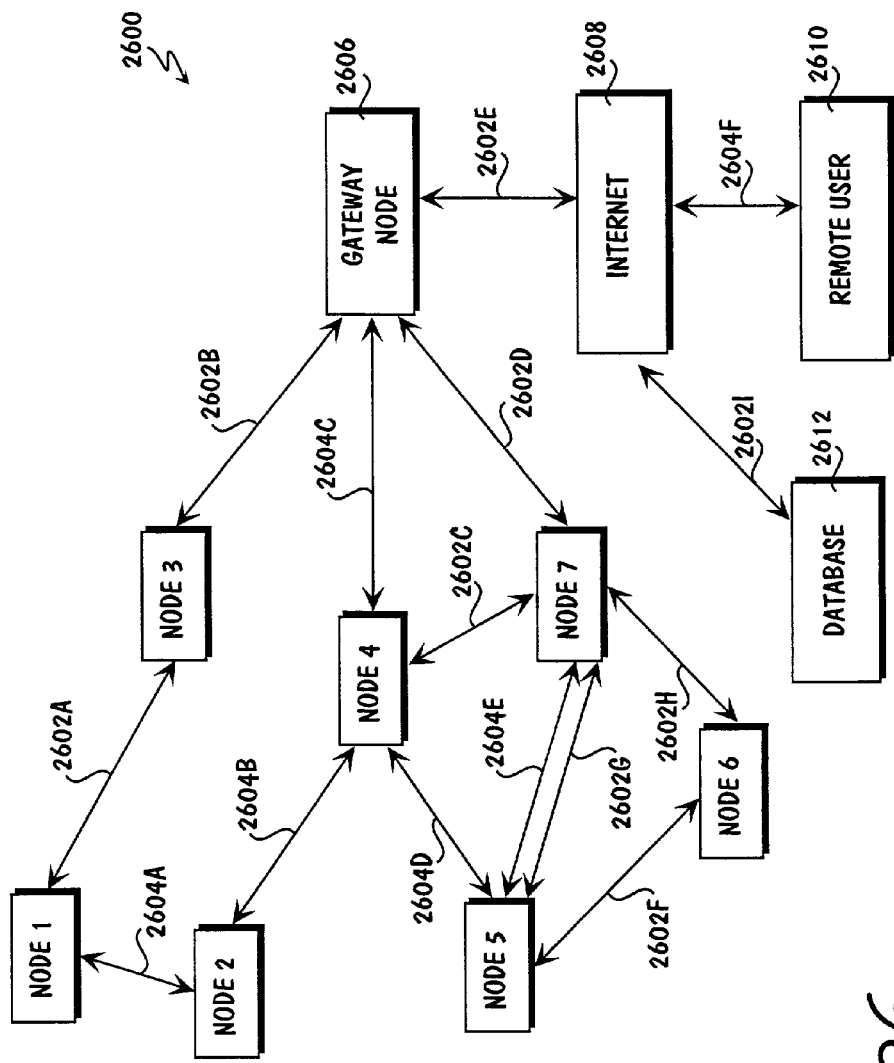
FIG. 26 is another example of self-configuration in a WINS NG network of an embodiment.

FIG. 26 is another example of self-configuration in a WINS NG network 2600 of an embodiment. The network 2600 includes gateway node 2606, database 2612, and remote user interface 2610 coupled to the Internet 2608. Gateway node 2606 is a gateway to the Internet 2608 for nodes 1-7. Construction of complicated combinations of network components is enabled from a small set of basic network components. In enabling this construction, hardware and software are provided for connection of heterogeneous devices that enable all devices in a family to form a network. In this embodiment, the software is designed to support software reconfiguration and upgrades. The protocols for the different classes of nodes may be embedded, but are not so limited.

The network 2600 includes a mixed wireless and wired network, wherein the network 2600 is set up using a self-organizing protocol. The protocol recognizes the difference in power costs for various wired and wireless links and preferentially uses the links with lower power costs when establishing communication routing through the network. The protocol may also take into account remaining energy reserves for nodes on the path, or the priority of the message being carried to determine routing. The gateway nodes enable connections to networks not conforming to the core network hardware and software standards for connection of heterogeneous devices.

Couplings 2602A-2602I represent wired connections and couplings 2604A-2604F represent wireless connections. The same multiple access protocol and baseband modulation techniques are used for both the wired and wireless connections, where the protocol used is one appropriate for the wireless connections. This reduces cost for the communications devices, and while not optimal for the wired connection, its cost (in communication device and energy for usage) is typically far below that of the wireless link. If the wired connection between sensor nodes 5 and 7 is broken or disrupted, the network switches to using wireless communications between nodes 5 and 7, with minimal network disruption. Alternatively, the communication between nodes 5 and 7 may be rerouted through node 6 in order to lower the power consumption associated with the communication.

WINS NG multihop scalability relies upon information aggregation to avoid unbounded bandwidth growth. Specifically, information propagates in one embodiment of a WINS NG network distribution as message packets from information sources distributed within a network to information sinks. As message packets approach an information sink, bandwidth rapidly scales upward. The WINS NG system incorporates node level protocols distributed and managed by the WINS NG database that aggregate messages into compact forms, thus drastically reducing bandwidth requirements. The assignment of message aggregation protocols occurs along with network assembly. Message aggregation protocols are adaptive to node density, the environment, energy availability, and message urgency. Any such protocol relies upon the APIs being able to make such information available. Aggregation and distribution issues are intimately connected to the data processing and database management procedures in the WINS NG network.

The length of time a particular type of information is stored and how far it is permitted to propagate and with what priority has large implications for resource usage. The WINS NG network protocols provide for management of these issues, as well as dealing with the likelihood of heterogeneous resources in the network.

Information aggregation and data rate management in the WINS NG system benefit from data predistribution. Code and data objects that are anticipated to be needed at a future time are propagated as low priority messages through the network. These objects may then be registered and called upon at a future time. Management of predistribution, via the WINS NG database, enhances system performance.

A WINS network of an embodiment can be regarded as a web of overlapping processes, linked through common resource usage priority sets, which are set by user queries. The APIs enable this network by providing network resource information and message priority information to assets i throughout the network. In this way both centralized and distributed resource management algorithms are enabled. In particular, directed diffusion algorithms are enabled for synchronization, routing, and energy management.

Consider a scenario in which there is a network gateway, and a large number of nodes, not necessarily all of the same type. If there is very little activity, and the application does not demand the gateway be alerted with low latency, then all nodes can be basically asynchronous. Indeed, even the boot-up need not establish tight synchronism. Routing tables back to the gateway can be established with packets being transmitted outwards, and moving on when a link pair comes up. The routing tables record resource usage in transit. Information packets then flow downhill towards the gateways along minimum resource use paths, according to the boot-up packets received by a given node.

Another network application demands frequent traffic to a group of nodes remote from the gateway. It would be inefficient from an energy point of view for all nodes in the intervening space to have to go through timing acquisition for each packet transmitted, and so they proceed to maintain a tighter level of synchronization. This also reduces the transit time for the messages flowing in each direction.

In yet another application, other nodes sporadically exchange information with the gateway. Because the path to the high traffic area is synchronous, it represents a lower energy cost than using multiple asynchronous hops. This other traffic will now tend to get routed through this high traffic path, reinforcing its synchronism. This is true even if latency is not part of the cost function for path selection. It is enough that the synchronism level is energy usage aware, although path reinforcement is greater if low latency is also an issue.

Therefore, the APIs enable different components of the network to operate at close to their minimum cost, with distributed algorithms, and running multiple applications over heterogeneous devices by publishing resource costs and message values. In this way the overall network requirements are not determined by the most demanding application, and performance scales according to the resources available without central planning; hierarchies come and go as the application demands.

Figure 27:
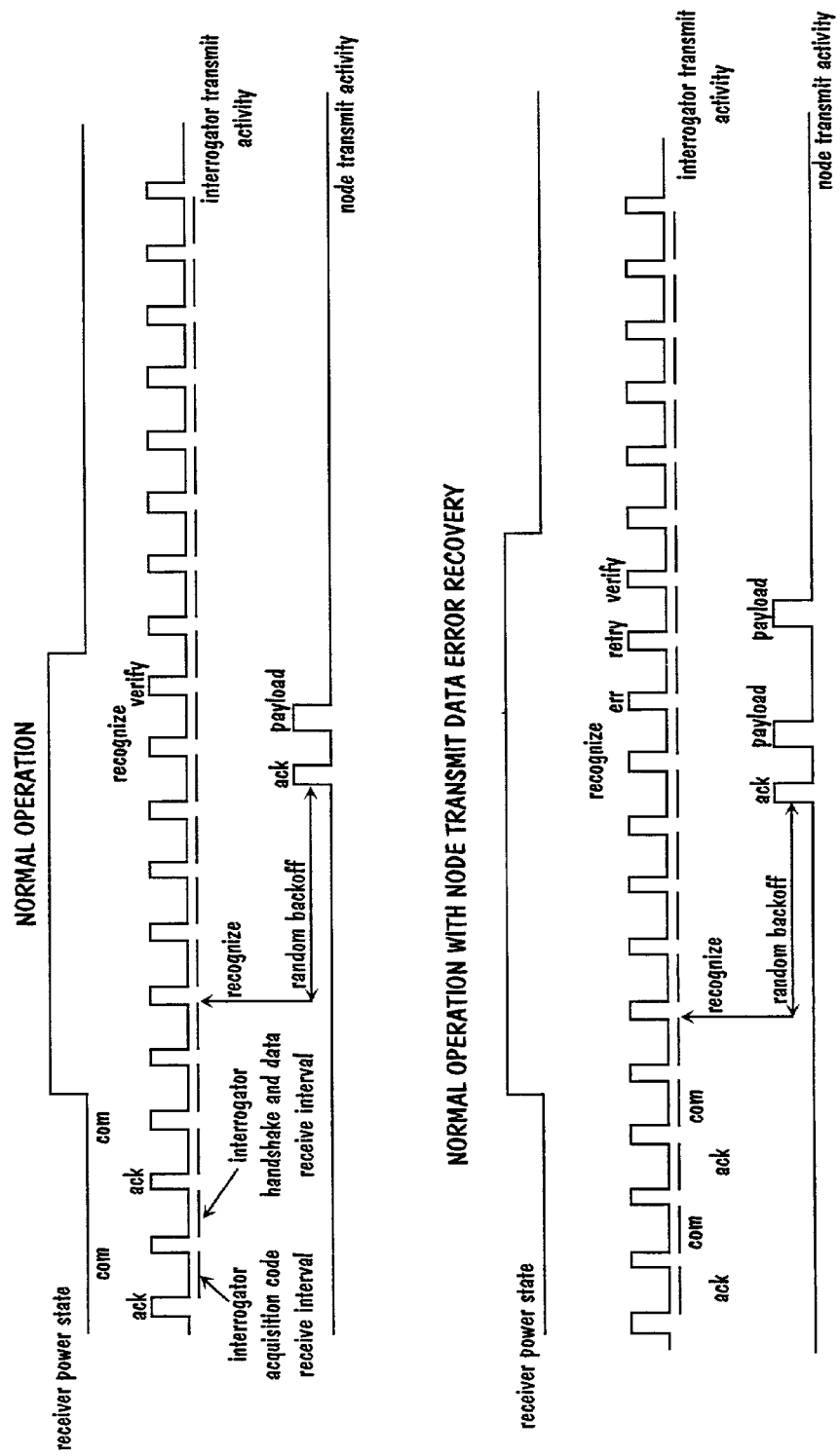
FIG. 27 is one protocol for radios that are establishing links in an embodiment.
Figure 28:
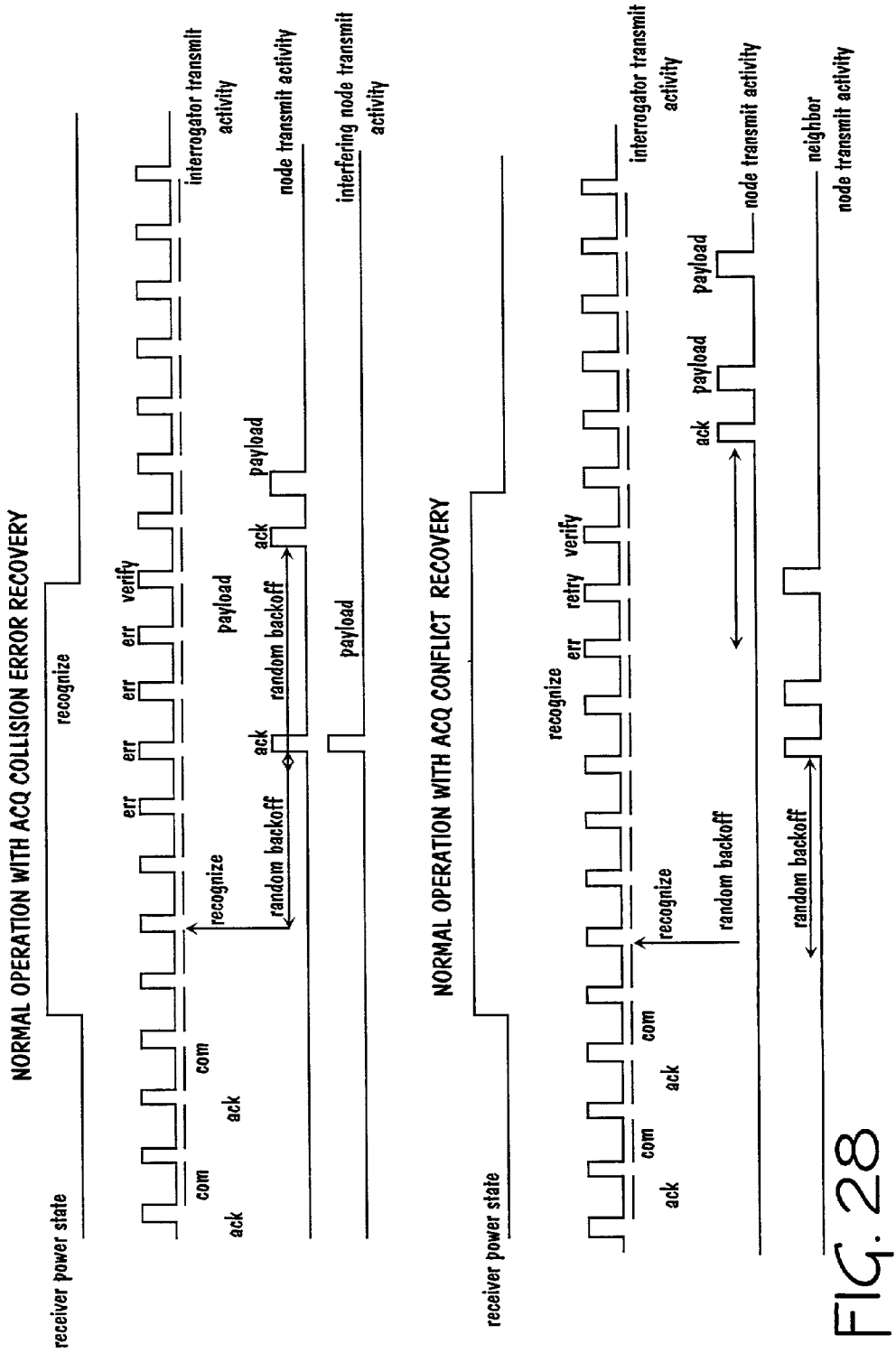
FIG. 28 is another protocol for radios that are establishing links in an embodiment.

The multi-user, multi-channel, frequency-hopped WINS NG RF modem is used in network self-assembly and reconfiguration. The WINS NG network supports both self-assembly of randomly distributed nodes, with or without available GPS location information, and joining of new nodes into the network. FIGS. 27 and 28 illustrate protocols for radios that are establishing links in an embodiment. Communication between network nodes, and nodes within subnets, occurs according to assigned channels defined by pseudorandom frequency hopping patterns. In addition, the natural requirements for low communication duty cycle mean that nodes are synchronized and operate in a time division multiple access (TDMA) frame structure in which the frequency hopped channels are active.

Self-assembly protocols are implemented for applications including large area security applications and local area WINS tag asset management technologies. These protocols are scalable and have been demonstrated from local area WINS NG networks to global satellite telephony link WINS NG nodes. Network self-assembly for a node distribution begins with the WINS NG nodes operating in search and acquisition modes in a search for participating peer neighbors and gateway nodes. Network self-assembly operates in a hierarchical messaging method where energy-efficient short packets are transmitted at low duty cycle and receiver operation is also managed at low duty cycle. Upon detection of a neighbor, individual WINS NG nodes enter into a challenge and response session that escalates in data volume until it is established that a node has joined the network or is not permitted to join. The network population is surveyed at random intervals for new nodes and missing nodes. Changes in node population or degree of link quality and RF signal strength are noted and communicated to the network gateways and server.

During steady-state operation of the WINS NG network, suddenly occurring, high priority events demand rapid response from the network at a rate that may exceed normal message propagation time. The WINS NG system includes protocols that, when invoked by the receipt of priority message codes (e.g. from IPv6 flow control labels or similar mechanisms) will initiate inhibition processes. Messages are broadcast to nodes adjacent to a path that will inhibit messaging from nodes other than those engaged in conveying the high priority event. In addition, these protocols act to reduce response time for messages following a preferred path.

Figure 29:
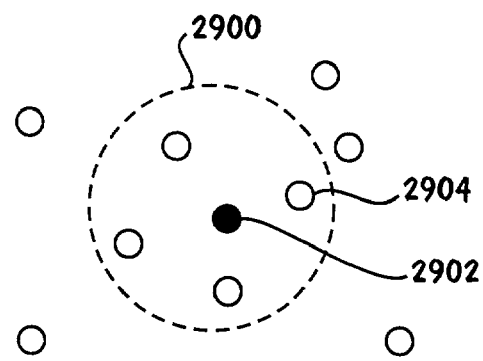
FIG. 29 shows a single radio cluster.

In the multi-cluster network of an embodiment, a distributed method for self-assembling the network accommodates the fact that many commercially available radios, such as most spread spectrum radios, cannot communicate to every other radio in range. Rather, one radio is designated as a master, or base, and all the rest are designated as slaves, or remotes. FIG. 29 shows a single radio cluster 2900. A radio, whether a base or a remote, can be generically referred to as a "node." A base 2902 can communicate with all remotes 2904 within its range, but each remote 2904 can only communicate with one base 2902. Thus each base 2902 defines a strict cluster 2900, which is composed of all the remotes 2904 in its range.

Figure 30:
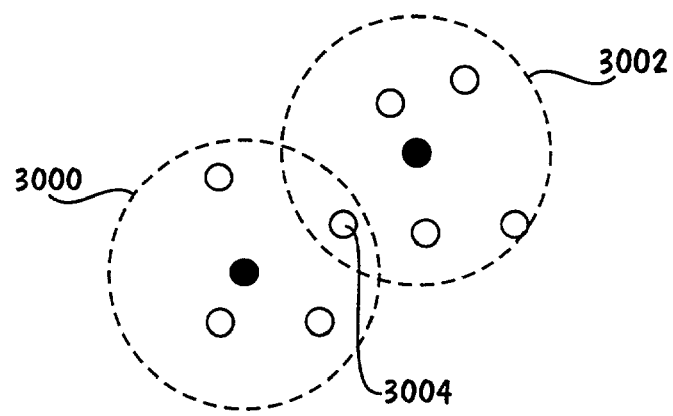
FIG. 30 shows a multi-cluster network.
Figure 31:
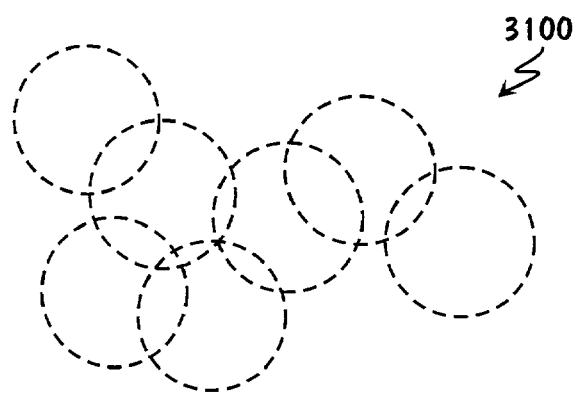
FIG. 31 shows another multi-cluster network.

FIGS. 30 and 31 show multi-cluster networks 3000 and 3100. Because some radios 3004 belong to more than one cluster, it is possible for them to relay information between the two clusters 3000 and 3002. This can be accomplished for example by the gateway periodically switching which master it communicates with, queuing messages to be passed between clusters, until the appropriate connection is made. In other situations, the radios may allow contact to be made with multiple masters, in which case messages may be passed with greater ease between clusters. With many clusters 3100 it is possible for any of the radios in any cluster to communicate with any other radio in any cluster, as long as each cluster has some overlap with another.

A multicluster-multihop network assembly algorithm should enable communication among every node in a distribution of nodes. In other words, the algorithm should ensure total connectivity, given a network distribution that will allow total connectivity. One such algorithm of an embodiment is described below.

The algorithm runs on each node independently. Consequently, the algorithm does not have global knowledge of network topology, only local knowledge of its immediate neighborhood. This makes it well suited to a wide variety of applications in which the topology may be time-varying, and the number of nodes may be unknown. Initially, all nodes consider themselves remotes on cluster zero. The assembly algorithm floods one packet (called an assembly packet) throughout the network. As the packet is flooded, each node modifies it slightly to indicate what the next node should do. The assembly packet tells a node whether it is a base or a remote, and to what cluster it belongs. If a node has seen an assembly packet before, it will ignore all further assembly packets.

The algorithm starts by selecting (manually or automatically) a start node. For example, this could be the first node to wake up. This start node becomes a base on cluster 1, and floods an assembly packet to all of its neighbors, telling them to be remotes on cluster 1. These remotes in turn tell all their neighbors to be bases on cluster 2. Only nodes that have not seen an assembly packet before will respond to this request, so nodes that already have decided what to be will not change their status. The packet continues on, oscillating back and forth between "become base/become remote", and increasing the cluster number each time. Since the packet is flooded to all neighbors at every step, it will reach every node in the network. Because of the oscillating nature of the "become base/become remote" instructions, no two bases will be adjacent. The algorithm can also be stated as follows:

Algorithm Initial Conditions, for Each Node:
Acquired=false
Touched=false
Network=0
Assembly Packet Contents:
int Cluster
bool Acquired
Upon Receipt of Assembly Packet:
if Touched==true
  exit
Touched=true
if ReceivedAssembly.Acquired=true
  Acquired=true
  Send Assembly Packet to all Neighbors
  NeighborAssembly.Cluster=ReceivedAssembly.Cluster+1
    NeighborAssembly.Acquired=false
  Become Remote on ReceivedAssembly.Cluster
else
  Send Assembly Packet to all Neighbors
  NeighborAssembly.Cluster=ReceivedAssembly.Cluster+1
    NeighborAssembly.Acquired=true
  Become Base on ReceivedAssembly.Cluster To Start the algorithm, choose any node in the network and have it behave as if it received an assembly packet with Cluster=1
Acquired=false.

This causes the node to send assembly packets to all its neighboring nodes, then become a base on cluster 1. It essentially becomes the first base in the network, and all of its neighbors become remotes in its cluster. The assembly packets spread out in all directions, and the network assembles itself. The assembly packets essentially flood through the network as fast as possible. Because any traffic generated from a node could not possibly overtake the assembly packets, and because each node is ready to communicate after the receipt of an assembly packet, each node can assume normal operation after the receipt of an assembly packet. Once a node has received an assembly packet, it is ready to begin normal operations. Communication with other nodes in the network is enabled with routing algorithms. The algorithm is self-terminating, by virtue of all nodes keeping track of whether they have been "touched".

Figure 32:
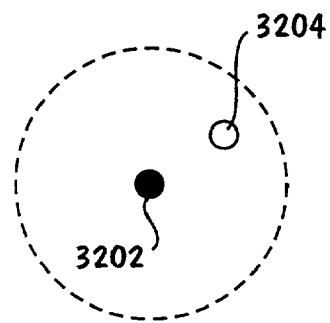
FIGS. 32-34 show a network self-assembly example of an embodiment.
Figure 33:
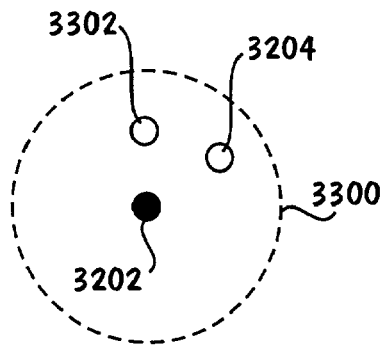
Figure 34:
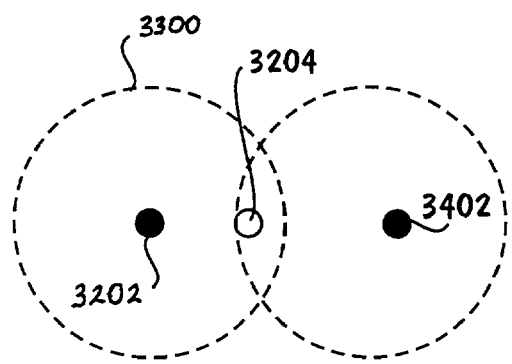

The assembly algorithm guarantees connectivity in a distribution of nodes, if total connectivity is possible. FIGS. 32-34 show a network self-assembly example of an embodiment. In the base case of two nodes 3202 and 3204 that are within RF range of each other, the starting node will become a base 3202, and the other will become a remote 3204, as shown in FIG. 32. If a new node is added, assuming that it is within RF range of at least one of the existing nodes, there are two possibilities: (1) if the new node 3302 is within range of an existing base 3202, it will become a remote 3302 on that base's network 3300, as depicted in FIG. 33; (2) if the new node 3402 is not within range of any existing bases 3202, but only remote(s) 3204, it will become a base 3402, as shown in FIG. 34. Nodes can continually be added, and they will always fall into one of these two cases. Thus this algorithm scales up the number of nodes indefinitely.

Several variations are possible using this algorithm. Many commercially available radios take a long time to switch between two masters. Thus, it is important to minimize the number of hops needed to communicate. One way to accomplish this is to have masters serve as the nodes with the largest number of neighbors. This may, for example, be accomplished using a greedy algorithm in which nodes with more connections than some specified fraction of their neighbors become masters. The cluster leadership can then be adjusted in one or more iterations. While not guaranteed to have the minimum number of hops for any routing through the network, it works better than random assignments, and operates in a distributed fashion. The optimization can be applied as masters are designated when the network is being built outward from the initial base.

The basic algorithm establishes a multi-cluster network with all gateways between clusters, but self-assembly time is proportional with the size of the network. Further, it includes only single hop clusters. Many generalizations are possible, however. If many nodes can begin the network nucleation, all that is required to harmonize the clusters is a mechanism that recognizes precedence (e.g., time of nucleation, size of subnetwork), so that conflicts in boundary clusters are resolved. Multiple-hop clusters can be enabled by means of establishing new clusters from nodes that are N hops distant from the master.

Having established a network in this fashion, the masters can be optimized either based on number of neighbors, or other criteria such as minimum energy per neighbor communication. Thus, the basic algorithm is at the heart of a number of variations that lead to a scalable multi-cluster network that establishes itself in time, and that is nearly independent of the number of nodes, with clusters arranged according to any of a wide range of optimality criteria.

It should be noted that network synchronism is established at the same time as the network connections, since the assembly packet(s) convey timing information outwards from connected nodes. This is in contrast to prior art multi-cluster algorithms which typically assume synchronism is known, as well as the number of nodes in the network. In an AWAIRS network, self-assembly of the network is coincident with establishment of synchronism, but a flat, or peer-to-peer network, rather than a clustered network results.

Figure 35:
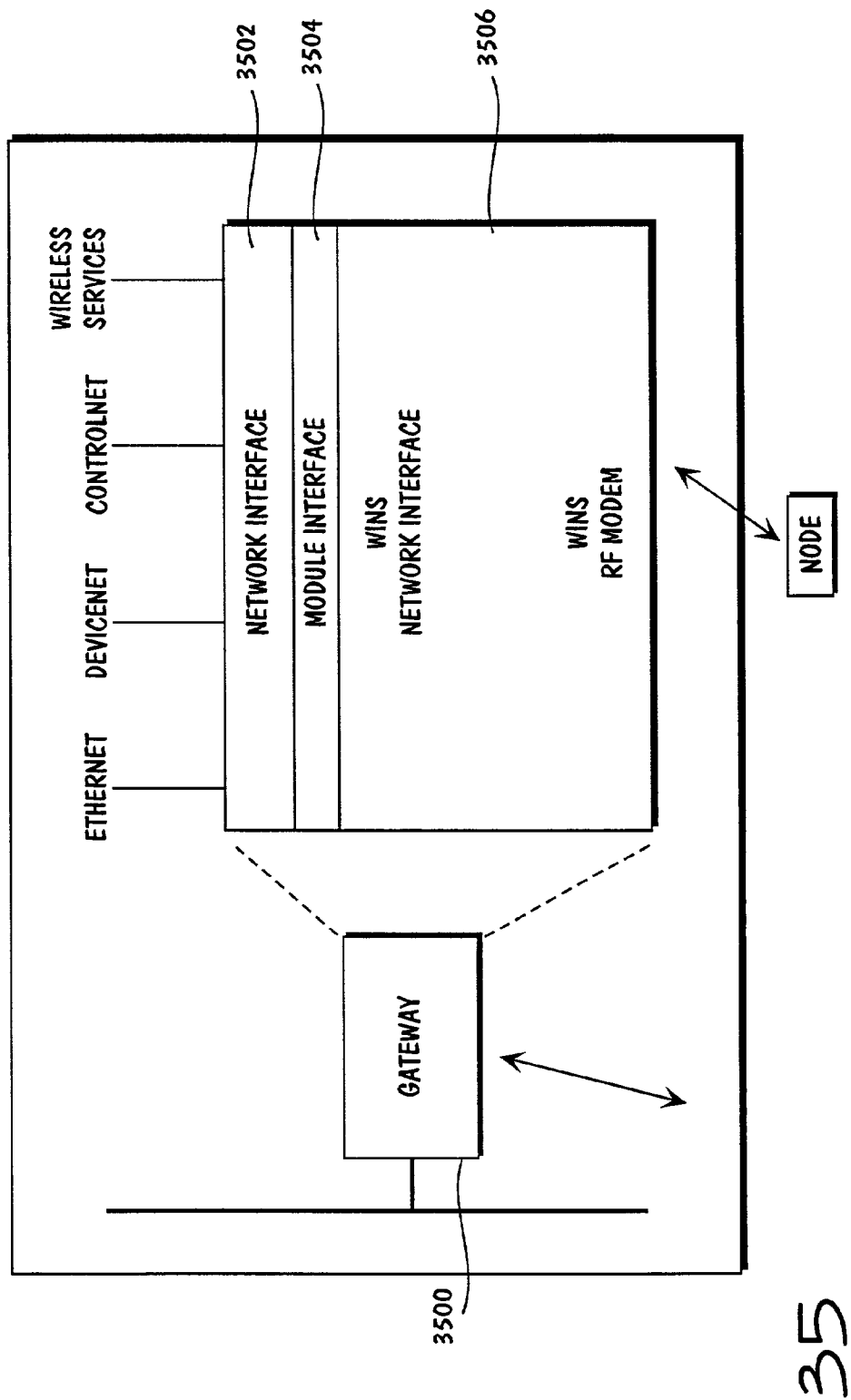
FIG. 35 is a block diagram of a WINS NG gateway of an embodiment.

Network self-organization of an embodiment includes gateways and servers, an architecture that supports plug and play web-based applications. FIG. 35 is a block diagram of a WINS NG gateway 3500 of an embodiment. The WINS NG gateway 3500 operates as a network bridge using telephony interfaces, wireless services, and network standards including for example Ethernet, DeviceNet, and ControlNet. The WINS NG gateway 3500 includes, but is not limited to, a network interface 3502, module interface 3504 and RF modem 3506. It may alternatively support only wired connections.

The WINS NG gateway functions include, but are not limited to: protocol translation and network management separating the low bit rate, power constrained WINS NG network from high speed internet services; management of queries and commands originating from Internet users (this function, including buffering of commands and data, provides a remote web client with high speed access to the network without placing large burdens on nodes or ruining their operating duty cycle); interface to multiple long-range communication physical layers including Ethernet, long range packet radio, wireline telephony, wireless cellular telephony, and satellite telephony.

The WINS gateway nodes communicate using protocols including Hypertext Markup Language (HTML)/Extensible Markup Language (XML). An embodiment uses the Inmarsat satellite telephony modem capability to access a WINS NG network at points on the earth. The WINS NG gateway also has the ability to link the WINS NG network, optimized for low cost, short range, low power communication links, with long range wireless communication links.

The WINS NG server is used in the architecture of large area WINS deployments, but is not so limited. The WINS NG server supports enterprise-class database applications that enable management of large WINS NG node populations and migration of code and signal processing objects and data to an entire node population. The WINS NG server systems also support applications that exploit dense WINS NG node distribution. For example, in a condition based maintenance application, there is significant value in collecting all events and event histories in a database to enable development of machine failure prognostics or diagnostics. The WINS NG server also provides Web services to users that wish to acquire data from remote nodes. For example, a global WINS application can connect remote WINS NG networks to the WINS NG server via satellite telephony services. The WINS NG server provides data and network management of the many autonomous WINS NG nodes, globally distributed. A Web client may then query the WINS NG server for images, data, image and data history, and data relationships acquired at any point on the earth.

The WINS NG Web applications enable remote users to query the WINS NG network for node operation and configuration and node sensor data including images. In addition, the user may select and reconfigure individual nodes for sensing, signal processing, communication, and networking parameters.

High Reliability Access To Remote Nodes And Networks

Sensor network islands have vastly increased value when connected to large networks such as the Internet. For example, consider a sensor/actuator network designed for monitoring and/or control of heavy machinery. Through linkage to the Internet and an appropriate database, operators can monitor the present status of the machinery, call up records of past operations, and tune parameters so that machinery operates more efficiently. The operators may be located anywhere in the world. In the absence of such connectivity, costly site visits would need to be made to deal with any problems that might arise.

Figure 36:
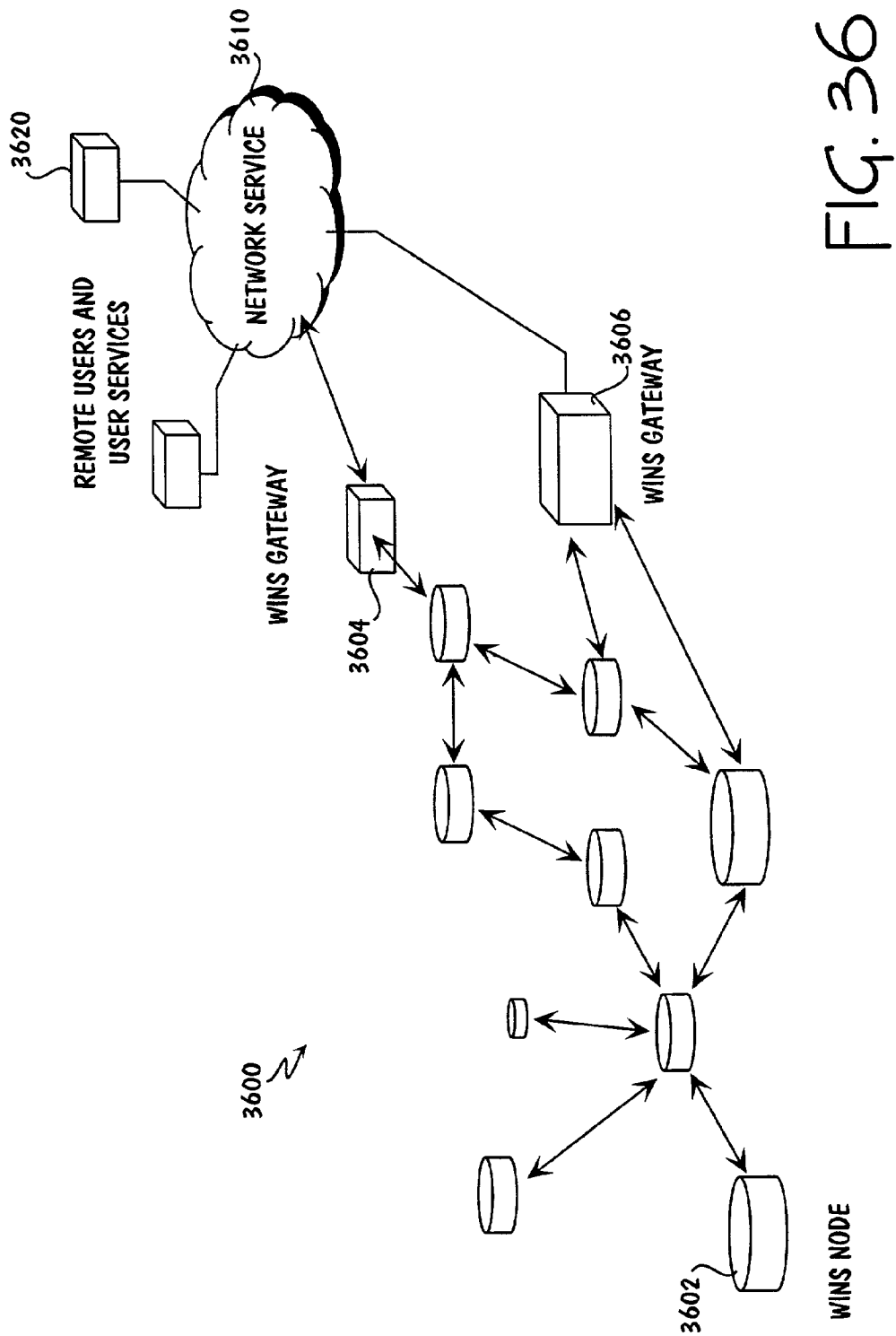
FIG. 36 is a WINS NG network architecture of an embodiment having reliable access to remote networks.

FIG. 36 is a WINS NG network architecture 3600 of an embodiment having reliable access to remote networks. Redundant pathways 3602-3604-3610 and 3602-3606-3610 provide robust access in complex operating environments. Multiple WINS NG gateways 3604 and 3606 support the WINS NG network 3600 and provide redundant access to conventional network services 3610 through wireless or wired high bit rate links. Remote users and user services 3620 are coupled to the WINS NG nodes 3602 using at least one WINS NG gateway 3604 and 3606 and conventional network services 3610.

A WINS NG network of an embodiment is used for applications including remote monitoring of high-value industrial equipment. In this application, it is essential that prompt alerts be issued if any flaw is detected. Thus, there is support for a plurality of servers that gain access to the database of network observations and software, so that failure in any single server will not compromise the ability of remote users to evaluate machine performance. In addition, a variety of network physical layers are supported, so that a variety of devices can interoperate to build the sensing and control functions. This enables the use of independent long-range transmission means (e.g., satellite and terrestrial wired connection). Likewise, the systems include support for a plurality of gateways, so that a single point of failure will not obstruct remote access.

One protocol to automatically choose among alternative communication paths uses a periodic heartbeat signal sent down each of the paths. If acknowledgement packets are not received within a specified interval, an alternative path is chosen based on a cost junction that includes some combination of path latency, capacity, and cost. This cost junction is determined by the application. Since the alternative paths may not be able to carry all the data, the protocol notifies the application of the reduced capacity so that only higher priority messages are carried.

Database Access

Due to resource limitations, sensor networks may not communicate all raw data to a central location. Rather, taking into account constraints on storage, communications bandwidth, processing capabilities, and energy, they meet the priorities of the end user for information. In this respect, sensor networks can be conceived of as a special type of database, wherein the data have life cycles that depend on their content and sequencing in time. For the network as a database, as opposed to conventional databases, it is not possible to cleanly separate storage, processing, and communication procedures, but there are advantages in exploiting commonalities. For network communications data management, the process can be described as a flow through different states.

Figure 37:
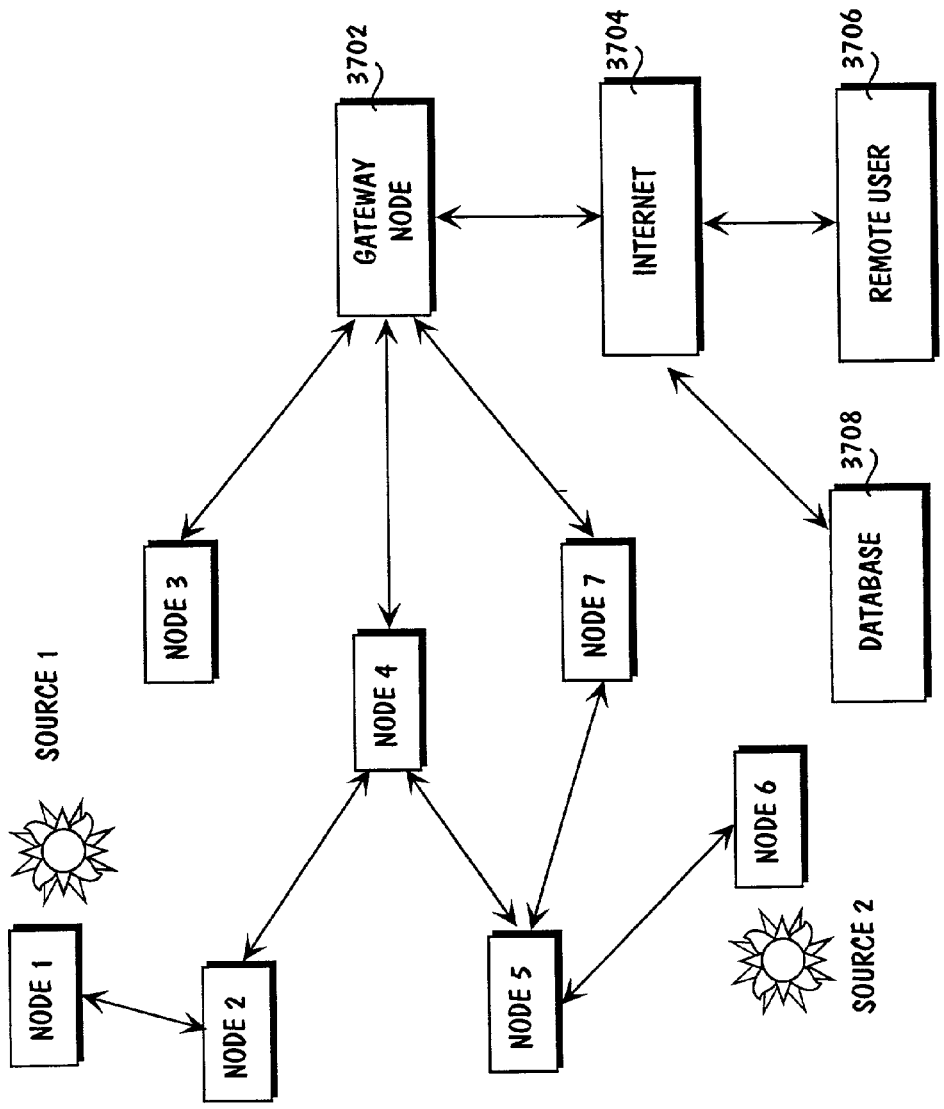
FIG. 37 is an example scenario of Internet access and database management of an embodiment.

To illustrate, FIG. 37 is an example scenario of Internet access and database management of an embodiment. The sensor nodes include sensing, processing, communications, and storage capabilities. The Internet coupling enables access to more powerful and numerous computational and storage resources than those present in the sensor node network.

In operation, sensor node 1 detects source 1. In response, sensor node 1 engages in several layers of signal processing and storage decision making before reporting results to the gateway node 3702. Sensor node 6 detects source 2 and, in response, engages in several levels of signal processing and storage decision making before reporting results to the gateway node 3702. The remote user 3706 is alerted to both the source 1 and source 2 events and, in response, may query the database for previous events that were the same as or similar to the source 1 and source 2 events. Furthermore, the remote user 3706 may make decisions on future actions in response to the source 1 and source 2 events.

The gateway node 3702 acts on instructions regarding event priority in reporting both events and, in response, requests further details from sensor node 1. Upon receipt by the gateway node 3702, the details are passed to the database 3708 which, in one embodiment, is a long-term database. The remote user 3706 may use the results to generate new detection algorithm parameters. When generated, the new detection algorithm parameters are broadcast to all sensor nodes of the network.

In one embodiment, the network integrates sensing, signal processing, database functions, and networking into one unified framework. This framework can be referenced to a state machine. While the sensor nodes have internal instantiations of this state machine, the collective network is described by a larger state machine.

Figure 38A:
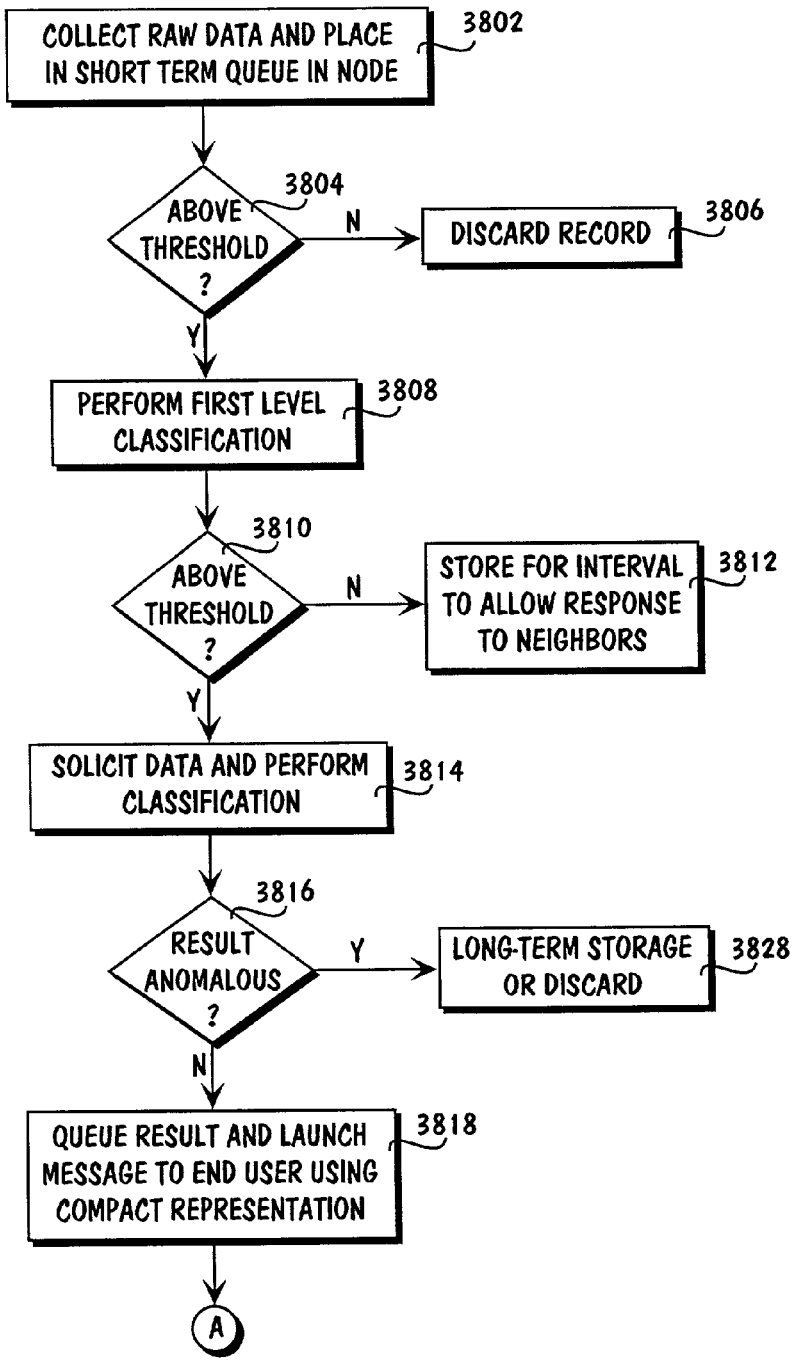
FIGS. 38A and 38B are a diagram of a process flow of a state machine of an embodiment.
Figure 38B:
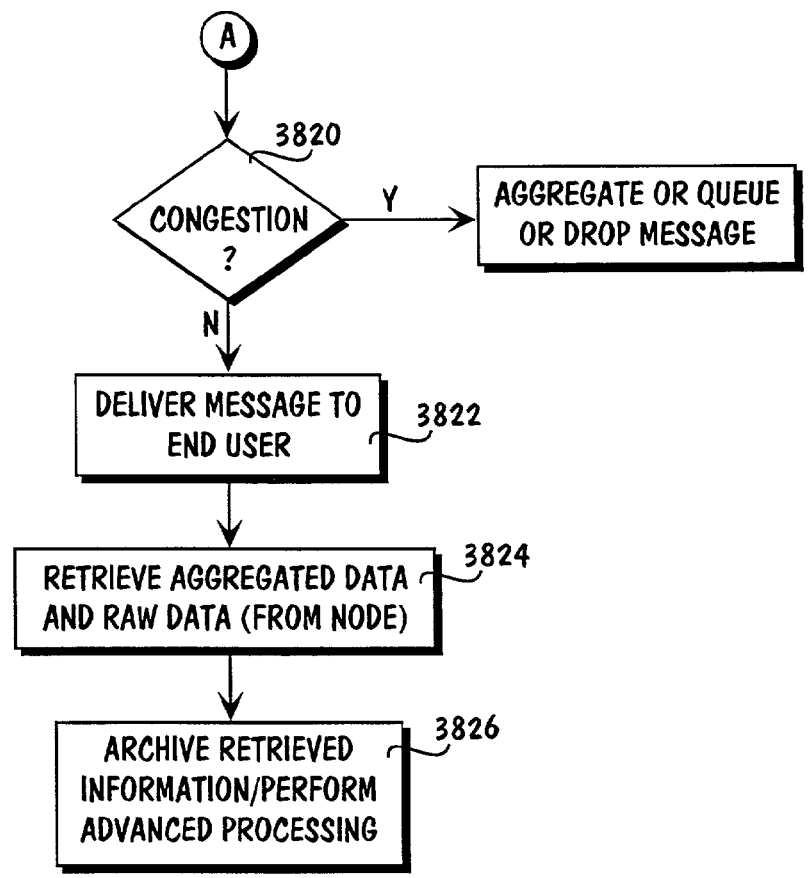

FIGS. 38A and 38B are a diagram of a process flow of a state machine of an embodiment. At 3802, raw data is collected at a node and placed in a short term queue in the node. At 3804, energy detection is performed, and if the energy of the data signal collected is below a predetermined threshold the record of the collected data is discarded at 3806. If the energy is above the threshold, first level classification of the data is performed at 3808. If the data is below another predetermined threshold as tested at 3810, the data is stored for an interval to allow response from neighboring nodes at 3812. If the data is above the threshold, fusion data is solicited from neighboring nodes and classification is performed after the data is collected from them at 3814. If the resulting data is anomalous, as determined at 3816 using predetermined criteria, it may be stored longer term to allow for adaptation of the classification system, or discarded at 3828. If the resulting data is not anomalous, a message to the user is launched at 3818.

The message informs the user that the data, or result, is available. In one embodiment, the message is transmitted in a compact representation, for example, as an entry in a codebook which associates the classification decision to the target parameters. It is determined at 3820 whether there is congestion in the network. If there is congestion, the message is aggregated with other messages to be resent later, queued to be sent later, or dropped, depending upon the priority assigned to the message. If there is no congestion in the network, the message is delivered to the end user at 3822. The end user may request data queued at the aggregation phase 3824, or raw data, or may not reply to the message received. The retrieval of requested data creates the potential for data contention in the network that must be independently resolved, for example, by queuing. The retrieved information is archived and/or subjected to advanced processing at 3826. Advanced processing may result in the issuance of a command for new data processing priorities and/or procedures in the network.

Queries from the end user establish priorities for record processing, communication, and storage. Established priorities are managed in a distributed fashion by the network, for reasons of scalability. Conditions such as hold times for data, probabilities that data will pass through a threshold, etc., define the parameters of a Markov process (state machine). The relevant conditions are user-selectable within the physical limits of the devices involved. In conventional databases, it is common for data to have varying lifetimes in different levels of the database; in other words, data is routinely aged out. In the WINS network events occur with such frequency that conventional data aging is not workable. The WINS network also differs from conventional databases in that in the WINS network less internal communication occurs, resulting in forced decentralized decision making.

The state machine representation of an embodiment provides ways to manage the networking and database functions, which advantageously use the commonality of the two tasks for distributed sensor networks. For example, naming and storage conventions for networks and databases respectively can be managed according to similar principles, reducing conversions of data. A query to determine the physical state at some location is not concerned so much with addressing a particular node, as retrieving some data. There is a similar formal structure for routing and data processing, for example, decision trees. There is no a requirement for unique addresses. Rather, information retrieval takes place with the use of attributes of the data, such as sensor type and location, which allows reduced representations of the address compared to networks designed to deal with general traffic.

The processing is performed in such a way as to permit distributed network and database management. Queries establish database search, networking, processing, and storage parameters. For this to be managed in a distributed fashion, primary database management is at the nodes, in the form of the processing of the physical world inputs. Otherwise, the amount of data that could be generated would far exceed the possibilities for scalable networking and storage. Thus, the processing structure is largely dictated by the communications, networking, and storage constraints. Further, a similar formal structure for routing and data processing is exploited in the protocol design. Routing from nodes to gateways may be organized as a set of possibly overlapping trees. This admits hierarchical decision making, allowing further processing at multiple steps as data and decisions progress from nodes to the gateway. Database retrieval is also often based on trees, since different attributes can be used for branching decisions, reducing search time. Thus, naming based on the attributes of the data produced by a node is useful both in constructing routes and in data retrieval systems.

One class of distributed algorithms that can be applied to the problem of dealing with queries about the physical world is directed diffusion algorithms. These operate by using local activation and inhibition signals to spur actions by neighbors. For example, a gateway may activate its neighbors by launching a query requesting information about instances of particular vibration modes. This query gets passed outwards towards sensor nodes that can produce this kind of information, and may reduce their inhibition in sending reports that may drain their energy reserves. If the query is general in that any qualified node may answer, a return signal may inhibit further propagation of the message outward. In this way, only the nearer nodes respond and the network as a whole is not burdened with a large number of overlapping tasks to respond to.

However, the same structure also applies to the larger database of which the sensor nodes are only one part. A query may get only as far as the portion of the database residing as part of the wired network, if the required information can be found. Further, a prior search of the database may limit the number of nodes that are specifically queried to gather information that is missing, but needed to answer the request. This saves energy for the remote network, and allows more queries to be simultaneously processed. Thus, the activation request gets modified as processing, communication, and data retrieval operations are carried out. This would be very difficult in any system which did not treat these functions as part of a unified whole.

The WINS NG database technology accommodates the distributed nature of WINS NG measurements. Significant value is derived from determining the relationships using declarative query languages (DQLs). In addition, the capability to deploy code and data objects to distributed nodes while determining the concurrency of this data facilitates the scalability of the WINS NG network.

Conventional database systems, designed for centralized management of alphanumeric data sets, are not suitable for use in the WINS NG network. For example, WINS NG network data is unstructured, and has multiple forms that are managed including data time series, images, code and data objects, and protocols. Also, the classic constraints used in query optimization for conventional systems are not suitable for WINS NG where computation, memory, and communication resources are constrained.

Embodiments of the DQLs for sensor programming and information retrieval include small footprint standard query language (SQL) database systems. The SQL database systems are distributed on WINS NG nodes, operating as either common or network gateway elements, at WINS NG servers, and on other devices that are permitted to join the network. Web-based access using the WINS NG architecture permits communication of sensor signals, images, events, and signal processing code. Web-based access further permits data queries by node type, location, event, signal, priority, traffic level, and other parameters. The WINS NG system includes event recognition and identification algorithms operating on the WINS NG preprocessor and processor. These are supported by an API that permits either high level development with these signal processing components or low level development at the preprocessor level.

Some characteristics of an embodiment of a DQL for sensor programming and information retrieval include a small footprint relational database management system (RDBMS) of event data, signal processing libraries, node status, network status, and error conditions. The DQL includes data-driven alerting methods for synchronization and ensuring network concurrency of database elements. The DQL further includes a signal search engine (SSE) for indexing and information labeling of unstructured sensor data sets. User data services include a WINS Web Assistant for access to remote and global RDBMS. Query processing optimization systems are included for the WINS NG network. The RDBMS monitors network status, maintenance, and security.

To rapidly design such combined sensor networks/databases, it is important to make use of standards wherever possible. The layered architecture of the embodiment of WINS NG nodes discussed earlier makes possible use of both standard hardware components and standard protocols where appropriate to the application. For example, consider an industrial monitoring application, where vibrations in large pumps are to be monitored for abnormalities. Records of behavior can be useful both in predicting failures (prognostics) or in determining causes after the fact (diagnostics) to reduce repair time and expense, and to assist in new design. Here the WINS NG nodes establish a network, eventually to a gateway, which then connects to a standard database server such as an SQL server, either locally or through the Internet. In either case, the data generated by the sensor can be viewed either remotely or on-site using standard browser software. Further, the parameters for control of what data is transmitted and eventually archived to the database can also be set by user queries either locally or remotely.

This combination of a self-assembling sensor network, database connection, and remote control via the Internet is an extremely powerful means of monitoring and controlling remote sites. Experts are not required to be on site either to establish the network, or to subsequently review or control how the data is collected, resulting in large efficiencies. A custom design of all these components would be prohibitively expensive in engineering design time, as would the ongoing cost of supporting the software; an integrated approach to the overall architecture, making use of standard components and software where suitable, leads to both rapid and highly functional design.

In one embodiment, the WINS NG database includes data-driven alerting methods that recognize conditions on user-defined data relationships. For example, triggers are set for coincidences in arrival of signals, for node power status, or for network communication status. The WINS NG database supports event data, signal processing libraries, node status, network status, and error conditions.

The WINS NG database addresses query optimization in the context of energy constraints in network communication. Thus, queries are managed such that proper decisions are taken regarding the need to communicate with distant nodes. Query optimization also supports node-to-node queries where a node may improve the quality of a decision by cooperative methods, comparing results with the stored data in neighboring nodes.

Reconfigurability is an important characteristic of a WINS NG network because nodes can remain in environments for the lifetime of a large system after installation. Network capabilities are reconfigurable as advances are made in the ability to detect events. Specifically, database services are provided for marshalling code and data objects to remote WINS NG nodes to enable reconfiguration. For example, the WINS NG database system provides services for distribution of large binary objects containing library elements to be linked at runtime, e.g., dynamic-link libraries (DLLs). In addition, protocols and signal processing methods are remotely and globally reconfigurable.

Operational protocols, signal processing protocols, and network protocols are migrated via verified atomic transaction methods to ensure that entire protocol sets are migrated completely and without error to globally distributed WINS NG nodes. Particular protocols detect concurrency errors. The WINS NG database includes data services for auditing concurrency of all data types. Also, a rollback protocol is provided for execution in the event that concurrency errors are detected. This ensures that node connectivity and operation is robust during system upgrade phases.

In one embodiment, the WINS NG database is implemented in small foot print databases at the node level and in SQL systems at the WINS NG server level. Remote SQL queries received at the server level access both the low level network and the server databases. Replication of database elements occurs between WINS NG nodes, between WINS NG nodes and WINS gateway nodes, and between the WINS NG network and servers or remote users.

Data services are also provided to both remote and local users. Specifically, remote users may interact directly with the WINS NG gateway devices, or directly with the WINS NG server. The remote users are provided with a WINS web assistant for interaction with the WINS NG database systems and with individual nodes and gateways for many applications. The WINS web assistant continuously publishes WINS NG network results according to query scripts.

For example, consider the monitoring of large industrial pumps. WINS NG nodes can be embedded within the casings of the pumps, which are typically in operation for many years. Other nodes can be on the exterior, and thus may be physically upgraded over time. It is desired to monitor the vibrations or other physical characteristics of the pumps to predict failure or verify continued proper operation. A database of observations over time from many pumps are used to develop better diagnostic and prognostic algorithms, which are downloadable to the remote nodes, whether embedded in the machinery or not.

A further example of the use of database methods of an embodiment is found in the effective incorporation of both active and passive tags into systems which detect, track, and identify objects like security, logistics, and inventory systems. Passive tags in particular can be very low cost, and thus very numerous. In a security application, an area can be flooded with low cost tags so that there is a high probability that at least one tag will adhere to any object passing through the region. In conventional usage of tags, a tag with a unique identifier is attached to a known object, achieving the binding between tag and object in the database. However, when a sensor network is present this manual binding is not necessary, since the network may identify the object. Typically, it is difficult to keep track of an object as it moves through different regions of coverage, and to know whether it is the same object.

A tagged object by contrast is always distinct because of the unique identifier of the tag. Thus, by linking the identifier of the tag with the sensor measurements in the database, tracking is made easier. Moreover, by having easier access to the history of observations of the object, it is more easily identified. Further, behavior of groups of tagged objects are correlated to location histories, to gain further information about their interactions, simplify the problem of dealing with multiple targets in view, and provide a simpler means to name and thus archive data about objects. With active tags including, for example, some combination of communication, storage, and sensing devices, the tag itself can be part of the database, and provide extended detection range, by alerting nearby sensors via its radio to go to higher levels of alertness or to stand down and conserve power because the object has already been identified.

Security Methods

The WINS system of an embodiment uses communication methods that provide security in communication for the short message packets that are fundamental to the WINS network. The communication methods also protect the network from an adversary that attempts to join the network by posing as a participating WINS node, and from an adversary that attempts to observe message traffic or the progress of challenge-response sequences and thereby gain information. The network is also protected from an adversary that attempts to derive network operating modes or network threat detection capability by a simple traffic analysis based on measurement of RF communication energy. In addition, the node and network information is protected from a security breach resulting from an attempt by an adversary to recover a node and recover information. It is important to provide these capabilities with the additional constraint that encrypted communication links must be robust against bit errors.

The challenges associated with achieving these goals are raised by the constraint that WINS network message packets are short. In addition, energy constraints limit the available number of packets. Balancing these challenges is the characteristic that typical security system latency is large. Specifically, long periods fall between successive events. This provides periods for background computational tasks associated with encryption. The WINS NG platform partitioning enables the WINS preprocessor to manage WINS network and sensing functions while the WINS processor operates in the background.

In one embodiment, the WINS NG network implements security based on public key methods. Public key methods offer the advantages of being scalable because few encryption keys need to be managed. This is a particular advantage in the WINS network where the number of nodes is variable and may increase suddenly as new nodes join a network. In addition, the public key method is reconfigurable and operates in a hierarchical fashion with a scalable key length.

Primary attacks on the public key method, such as brute force, exhaustive decoding, and impersonation are addressed for the distributed sensor application. First, message channels carrying short message packets may be attacked by brute force methods. In this case, an adversary first intercepts an encrypted packet. Then, by operating on all possible data packets using the public encryption method a match can finally be made between these encrypted packets and the intercepted packet. At this point, by this exhaustive search, the adversary has recovered the input code word. This can be continued for all packets. Protection against this exhaustive search is provided by or salting the short packet with a random confounder code word. Then, if an adversary recovers the packet, only the data convolved with the random code word is recovered. For WINS NG the confounder code word can be updated as a rolling code for each message transmission.

For this method, and many other security functions, keys, signatures, and encrypted algorithms are communicated containing confounder code sequences. The algorithm for communication between nodes is transmitted to nodes using public key and digital signature methods in long packets. Here the WINS system takes advantage of the fact that the distribution of confounder codes and other security updates is infrequent, and therefore is completed with secure, long message sequences.

While encryption methods involving confounder codes are robust in wireline communication systems, the WINS system accommodates the inevitable bit errors and packet loss that require retransmission. Simple confounder code methods that update for each transmitted communication packet would introduce a weakness. Here, loss of one packet would break the sequence and disrupt communication, forcing the system to undergo a complete reacquisition and authentication cycle. Thus, WINS NG of an embodiment implements sequence management for confounder codes such that as a result of an error, confounder codes previously used may be reused to reacquire the code sequence. The algorithm for update of confounder codes may also be distributed using conventional, secure, long packet, digitally signed messages. As noted above, energy cost for this step is not significant because this step occurs infrequently.

The security attacks associated with message interception and an adversary impersonation attack are addressed by development of the public key and digital signature methods described herein. In addition, it is important to protect the network from an adversary who attempts to gain knowledge about the network by observing the response to a challenge. This is addressed in WINS NG by development of zero-knowledge protocols. Here the network response to a challenge, for example a message from an unknown node or user who attempts to join the network, must not be regular and predictable. Instead, network response carries a random aspect such that the challenger, or possible adversary, cannot gain knowledge regarding the network by repeatedly requesting to join.

Network communication privacy is also protected. If RF communication occurs in direct and regular response to events, an adversary would be in a position to derive information regarding the ability of the network to respond to events. This would enable an adversary to determine the sensitivity of particular sensor nodes or reveal other traits. The WINS NG system addresses this attack by implementing communication privacy protocols. Specifically, communication of events and status information is not keyed in time directly to events and is not periodic. Instead, a random sequence of packet transmissions, a fraction being decoy message packets, is transmitted. Desired information is impressed on this "carrier" of random packets. An adversary receiving RF energy would receive random "chaff" and would not be able to rapidly correlate events with transmissions.

Regarding the error protection functionality in a multihop WINS network, raw data for a packet is first encrypted, in a code known both to the sending node and the eventual end destination. Error control is also included. In one embodiment there may be only one packet exchanged between these nodes, the encryption and error control codes must be short, and cannot extend past the packet boundaries. However, there can be numerous exchanges of information between the origin node and its immediate neighbors, and these transmissions may be vulnerable to eavesdropping and jamming. Thus, the confounder sequence operates on the sequence of these packet transmissions, zero-knowledge techniques such as addition of chaff packets are employed, and the sequence is protected by error control codes.

These techniques do not operate end-to-end, but over individual multihop links to avoid both the requirements for sending long keys over multiple hops, and to reduce latency for retransmission. Each node in the multi-hop connection checks for errors, and demands retransmissions, using the next element of the confounder sequence if uncorrectable errors are detected. Upon receipt of the error free packet, it removes the chaff, undoes the confounding, and then applies the appropriate confounder and chaff sequences for the next hop in the link. In the context of standard Internet layering, encryption operates at the application layer, where other techniques operate at the link layer. In typical systems, all security operates at or near the application layer, but for WINS networks the traffic characteristics and eavesdropping techniques demand pushing some of these functions to lower layers.

Communication between the WINS NG node modules, in the event that these modules may be in separate packages, is also protected. Upon bootup or connection between modules, authentication is completed. In this event, since the communication is by a direct wireline connection, the WINS NG can complete this authentication via long public key methods.

Measures of encryption effectiveness for the WINS network measure the probability of compromise relative to computational energy and time requirements. Adversarial efforts to compromise the network require complex and lengthy observation and computation that is orders-of-magnitude more difficult in computation and communication resources than required by WINS NG. An additional barrier for communication privacy and security is maintained by multihop network power management where RF path loss is exploited to naturally veil communication channels.

Proper power control prevents adversaries from participating unless they are in the midst of the network. Adversaries wishing to breech the security barrier then must operate with extreme computational capability in relation to allied nodes and must be in the midst of the network at the same density as WINS NG, an enormous expense for an opponent. The WINS NG system also exploits the WINS Database systems for aperiodic sweeps of deeply embedded security information for the purpose of revealing any adversary or compromised node. Security sweeps can include study of the type of sensor data a node is expected to produce. If not consistent with its claims, the node can be excluded, just as would be the case for a failed node. Aperiodic re-authentication and remote security monitoring are also provided. Low power implementation of the security algorithms exploits partitioning of security functions between the WINS preprocessor and processor.

Distributed Position Location

An important requirement in many sensor network applications is for nodes to be aware of their position. For example, in security applications if the nodes know their own location, then it is possible to estimate the locations of targets. One way to enable this is to equip every node with a position location device such as GPS, or to manually inform nodes of their positions. However, for cost reasons this may not always be possible or desirable. An alternative is for a subset of the nodes to know their own positions, and then to distribute location knowledge by using the communications and sensing means of the nodes. It is assumed is the discussion herein that the nodes all have radio communications, and acoustic transducers and sensors. Synchronism is established using the radios, while ranging is accomplished using the acoustic devices. Both simplified and more accurate position location methods are described.

Acoustics have an advantage over RF for ranging because of the tolerance for imprecise clocks. A timing uncertainty of 30 microseconds will at a nominal propagation velocity of 330 meters per second (m/s) yield an accuracy of 1 centimeter (cm). This requires a bandwidth of 33 kilohertz (kHz), which is easily achievable using ultrasound. In contrast, radio ranging deals with velocity $(v)=3\times10^8$ m/s, and so six orders of magnitude increased bandwidth and timing precision are required if time of arrival is used, while signal strength is a very poor indicator of range. Since position x=vt, where v is the a priori unknown propagation velocity and t represents time, some reference locations are required to determine the spacing between nodes. These will also serve to enable determination of absolute rather than relative positions. Once determined, the velocity information can be supplied to all other nodes in the network.

If the two nodes involved in a ranging exercise know the nominal velocity, and are synchronized, they can both determine their ranges and compensate for wind. Node 1 launches a chirp or spread spectrum signal at a known time, and node 2 measures the propagation delay t1. Node 2 then launches a signal at a known time, and node 1 measures the delay t2. The distance $x=v_1t_1=v_2t_2$. But $v_1=v+w$ and $v_2=v-w$, where w is the wind component in the direction from node 1 to node 2. Thus there are two equations in the unknowns of x and w. With three nodes, one can learn another component of w and thus the ground velocity of the wind.

Without synchronization, two nodes cannot fully compensate for wind. The best that can be done is to launch a signal, and then send a return signal after some fixed delay. The round trip estimate is $t_1+t_2=x/(v+w)+x/(v-w)$. For $v=330$ m/s, $x=10$ m, and $w=10$ m/s, a position error of 1 cm results. Since the network must establish synchronism for the radios in any case, and needs it to estimate the velocity of propagation, there is no point in paying this small performance penalty.

Radio frequency signals will have negligible multipath delay spread (for timing purposes) over short distances. However, an acoustic signal in a 10 meter room could reasonably experience delay spreads on the order of the room dimension divided by the velocity, or 0.03 s. The multipath is resolved so as to use the first arrival as the range estimate. If there is no line of sight and all arrivals are due to multipath, then the ranging will only be approximate. If a time-hopped (impulse) or direct sequence spread spectrum method is used, then the means for resolving the multipath is a RAKE receiver. There do not need to be enough RAKE fingers to span the entire delay spread (although the more the better in terms of robustness of acoustic communications). The time spacing of the taps is determined by the required position resolution and thus bandwidth of the ranging waveform. Thus, if 1 cm accuracy is desired, the tap spacing has to be 30 microseconds.

Note that the multipath characteristics are highly frequency dependent. The range of wavelengths for frequencies going from 1 kHz to 10 kHz are 0.33 m to 0.03 m. Since scattering/transmission/reflection depend in part on the ratio of the wavelength to object size, very different results can be expected at the different frequencies.

In an example of a network-building procedure of an embodiment, a situation arises wherein every node has learned the distances to its neighbors, and some small fraction of the nodes of the network know their true locations. As part of the network-building procedure, imprecise estimates of the locations of the nodes that lie within or near the convex hull of the nodes with known position can be quickly generated. To start, the shortest distance (multihop) paths are determined between each reference node. All nodes on this path are assigned a location that is the simple linear average of the two reference locations, as if the path were a straight line. A node which lies on the intersection of two such paths is assigned the average of the two indicated locations. All nodes that have been assigned locations now serve as references. The shortest paths among these new reference nodes are computed, assigning locations to all intermediate nodes as before, and continuing these iterations until no further nodes get assigned locations. This will not assign initial position estimates to all nodes. The remainder can be assigned locations based on pairwise averages of distances to the nearest four original reference nodes. Some consistency checks on location can be made using trigonometry and one further reference node (say, the apparently closest new one), to determine whether or not the node likely lies within the convex hull of the original four reference nodes.

In two dimensions, if two nodes have known locations, and the distances to a third node are known from the two nodes, then trigonometry can be used to precisely determine the location of the third node. Distances from another node can resolve any ambiguity. Similarly, simple geometry produces precise calculations in three dimensions given four reference nodes. But since the references may also have uncertainty, an alternative procedure is to perform a series of iterations where successive trigonometric calculations result only in a delta of movement in the position of the node. This process can determine locations of nodes outside the convex hull of the reference nodes. It is also amenable to averaging over the positions of all neighbors, since there will often be more neighbors than are strictly required to determine location. This will reduce the effects of distance measurement errors.

Alternatively, the network can solve the complete set of equations of intersections of hyperbola as a least squares optimization problem. This is undesirable for many reasons, not least because it is not easily transformed into a distributed computation, and due to its potential to be highly ill-conditioned. A decentralized calculation such as the one outlined above can converge fairly quickly with only local information exchanges being required after the initial position guesses have been made. It can stop whenever the change in position from a previous iteration is small enough.

Position accuracy on the order of one centimeter might be needed for purposes such as coherent acoustic or seismic beamforming. But for most practical purposes much reduced accuracies suffice. For example, if nodes are relatively closely spaced, it may be sufficient to track a target as likely being confined by the convex hull of several nodes. Then accuracies on the order of meters may be good enough. The quick method with one or two trigonometric iterations might suffice in such cases, and it would require much simpler acoustic transducers and receivers.

Figure 39:
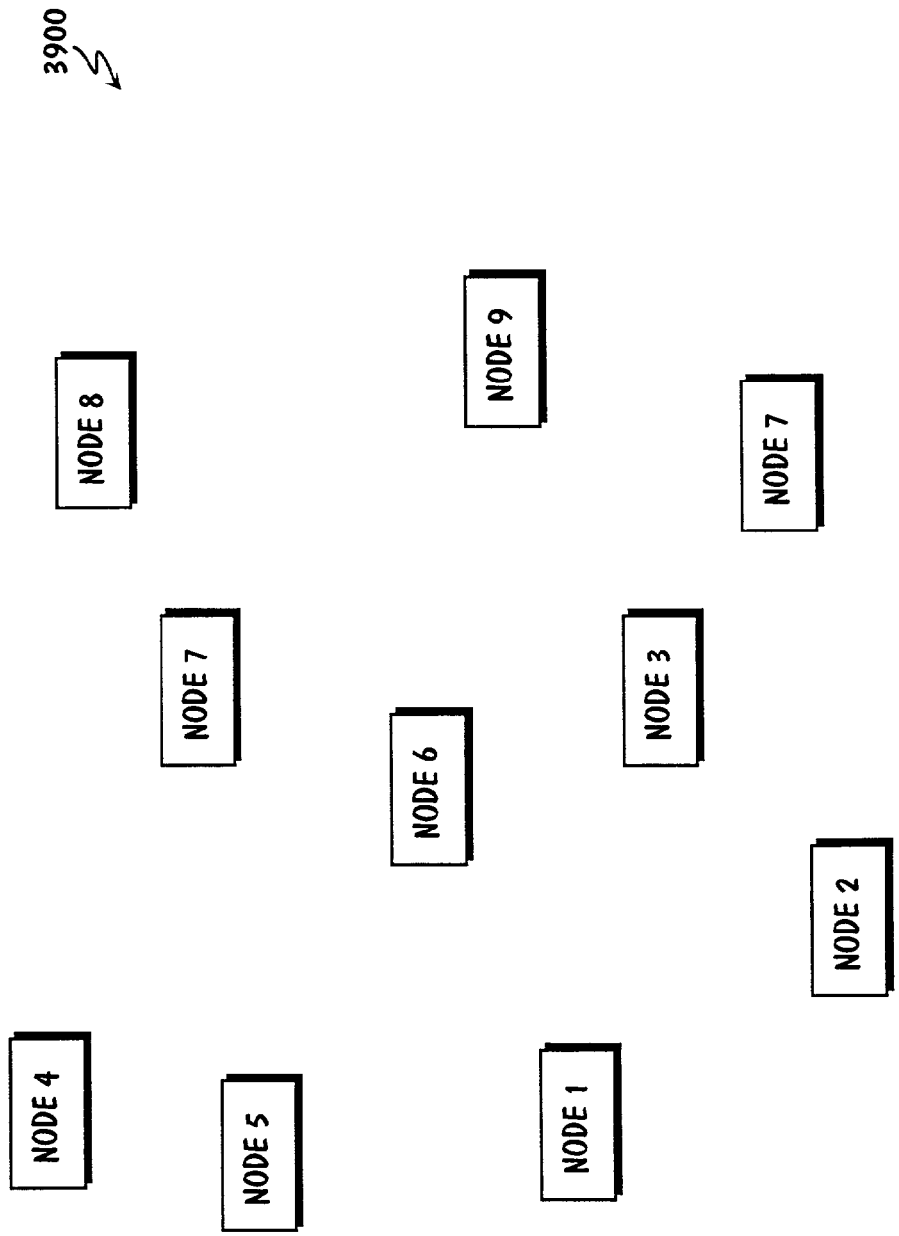
FIG. 39 is an example scenario of network element self-location in a sensor network of an embodiment.

FIG. 39 is an example scenario of network element self-location in a sensor network 3900 of an embodiment. In this example, sensor nodes 2, 5, 8, and 9 contain an absolute position and timing reference mechanism, such as GPS. Furthermore, any or all of the sensor nodes may include transducers for acoustic, infrared (IR), and radio frequency (RF) ranging. Therefore, the nodes have heterogeneous capabilities for ranging. The heterogeneous capabilities further include different margins of ranging error and means to mitigate ranging variability due to environmental factors such as wind. Furthermore, the ranging system is re-used for sensing and communication functions. For example, wideband acoustic functionality is available for use in communicating, bistatic sensing, and ranging.

The advantages of heterogeneous capability of the nodes are numerous, and are exemplified by use of the ranging functionality in providing communications functions. As one example, repeated use of the communications function improves position determination accuracy over time. Also, when the ranging and the timing are conducted together, they can be integrated in a self-organization protocol in order to reduce energy consumption. Moreover, information from several ranging sources is capable of being fused to provide improved accuracy and resistance to environmental variability. Each ranging means is exploited as a communication means, thereby providing improved robustness in the presence of noise and interference.

Applications of WINS NG Technology

There is a wide range of applications of the WINS NG technology having a variety of sensing, processing, and networking requirements, all of which can be met with embodiments of the WINS NG technology. These applications include, but are not limited to, PicoWINS, hybrid WINS networks, dense security networks, asset tracking and management/manufacturing, wireless local area networks (LANs), wireless metropolitan area networks (MANs), composite system design and test, and vehicle internetworking.

PicoWINS

Between WINS NG technology on the one hand and passive radio frequency identification (RFID) tags on the other, there are a range of applications that require some combination of sensing, signal processing, and networking in compact and low-cost systems, with reduced capabilities compared to WINS NG but increased capabilities relative to RFID tags. The PicoWINS embodiment employs many features of the WINS NG technology, but integrates them into more compact, low-power devices. This enables deployment in much greater numbers than WINS NG.

The provision of two-way communications to remote devices enables hybrid networks in which not every element must have the same capabilities. In particular, gateway nodes (e.g., WINS NG nodes) can include the ability to connect to external networks, user interfaces, mass storage, and powerful processing. Thus, the behavior of the remote nodes can be controlled by the gateway (or the network beyond the gateway) so that the remote nodes have a high level of functionality without needing all the features of the gateway node. Two-way communication further enables multihop networks, expanding the coverage range for each gateway. This lowers the total cost of providing coverage of a particular region.

One embodiment of PicoWINS employs flexible, thin film substrate packages, new communication and networking strategies, and new sensing methods. Nodes of this embodiment of PicoWINS are conformal and may be embedded in many packages, marking a departure from previous technologies. Such nodes in various embodiments attach to boots and vehicle tires and treads, and detect proximity, touch, sound, and light. The nodes incorporate new microelectronics for low power, and exploit new methods developed for PicoWINS that provide cooperative sensing and communication in a power constrained and low cost system. In one embodiment, communication physical layers include both RF and acoustic methods. Also, PicoWINS carry processing systems adapted to security. Finally, PicoWINS is interoperable with large-scale WINS networks (e.g., WINS NG) and links via redundant gateways to standard network services. PicoWINS is directed to the most ubiquitous tier of the WINS hierarchy, namely, low-cost, thin, conformal, micropower, autonomous devices.

Figure 40:
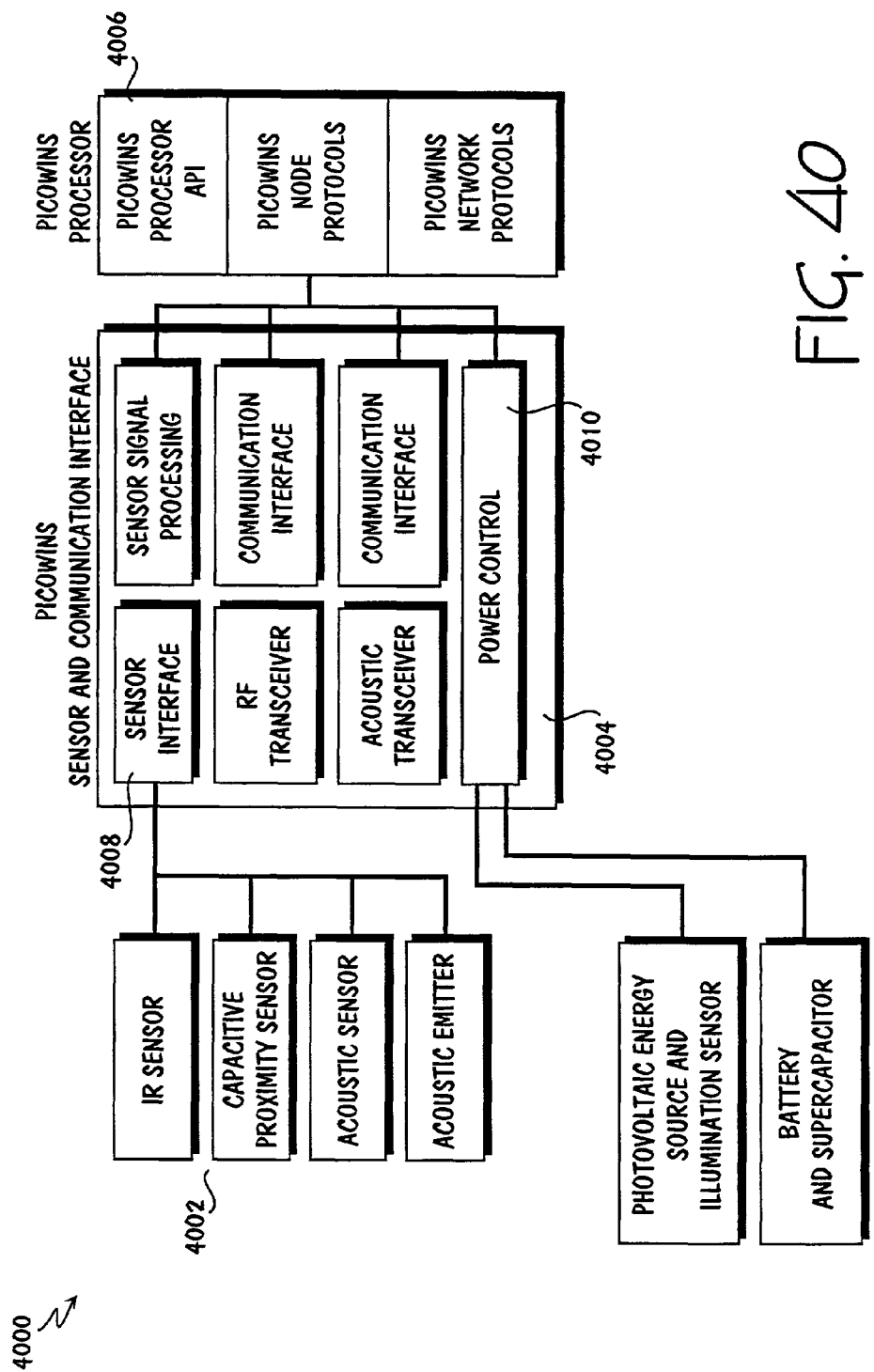
FIG. 40 is a PicoWINS node architecture of an embodiment.

FIG. 40 is a PicoWINS node architecture 4000 of an embodiment.

The PicoWINS node 4000 includes a micropower sensor 4002, communication preprocessor 4004, and accompanying processor 4006. Sensor interfaces 4008 are included along with RF and acoustic power management 4010. The device may also optionally include interfaces for wired communications. This PicoWINS architecture compares to WINS NG in the absence of high-level processors and their associated interfaces and peripherals. Thus, PicoWINS may be more compact.

PicoWINS nodes employs APIs that mirror the functions of WINS NG nodes up to the level of the interface between the preprocessor and processor. That is, while different physical components are employed, applications running on WINS NG nodes do not require special modifications to deal with a network that includes PicoWINS nodes. Using the APIs, the functions of the PicoWINS nodes are embedded, without the need for keeping commonality of electronic components. Further, PicoWINS networks immediately gain access to the many resources available to WINS NG networks, by means of connections to WINS NG nodes and gateways. Thus, hybrid combinations are enabled wherein, for example, signal processing tasks are split between the different classes of nodes, in a manner similar to the splitting of tasks between processors and preprocessors within WINS NG nodes.

Figure 41:
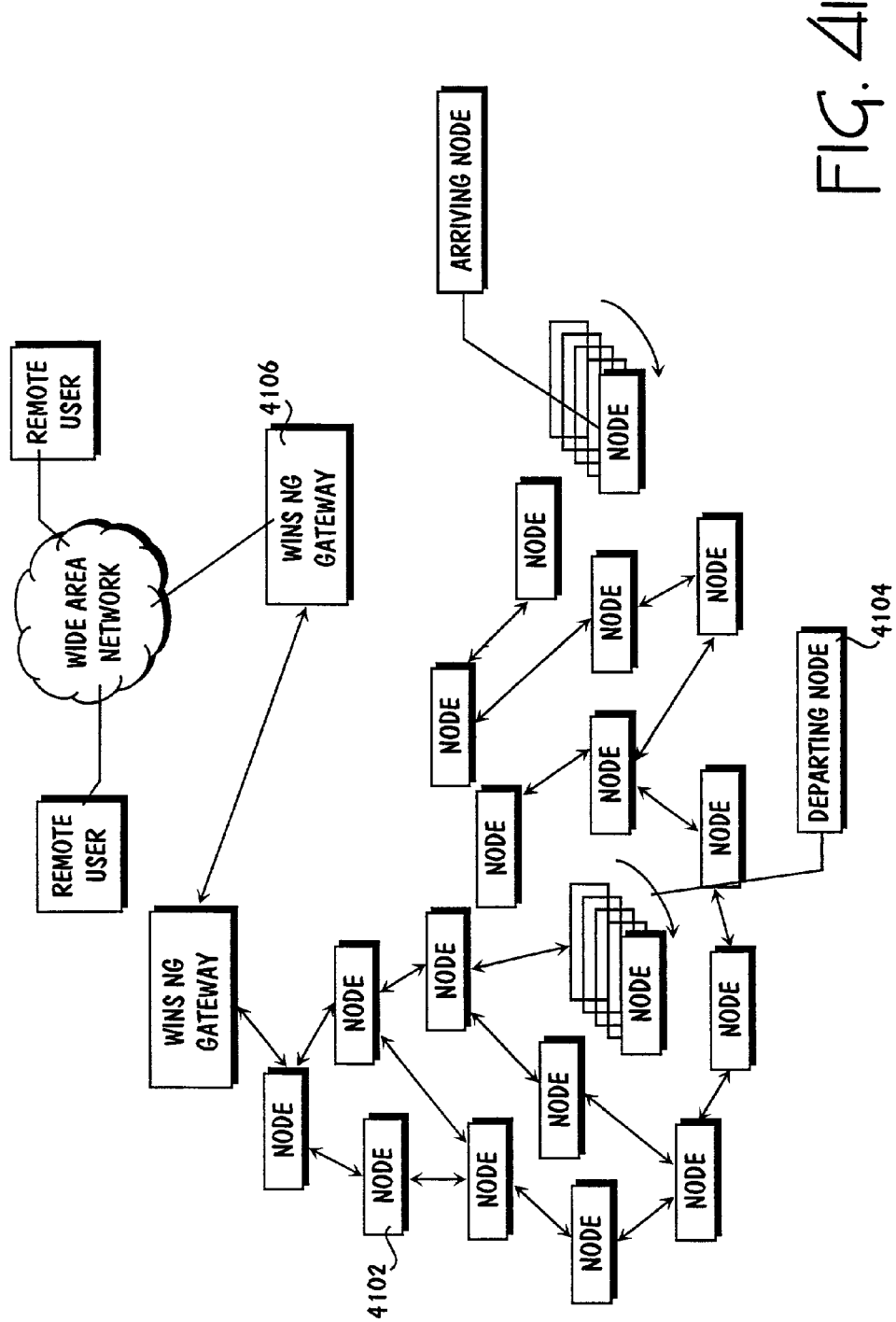
FIG. 41 is a hybrid network including PicoWINS nodes of an embodiment.

FIG. 41 is a hybrid network 4100 including PicoWINS nodes 4102 of an embodiment. The PicoWINS nodes 4102 are scattered in the environment, for example, by manual emplacement, air drop, or delivery of a munitions canister filled with PicoWINS packages. The PicoWINS nodes 4102 detect motion and presence. In addition, if a PicoWINS node 4104 is attached to passing personnel and/or vehicles, its motion and ultimate departure is noted by the network and communicated to the network. The PicoWINS nodes 4102 communicate status, network management, and sensor event information, but are not so limited. Through the WINS NG gateway 4106, access to a wide area network 4108 such as the Internet, and the associated services as described with reference to WINS NG networks are available. For example, the PicoWINS devices support programmability by remote web clients, and the WINS gateway provides access to a database for querying PicoWINS status and events.

A frontier in global network extension is the connectivity of the Internet to deeply distributed processors, sensors, and controls. The PicoWINS system provides low cost devices that are deeply and widely distributed in environments and integrated into equipment to provide continuous, global sensing and monitoring of an area, area and facility security, environmental status and sensing, and monitoring of globally distributed assets. In contrast to the restrictions and cost of conventional wireline networking, the low power wireless networking between Pico WINS nodes provides the deep and dense deployment required for these applications.

A state machine architecture allows sensing, signal processing, computation, communication, and power management, supported in a robust and convenient coding method. The PicoWINS state machine of an embodiment enables low power operation, contains all of the PicoWINS functions and variable timing and response requirements in one set of linked modules, and has the ability to rapidly develop and reconfigure. It is implemented using a PicoWINS board that includes an analog sensor interface, but is not so limited.

A state machine controls sensing, signal processing, event recognition, communication, and power management, but is not so limited. In addition, the state machine manages network assembly by controlling search and acquire messaging by nodes. The state machine is implemented to allow for direct access to analog sensor inputs. Typical implementations of node-level protocols have involved algorithms and code that are fixed in nature, making changes or optimization difficult. By contrast, the PicoWINS state machine manages the myriad node events in an organized fashion that is convenient and transparent to the developer. In one platform, the node functions of sensing and communication, previously difficult to integrate in a compact processor, are managed easily. Separate adjustment of communication, sensing, and decision functions is enabled without resorting to large code changes. This state machine architecture also lends a particular degree of convenience to development for micropower processors for which only limited code development support is available.

A critical challenge for tactical sensor nodes is the inherent reduction in sensor sensitivity that accompanies scale reduction. In the case of conventional methods, as the scale of the node is reduced, there is degradation in sensor performance. By contrast, an embodiment of the Pico WINS system exploits the package as a sensor. By employing the entire package, some of the limitations of compact geometry are eliminated. In addition, by selecting a piezoelectric package system, sensing operations may be performed without power dissipation on the part of the sensor. In one embodiment, the package design implements seismic vibration detection with the required sensing proof masses being formed by battery cells. The package itself has appropriate scale to permit low frequency vibration measurement.

The PicoWINS design also provides nodes carrying a mix of sensor capabilities. For example, while all nodes may carry seismic and optical sensing, some nodes may carry magnetic, or other sensor systems. A combination of sensors can be selected for a specific deployment environment. One of the primary challenges for implementation of compact sensor nodes is providing the required continuous sensing and communication availability in a compact package without the use of conventional battery cells. An innovation for PicoWINS is the development of a tag that requires only sensors that do not require a continuous bias current or voltage.

Figure 42:
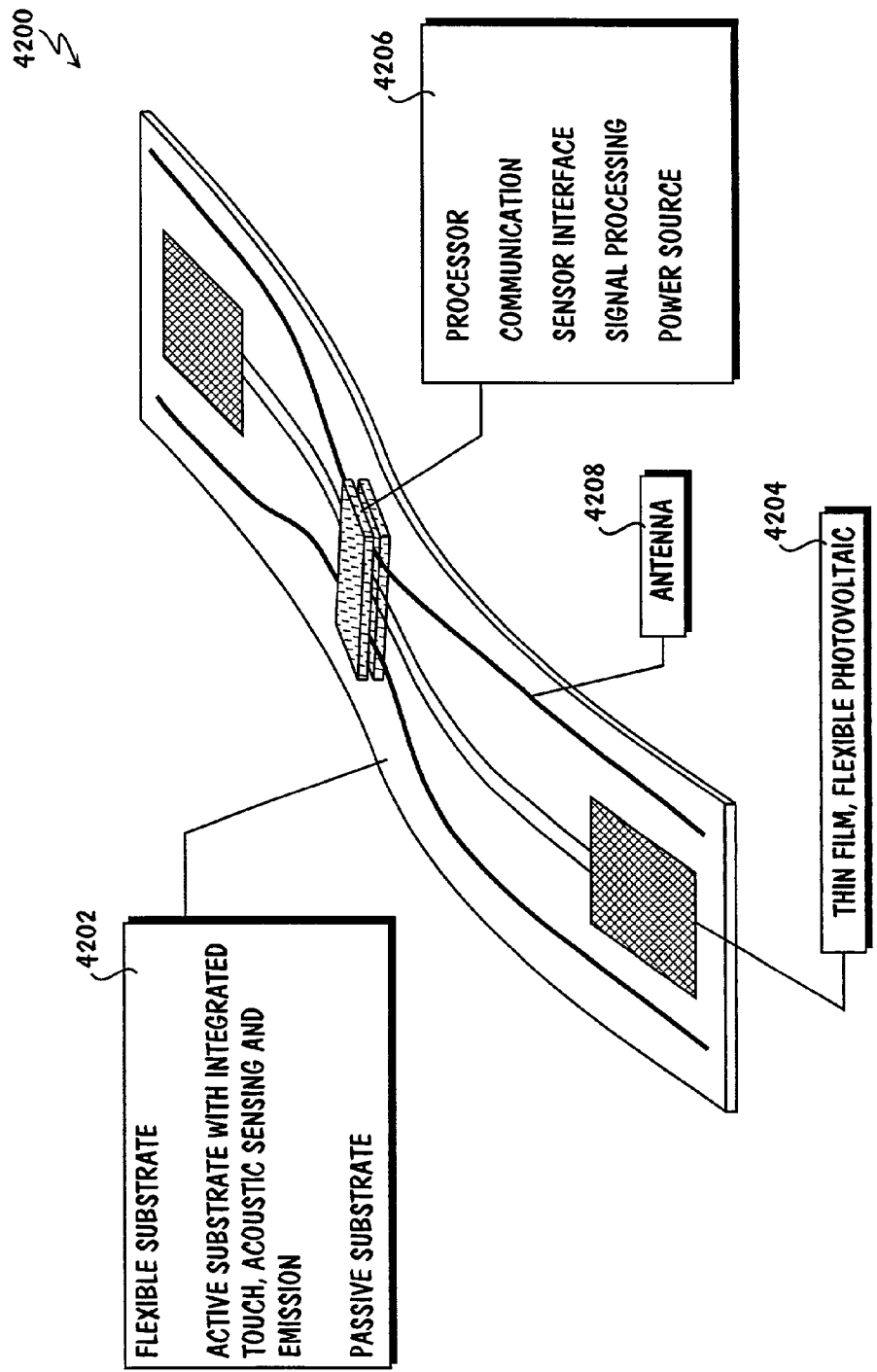
FIG. 42 is a PicoWINS node of an embodiment.

FIG. 42 is a PicoWINS node 4200 of an embodiment. The PicoWINS node 4200 is packaged using thin film, flexible systems 4202, but is not so limited. The substrate 4202, in this case the piezoelectric polymer $PVF_2$, operates as an acoustic sensor and source. Thin film, flexible photovoltaic devices 4204 are also incorporated into the substrate 4202 to provide an energy source and an optical presence detection sensor. Furthermore, an antenna 4208 can be incorporated into the substrate or carried on the substrate. A micropower complementary metal-oxide semiconductor (CMOS) application specific integrated circuit (ASIC) die 4206, or alternatively, a small board or multichip module occupies the center of this structure. The PicoWINs node 4200, or sensing element, exploits micropower CMOS technology including a low light visible photodetector channel, CMOS passive IR sensor (polysilicon bolometer), and $PVF_2$ vibration and acoustic sensor. The PicoWINS sensors reduce power dissipation with piezoelectric and optical sensors that require no voltage or current bias.

Flexible substrate piezoelectrics offer many advantages as sensors for this application, providing signal outputs greater than 10 Volts for the large deflections associated with the motion of a Pico WINS node that is attached to moving threat vehicles or personnel. This is accomplished without power dissipation. Several piezoelectric films have been developed into highly responsive touch/pressure sensors that are embedded directly into the sensor substrate. Specifically, Kynar, a brand name for polyvinylidenedifloride, ($PVF_2$) a polymer film, can be polarized and thus made to possess many piezoelectric and pyroelectric properties. The piezo effects can be initiated by substrate compression or longitudinal stretching. By laminating the thin Kynar onto a flexible substrate, bending causes an off axis moment which causes a longitudinal stretching thus producing a proportionally large output voltage. Various types of piezo sensors may be used in this application, ranging from insulated coaxial cable pressure sensor structures to thin 40 micrometer ($\mu$m) sheets of raw Kynar. The piezo effect is much more pronounced in the sensor where the Kynar is laminated to a support material such as Kapton or Mylar.

Additionally, embodiments for an accelerometer having moderate sensitivity have been developed using the same Kynar/Kapton substrate as the sensor. In this embodiment, proof masses are suspended in a distributed arrangement around an interface system. Compact battery cells then serve both as a power source and as the proof masses. The substrate is used as the suspension. A relatively low resonant frequency is designed allowing for increased sensor response.

Other applications of the substrate include photoelectric cells and pyroelectric phenomena for use as a back-up power source as well as a motion detector. The photoelectric cells can absorb enough energy in one day for several days of operation, when combined with the efficient power management techniques in place, and the passive sensors. In one embodiment, the substrate can be designed as an integral structural element. In one embodiment, a maple-seed shape is adopted so that the nodes may be deployed by air, and fall in a stable-rotating pattern. The substrate thus not only provides sensing capability, but aerodynamic benefits. In another embodiment, the substrate flexibility permits the creation of sensor "tape", that can be unrolled to different lengths (e.g., for a perimeter) as required.

A PicoWINS node of an alternate embodiment uses a high dielectric substrate to minimize antenna size in conjunction with limited local processing, networking, and sensing capability. These nodes are of minimal volume and cross sectional area so as to reduce cost, facilitate delivery, and create an unobtrusive sensing capability. The alternate PicoWINS nodes have numerous integrated capabilities including, but not limited to: sensor processing; RF front end and IF band for low bit rate secure message communication; accelerometer, inductive, acoustic, and proximity sensors; RF ranging capability leveraging communication with other node types including resource rich WINS NG nodes; local battery or power supply; multiple power modes of operation for extended lifetimes; resonant annular ring patch antenna for efficient transmit and receive power use; and, adhesives to enable attachment to a passing object.

Figure 43:
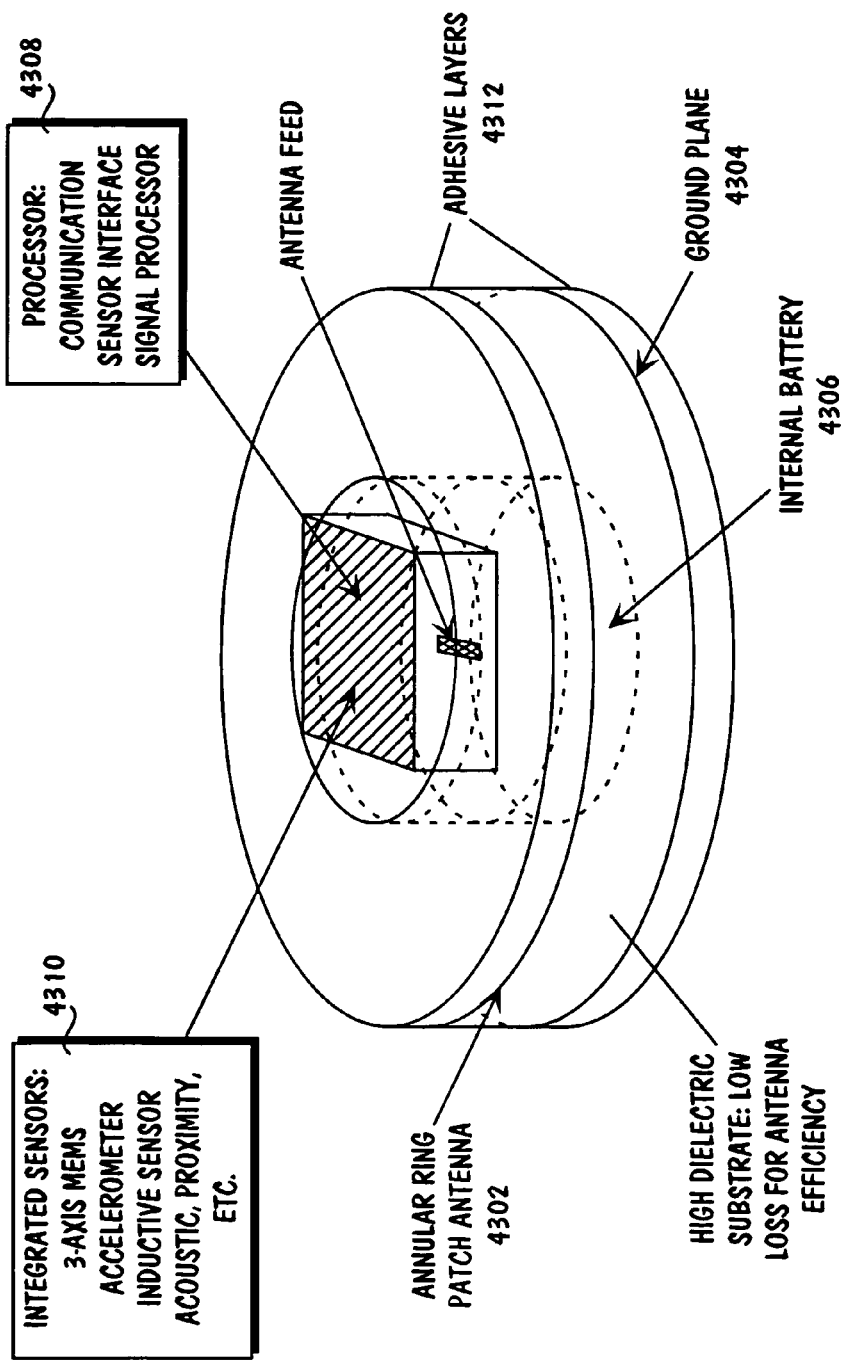
FIG. 43 is a block diagram of a PicoWINS node of an alternate embodiment.

FIG. 43 is a block diagram of a PicoWINS node 4300 of an alternate embodiment. This PicoWINS node 4300 provides a compact sealed structure. The electronics are nested within the center of the annular ring patch antenna away from the high field set up between the patch antenna 4302 and the ground plane 4304, thereby minimizing the size. Enclosed in the center of the ring are at least one battery 4306, processor 4308, and integrated sensors 4310. The node 4300 provides high input impedance to the antenna 4302 associated with the lowest order mode of the annular ring patch antenna, with the antenna numerically simulated with commercial full-wave software for optimal operation with the enclosed battery, electronics, and high dielectric substrate. An adhesive mechanism or layer 4312 is coupled to the top and bottom of the antenna. The adhesive mechanism 4312 includes plastic hooks, burrs, Velcro, glue, and electromagnets, but is not so limited.

The PicoWINS nodes interoperate to enhance the capability and flexibility of the entire network. In addition to providing low-cost limited functional networking to WINS NG nodes, a variety of PicoWINS nodes operate in the same environment leveraging the capabilities of each system option. An embodiment of PicoWINS network operation includes communication among separate thin film piezoelectric substrate PicoWINS nodes and lower cross-sectional area annular ring antenna PicoWINS nodes, networking each with a distinct sensing and distinct ranging accuracy. Providing modular processing hardware, common communication protocols, and APIs enables the low cost creation of a variety of PicoWINS systems, each optimized for particular sensor capability, ranging accuracy, size or level of unobtrusiveness, and operating lifetime.

In addition to modularity for limited size and power requirements, embodiments of PicoWINS nodes can take advantage of dual use of hardware. As an example, acoustic sensors can be integrated with an acoustic ranging front end. Furthermore, antenna input can be monitored at transmission (reflection coefficient) to detect motion through changes in the antennas near field environment at a single frequency (providing an electromagnetic sensor which may be enhanced at cost to communication efficiency by using an antenna sensitive to detuning such as a sub resonant ring or dipole).

In the area of antennas, electromagnetics for compact tactical tags and wireless sensors have not previously been optimized for an application like PicoWINS. First, the PicoWINS tactical tag system places unique requirements on the size of wireless communicators. Active wireless devices have previously been excessively large for tactical tag applications. Radio frequency identification (RFID) tags are available in compact package form; however, these devices require high power interrogators immediately adjacent (typically within 1 m) to the tag.

Conventional RF systems are deployed in large packages that are designed to be mounted in a fashion that provides a stable and reproducible electromagnetic environment. PicoWINS devices are likely deployed in an undetermined orientation (with distribution on the surface or attached to threats), and operate in variable environments (operating on a surface, attached to a target, etc.). Further, PicoWINS devices operate in conditions of exposure to rigorous environmental conditions including shock, temperature excursion, and exposure to weather. Further, the PicoWINS electromagnetics affect the impedance matching requirements for PicoWINS receiver and transmitter systems.

A number of antenna configurations can be used in an embodiment, including but not limited to patch antennas, printed and modularly attached dipoles and loops, and sub-resonant matched elements. A patch antenna with a rectangular shape simplifies the analysis of the fields under the patch in that sinusoids are easily fit to the equivalent cavity boundary conditions. However, other shapes of patches such as circular, triangular, or a variety of other shapes also provide resonant antennas. Resonant structures are appropriate for PicoWINS due to their relative insensitivity to the surrounding environment. Other configurations, such as traveling wave or leaky wave antennas, may also be appropriate, particularly when combining communication antennas with an electromagnetic proximity sensor.

Of particular utility for PicoWINS is the annular ring geometry. In one embodiment, it is implemented with a metalized ring of inner radius a, and outer radius b, on a dielectric substrate above a ground plane. This ring can be modeled as a cavity with a perfect electric conductor (PEC) top and bottom and a perfect magnetic conductor (PMC) surrounding the external and internal radii. The resonance conditions for this structure are derived from the eigenfunctions resulting from the solution of the wave equation in cylindrical coordinates to match the PMC and PEC boundary conditions. The primary reason for using the dielectric ring is the reduction in size achieved for the lowest order mode as compared to the square, circular, or triangular patch antenna, while providing high field confinement, i.e., detuning insensitivity to the environment.

The dielectric ring antenna offers compact geometry with efficient radiation, and offers the prospect of a package producing a compact, sealed structure, as discussed herein. The properties of the dielectric ring antenna show suitability for 2.4 and 5.8 GHz radiation. Diameter of the dielectric ring scales from approximately 2 cm to less than 1 cm for these two frequencies, respectively, on Rogers 4005 substrates. Further size reductions by a factor of 1.5 may also be achieved using a ring antenna optimized on an aluminum substrate such as Rogers 5210.

The WINS NG and PicoWINS technologies of an embodiment support bi-static sensing and position location. Compact tactical sensing systems rely on passive seismic, acoustic, and infrared detection methods. These sensor channels are supported by micropower sensing methods, and incorporated into micropower PicoWINS packages in some embodiments. However, active methods that are compatible with low power operation are also of interest. Active sensors direct a beam of radiation (typically acoustic, infrared, or microwave) towards regions in which a threat is expected. Active sensors offer an advantage over passive devices in detecting threats that are quiet (acoustically or electromagnetically) or moving at a slow rate. Active sensors typically operate in a monostatic mode where a beam of radiation is delivered by a source and reflected radiation from the environment is received by the source. Monostatic sensors suffer from the problem that without a natural barrier, or backstop, any motion of an object in the distant field of view may yield an alarm condition. This limits the applicability of these devices and may lead to the requirements for expensive, large, installations.

To overcome this energy problem, an embodiment of a WINS NG, PicoWINS or hybrid WINS network provides a series of network bi-static sensors. Using this technology, the WINS network is exploited to create natural radiation monitoring paths, forming a network of densely interlinked effective "trip wires" in the secured regions. Specifically, radiation may be launched from a network node using infrared, acoustic, or microwave beams. This transmission includes a combined probe beam and signal code for beam intensity control and propagation measurement. This energy carrier is modulated in time so as to provide an identifying code corresponding to the source. Then any other WINS node may receive this transmission and detect changes in transmission loss. As such, active source signal propagation and scattering is used to identify threats as beam perturbations. This yields at least two benefits: the transmission signal to noise ratio is large, and network transmission and reception effectively terminate the beam and accurately define the propagation path, eliminating the problems with undefined detection volume.

The PicoWINS of an embodiment includes a network bi-static sensing method based on low power acoustic transducers. Receiving nodes may acquire the encoded signal and may derive frequency and time varying transmission path loss information. The acoustic transducers have additional benefit in the geolocation of the nodes. Bi-static sensing and network node relative geolocation are accomplished with a multi-level network of transmitting and receiving nodes. Low power operation relies on low duty cycle operation of the acoustic source. In the following scenario, the low-powered sensing receiver nodes are scattered through a given protection area. These nodes may have energy-constrained processing capabilities and no other position determination methods or devices (for example, GPS). Relative node geolocation mapping may be completed using the following method. Absolute geolocation requires that one or more nodes carry GPS and compass heading sensors.

In one network embodiment, PicoWINS nodes are scattered throughout a protection area. Some members of this population carry acoustic transmitters. After dispersal, an area mapping mode is initiated for relative geolocation of all the nodes with relation to a base-station, for example, a WINS NG node. After an RF sync pulse, a directional ultrasonic transmitter sweeps out a 360° arc. By knowing the time of reception, a rough mapping of all nodes with respect to a base station is achieved. Since the location of the base station is known, not accounting for multi-path signals, a rough estimate of the node position is easily ascertained relative to the base station. This method forms an analog to the very high frequency omni-range radio (VOR) avionics position systems. By operating at low duty cycle, net energy cost is low. The use of acoustic ranging methods, instead of RF methods, relaxes requirements for high processing speed synchronization and high energy for time-of-flight measurement.

The use of multiple nodes, providing time-of-flight information for propagation in both upwind and downwind directions, eliminates wind speed induced errors. This is analogous to the methods used for wind speed cancellation in the meteorological systems that provide direct measurement of atmospheric temperature through high accuracy measurement of the speed of sound between two points. In another embodiment, the position location methods discussed with reference to WINS NG might be employed.

After geolocation has been completed, network bi-static sensing may commence. In this case, the transmitter either continually sweeps, or transmits in an omni-directional pattern, saturating the environment with a coded ultrasonic signal. Any threat moving through a detection area systematically trips a complex web of detection zones.

The network bi-static capability also provides a reference geolocation map for moving PicoWINS nodes that attach to and move with threats. In this case, the threat location is determined relative to the PicoWINS network.

Jamming of a WINS NG network by an opponent is readily detected and located because the transmission and mapping originate from the center of the coverage area. Any attempt to flood with a jamming acoustic signal is seen as an error and results in an alarm condition. Because the relative sensor placement is known from the mapping sweep, a jammer threat moving across the coverage area transmits its instantaneous position and travel direction back to the network.

Operation algorithms ensure that all of the PicoWINS functionality is contained in a compact, micropower system. In one embodiment, the PicoWINS nodes operate with low clock rate, fully static CMOS processor technology. These processors, operating the state machine system described herein, use standby current of only a few microamps. Using the proper analog input circuit components as well as the proper sensor systems, the PicoWINS node lies fully dormant until a sensor input appears.

In one operational mode, multiple PicoWINS nodes are scattered over an area operating in a constantly vigilant, but deep sleep state. Vehicle and personnel detection rely on sensor systems with no bias energy. For example, these may be the piezoelectric active substrates. The PicoWINS node remains dormant and is inaccessible to the network until an event occurs. This operational mode provides the longest possible operating life. With this mode, operating life approaches the many-year "shelf-life" of the battery sources.

As described herein, the PicoWINS nodes operate with low clock rate, fully static CMOS processor technology. These processors, operating WINS protocols, use operating current of 20-30 microamps at the clock rates used for PicoWINS operation. The PicoWINS processor operates continuously in a vigilant state, examining both sensor signals and network operation. In this alternative operating mode, additional energy that is not required for sensor-triggered operation is supplied to the PicoWINS node communication system. While this operational mode results in increased energy dissipation, it provides connectivity to nodes that may continuously participate in network operation. The PicoWINS nodes remain accessible and may be reprogrammed in this state. Continuous accessibility of the PicoWINS network allows a range of important surveillance capabilities. In other embodiments, both the event-triggered and continuously vigilant modes can be combined for additional behavior requirements.

In the event that a threat is detected, the node enters a state of higher power dissipation and joins a network, transmitting information back to a central master gateway node. While the PicoWINS nodes have limited transmit distances to extend device longevity, they can communicate their status and threat detection information throughout the network using multihop communication methods.

An alternate communication method, which is implemented instead of or in concert with other models, assumes the presence of occasional data collection nodes. These may be at distributed gateways or at specific choke points in the field. In this case, PicoWINS nodes saturate an area of protection with various types of sensor systems. Vehicles, personnel and other objects move through the active area, activating and picking up the sensors. Information is then retrieved at the strategic choke points where nodes with longer transmit range and higher computation power gather, sort, and make decisions on vehicle type or class, personnel, and direction of travel, past position and speed, as well as other parameters. In this protocol, the PicoWINS node function for most of their lifetime in a sleep-mode consuming minimum power because transmission occurs only when a node is disturbed.

Hybrid WINS Networks

The modular structure of the WINS NG and PicoWINS devices, together with the ability to self-assembly from networks to Web connections, enables creation of mixed networks for a variety of purposes. Such hybrid networks can be used for example in security, medical, industrial, military, residential, and vehicular applications on local, metropolitan, and global scales.

One type of mixed or hybrid network supported by embodiments of the WINS NG and Pico WINS technology includes mixed wired/wireless networks. There are a number of situations in which it is desirable for some fraction of the nodes to be connected to a wired network (e.g., to conserve energy), and other situations where dual communication modes are desirable (e.g., for robustness against wires being cut). The calculations herein show how a common baseband can be used for both the wireless and wired communications for the ranges of interest, realizing cost savings in the design.

For a transmit antenna at height $h_t$, receive antenna at height $h_r$ and distance d from the transmitter, a radiated power of $P_t$, transmit and receive antenna gains of $G_t$ and $G_r$, respectively, and assuming a perfectly reflecting (and flat) earth, the received power $P_r$ for the far field is given by $$P_r = \frac{P_t G_t G_r h_t^2 h_r^2}{d^4} \qquad \text{Equation 1}$$

This simple two-ray model assumes no obstructions, absorption, or multipath. The noise power at the receiver is given by $N_o = kFTW$, where $k=1.38\times10^{-23}$ is Boltzman's constant, F is the noise figure of the receiver, T is the temperature in Kelvin, and W is the bandwidth. Thus, the signal-to-noise ratio (SNR) may be simply evaluated.

For telephone wire, charts on the attenuation in dB for different gauges of wires are provided in J. J. Werner, "The HDSL Environment," IEEE JSAC, August 1991. Examples are as follows:

| Frequency | 19 gauge | 22 gauge | 26 gauge |
|---|---|---|---|
| 10 kHz | 2 | 4.5 | 8 |
| 100 kHz | 4 | 8 | 14 |
| 1 MHz | 15 | 24 | 40 |
| 10 MHz | 70 | 95 | 150 |
| 100 MHz | 220 | 300 | 470 |

As an example, using the worst type of wire, signaling at 1 Mb/s at 10 MHz using binary phase shift keying (BPSK), and assuming a very poor noise figure of 30 dB, a transmission range of more than 600 meters (m) can be achieved with less than 1 milliwatt (mW) transmitted power, and a range of more than 300 m can be achieved with less than one microwatt. Since the response of the channel is quite flat after the first hundred kHz, little or no equalization is required. Even at 100 MHz, for 100 m the attenuation is only 30 dB. This compares to radio attenuation of 94 dB, according to equation 1. This savings of 6 orders of magnitude in power actually understates the benefit, since there are no upconversion or downconversion costs. Thus, for example, frequency hopped spread spectrum may be used for the telephone wire, re-using all the baseband hardware from the radio and simply bypassing the upconversion and antenna matching circuitry when the wired connection is employed.

The situation changes for a 1 km range. Here the radio attenuation is 134 dB vs. 294 dB for the wired connection. Spread spectrum might be avoided, instead simply using the lower portion of the frequency spectrum (avoiding the first 20 kHz to obviate the need for equalization). No equalization is used in standard T1 lines. Such data rates are adequate even for collections of still images, provided modest efforts at compression are made.

Echoes are a significant problem with telephone wire, due to impedance mismatches on each end. However, since bandwidth is not at a premium in sensor networks that perform significant signal processing at source, this may be simply handled by using time division duplex transmission. The same approach is used for radio transmission since radios are unable to transmit and receive at the same time on the same frequency.

Thus, the attenuation of telephone wire is small enough for the ranges of interest, and the same modulation strategy may be used as for radio transmission. This enables sharing of the digital baseband hardware among the two situations. With splice boxes inserted along one long line, the multiple access situation for radio and wired are very similar, and the same networking protocol is appropriate with a further reduction in development effort and node cost.

In an embodiment, a sensor web is constructed from a heterogeneous interlocking set of components including the PicoWINS and WINS NG devices. The sensor web includes Pico WINS and WINS NG devices of an embodiment internetworked with each other in a plug and play fashion, in user-selectable configurations which include a mix of wired and wireless couplings. Furthermore, these networks can interface with substantially any commonly available power supply or communications/computer network.

A number of scenarios are possible for the sensor web. In an embodiment, Pico WINS devices are strung together to make communications and power available. This provides spatial antenna diversity, low energy cost communications for beamforming or data fusion, and power distribution from solar to processing nodes, but is not so limited. Additionally, the network can be wired into a WINS NG or similar higher-performance device that performs higher level signal processing, and provides a long range radio link, or an adapter card for communications via a wired network. Alternatively, a pure Pico WINS network terminates in a device having a voice band modem and a connector to the telephone network, or simply a telephone line connection to scavenge power.

Interconnections of an embodiment are made using telephone wire. Telephone wire is low cost, has simple terminations. There are telephone connections in residences and offices, and there are jacks in computers and palm-tops. Data rates can be quite large on short connections as would be expected for PicoWINS and WINS NG networks alike, with very simple baseband modulations. Moreover, it is designed to convey both information and DC power, and comes in many varieties.

Some embodiments use specialized cable connections in order to provide support for higher frequency antennas, smaller size, integrated ribbons of sensing, communications, and power. For example, in an embodiment using literal sensor webs that hang down over objects like trees the wires have a structural purpose. Connections providing enhanced adhesion, or a mechanical lock (e.g. a screw-in connection) may also be used. Moreover, an embodiment that provides robustness against cuts in the wired network uses a short antenna from the improved connector some distance along the wire (e.g. half wavelength). The radio may then be used to communicate with a neighboring node.

The sensor web of an embodiment includes, but is not limited to, PicoWINS devices, WINS NG nodes, power adapters, communication adapters, low-complexity communication line drivers, inter-device cables, cable splitters, external interface cables, and a plug and play network protocol. The PicoWINS devices include sensors, energy storage devices, solar arrays, radios, signal processing, at least two wired ports, and data storage devices. The WINS NG nodes include sensor, energy storage devices, solar array, radios signal processing, at least two wired ports, and data storage devices as for PicoWINS, but with greater capabilities including higher speed communication ports. The power adapters include vehicle, line, and other battery voltages, and include standard communication/power ports for the sensor web. The communication adapters may be embedded in the WINS NG devices or may stand alone.

The inter-device cable includes structurally sound connectors and antenna port capabilities supporting interconnection options that include a telephone wire core option and sensor cable options. Cable splitters of an embodiment avoid the requirement for a large number of ports on PicoWINS nodes. The cable splitters may be passive or may include processing for store and forward or aggregation and routing functions, and repeater functionality. Furthermore, the cable splitters can enable varied interconnect cables in the same network. The external interface cable includes a sensor web connector on one end and a standard telephone jack on another end. It is noted however, that many standard power/communication cable types are possible. The plug and play networking protocol supports a number of network functions via the ordinary process of link discovery and termination. It accepts new wired or wireless connections. Moreover, it deals with gaps by activating radios and performing appropriate data reduction. Additionally, it deals with consequences for database access with network change. The network protocol/database management functions are adaptable according to the communication resources available and the capabilities of the devices on either end of a link, as for example in a WINS NG/Pico WINS connection.

The sensor web of an embodiment supports mixing and matching of numerous network products as well as interfacing with numerous power or information sources. Mixed wired and wireless networks are supported with no manual configuration required by the user. Longer range wired networks are supported using communication adapters that include standard high-speed communication devices for digital subscriber lines. A wide range of computers and communications devices may be integrated into the network, with the sensor web appearing, for example, as an Internet extension.

The WINS technology of an embodiment also supports the coexistence of heterogeneous communications devices. In wireless channels, the multiple access nature makes coexistence of radios with very different transmit power levels and transmission speeds difficult. This is made more complicated by the likelihood of there being no central controller for channel access, making policing of the access channels more difficult. One method is to make available universally understood control channels for negotiation of connections between different users. These users will then ordinarily switch to other channels according to the highest common denominator of their capabilities. These channels can also be used for scheduling of persistent channel access, or to set up a multi-cast group. However, it is generally anticipated that users will not grab these channels for data transport. To enforce this, the protocol times out users or otherwise enforces transmission duty cycle limits through built-in programming operating in each node.

In addressing the problem of defining an access scheme that is robust with respect to interference from users who may not be conforming to the protocol, a WINS embodiment uses a combination of spread spectrum communications and channel coding. As a side benefit, this also provides some diversity. More sophisticated users can attempt transmission at multiple power levels (gradually increasing to avoid excessive interference), but this is not required of all users. The rapid acquisition of the appropriate code phase is assisted by a gateway in charge that can transmit a beacon which carries the access channel phase to everyone within range. Alternatively, absent a gateway, a number of pre-selected channels can be used for exchange of synchronism messages among active users. New users eavesdrop on these channels and then gain admission having learned the correct local phase.

As previously discussed herein, node position location is an important consideration. Additional position location approaches for use in hybrid network embodiments are now discussed. These approaches include mixed networks of WINS NG and PicoWINS nodes, where the WINS NG nodes have GPS.

One network scenario includes a dense network of PicoWINS nodes overlaid with a network of WINS NG nodes, such that every PicoWINS node is within radio range of at least four WINS NG nodes. Three levels of position location accuracy are plausible: location within the convex hull defined by the nearest WINS NG nodes; refinement based on adjacency relations of PicoWINS nodes; 1.5 m if perfect time difference of arrival (TDOA) is performed, using 200 MHz bandwidth.

The simplest location method is based on energy levels. If WINS NG nodes determine their locations using GPS, then they can build a simple model of the local propagation conditions using a series of transmissions among themselves. That is, with path gain $G=\alpha d^{-n}$, two independent paths suffice to solve for $\alpha$ and $n$. This crudely calibrates the energy, so that other hearers can compensate. This information can be broadcast in the sounding signals from the WINS NG nodes after performance of the calibration step. The PicoWINS nodes hearing the sounding signals can then adjust according to the formula for loss to estimate the apparent range. The sounding signal of course also includes Cartesian coordinates, so that the PicoWINS node can solve a system of equations to estimate its location.

This procedure suffers from several sources of inaccuracies. First, the transmission loss depends on direction, since the topography is non-uniform. Second, local shadowing may be very different for nodes even in the same direction. Third, multipath fading may be quite broadband. All of these can lead to large errors in apparent position. However, if the node can hear many WINS NG radios, some weighted averaging can be performed so that the node has a good chance of at least locating itself among the closest of these radios.

Accuracy can be improved with a high density of PicoWINS nodes that also transmit. In this case each node locates itself within the convex hull of its neighbors. Using these adjacency constraints, a distributed iteration on the estimates of the positions of the nodes is performed.

TDOA methods are also possible, but here the clock drift can be problematic. If both nodes performing ranging have perfect timing, the procedure is as follows. Node 1 sends a transition-rich sequence. Node 2 records the positions of the transitions and after a fixed delay sends a similar sequence in response. Node 1 then repeats after a fixed delay, and iteration is performed. Averaging the time differences between the same transitions over the sequence and subtracting the fixed delays results in an estimate of the time difference. Alternatively and more realistically, an autocorrelation can be performed on the sequence to yield the peak. Peak positions are compared in successive autocorrelations, more or less as in early/late gate timing recovery. Unfortunately, the clocks of both nodes will deviate from the true frequency, both systematically and randomly. Multiple repetitions take care of the random but not the systematic drifts. The systematic errors over the round trip interval must be only a few nanoseconds for the desired measurement accuracies. This means for example that ranging at shorter distances tolerates larger systematic errors, since the physical round trip is shorter and the sequences can be shorter, because SNR is higher. Thus, multiple ping-pong round trip measurements of short duration are better than single long duration sounding pulses even though both have the same noise averaging properties.

Now, all WINS NG nodes in the neighborhood equipped with GPS can derive an accurate clock from the satellites. PicoWINS nodes can then derive their clock from the sounding transmissions of the WINS NG nodes so that the systematic drift can be kept small. Absent GPS, but with an accurate clock, one node can broadcast a timing beacon. This broadcast can alternate with sounding signals, so that even though all nodes possess only one radio all nodes get slaved to the same clock. The appropriate duty cycle for clock beacon and sounding signals depends on the clock drift rates and the SNR for the transmissions. In this way, position accuracy depends chiefly on the most reliable clock in the transmission neighborhood (provided drifts are more or less random after acquisition). Furthermore, nodes may be specially constructed for this purpose having duty cycles adjusted based on the classes of nodes performing ranging.

In a hybrid network embodiment, PicoWINS nodes or tags perform ranging using beacon chirp pulses emitted by WINS NG class nodes. Using this technique the WINS NG nodes send out a sequence of pulses, with varying intervals so that the wavefronts intersect at different places over time. The pulses include some coding to identify themselves. Tags which receive signals from two different sources can use simple amplitude modulation (AM)-style diode demodulators to record these wavefront coincidences, and then the WINS NG nodes can tell the tags their positions. This procedure produces good results when the WINS NG nodes have accurate clocks, range among themselves, synchronize their clocks, and the tags have a means of hopping their information back to at least one WINS NG node. It places minimal clock burdens on the tags.

Regarding ranging among the reference nodes, the master sends out a pulse of duration TM, which a slave uses to derive its timing. There is a propagation delay of TP, and a short guard time TG before the slave sends a short response pulse of duration TR, whose length is set by the need for a reasonable SNR at the correlator output in the master. After the propagation and guard time delays, the master repeats its pulse. This is repeated as necessary to average over the noise, and thus TR can be made quite short. Round trip time is determined by looking at the time between autocorrelation peaks T=2TP+2TG+TR+TM. If the master's clock is perfect, uncertainty in timing is determined by the rate of drift of the slave's clock over the interval TG+TR. For example, suppose the clock rate is 200 MHz, with drift of 200 Hz (1 part in $10^6$). Pulse widths of 200 MHz can yield a distance resolution of 1.5 m, with chips of 5 nanosecond (ns) duration. At 200 Hz, a drift of 1 ns will take 40 chirps. This method can apply to either acoustic or RF transmission.

In an embodiment each tag can hear up to three nodes that send out ranging pulses, for example, short chirps over the 200 MHz range. Tags located where pulses overlap in time determine that they are halfway between the sources if the pulses were sent at the same time. Given an offset in the launch time of the pulses, nodes at other locations can get the ranges to each node. Increasing the time duration of the pulses increases the area that hears a coincidence. By dithering the start times of pulses, the area between a set of nodes can be painted so that every tag gets coincidences for each pair. One node can be designated as the master. After the other WINS NG nodes have learned their positions, they can subsequently keep their clocks synchronized by listening to the pulses launched by the master, and dither their launch times according to a schedule computed using to an algorithm known by all the nodes.

Now consider a tag which hears a pulse x(t) launched by node 1 and a pulse y(t) launched by node 2. The received wave at the tag is $r(t)=x(t)+y(t)=A \cos(\omega t+\theta_1(\theta))+B \cos(\omega t+\theta_2(t))$. This can be demodulated with a standard AM diode (envelope) detector. Without loss of generality, suppose B<A, and rewrite r(t) as:

$$r(t)=(A-B)\cos(\omega t+\theta_1(t))+B(\cos(\omega t+\theta_1(t))+\cos(\omega t+\theta_2(t))).$$

Then apply the trigonometric identity cos Q cos R=½ cos (Q−R)+½ cos(Q+R) to obtain:

$$2 \cos \omega t \cos \theta_1(t)+2 \cos \omega t \cos \theta_2(t)-\tfrac{1}{2} [\cos(\omega t-\theta_1(t))+\tfrac{1}{2}\cos(\omega t-\theta_2(t))].$$

The term in brackets is essentially at the carrier while the terms out front are two AM waves. The envelope detector will eliminate all terms near the carrier frequency, leaving $$2B [\cos \theta_1(t)+\cos \theta_2(t)].$$

Applying the same trigonometric identity, this is $$4B \cos \theta_1(t)\cos \theta_2(t)-B \cos(\theta_1(t)-\theta_2(t)).$$

The first term can be removed by further low pass filtering, leaving a frequency modulated sinusoid at the same strength as the weaker of the waves that reach the tag. With chirps, the frequency difference is constant, leading to a phase slope that linearly depends on the offset in the perceived onset of the chirps. This leads to refinement of position, especially when the tag has a receiver that is tuned to determine which wave arrived first (to resolve a two-fold ambiguity). If the relative start times of the pulses are slowly changed, the position can be refined by choosing the coincidence event which produces the longest and lowest-frequency baseband signal, even for tags having only envelope detectors.

The ranging signals are not limited to chirps. For security purposes, chirps or tones could be hopped, with the time durations of the hops set so that reasonable coincidence distances result for the pulses. The hopping could be done, for example, using direct digital frequency synthesis (DDFS) to keep phase coherence. Each coincidence paints the branch of a hyperbola closest to the node with the delayed signal. The width of the hyperbola is equal to the pulse duration times the speed of light, and thus a 50 ns pulse paints a hyperbola to branch of width 15 m. Of course distance resolution can be increased by looking at the frequency difference at baseband, and the time duration of the coincidence. The position along the hyperbola is determined by considering coincidences from other pairs of transmitters. The time to paint a 30 m square region is not large for three or four source nodes, even if time offsets are designed to move less than a meter at a time, since we can launch new pulses every 100 ns (the time for the wavefront to move 30 m).

Dense Security Networks

Network security applications prove to be difficult for typical network solutions because of requirements such as very high detection probabilities with very low costs. Further, deliberate countermeasures to the detection network will be attempted, and so it must be robust. One embodiment of the WINS technology that accomplishes the intended task is a heterogeneous and multiply-layered network. By presenting the opponent with a large number of means by which it can be sensed and tracked, design of countermeasures becomes extremely costly. A layered, but internetworked, detection system permits incremental deployment and augmentation, providing cost efficiencies. Such an approach is useful in many applications, for example tagging of assets or materials for inventory control, automation of logistics, automated baggage handling, and automated check-out at retail outlets.

The deployment of WINS NG systems in security network applications such as defense applications for battlefield, perimeter, and base security, as well as civilian analogs such as campus, building, and residence security takes advantage of the low-cost scalable WINS self-installing architecture. The WINS NG sensing elements are located in relative proximity to potential threats and multiple nodes may simultaneously be brought to bear on threat detection and assessment. This dense distribution, when combined with proper networking, enables multihop, short range communication between nodes. Together with the internal signal processing that vastly reduces the quantity of data to transmit, the largest WINS power demand, communications operating power, is drastically reduced. Furthermore, network scalability is enhanced. The internal layered signal processing allows low average power dissipation with continuous vigilance, and more sophisticated processing on occasion to reduce false alarms and misidentifications.

Requirements of typical security network systems for constant vigilance have yielded systems that operate at high continuous power dissipation. Attempts to reduce operating power have constrained development to non-standard micropower platforms. These platforms are not scalable in performance and do not support standard development tools.

The WINS NG system, by contrast, not only supports standard development tools while maintaining low power operation, but also is plug and play from network assembly to connections to databases operated using the web server and web assistant. This enables remote reconfiguration and facilitates a wide range of extra functionality for security networks.

Figure 44:
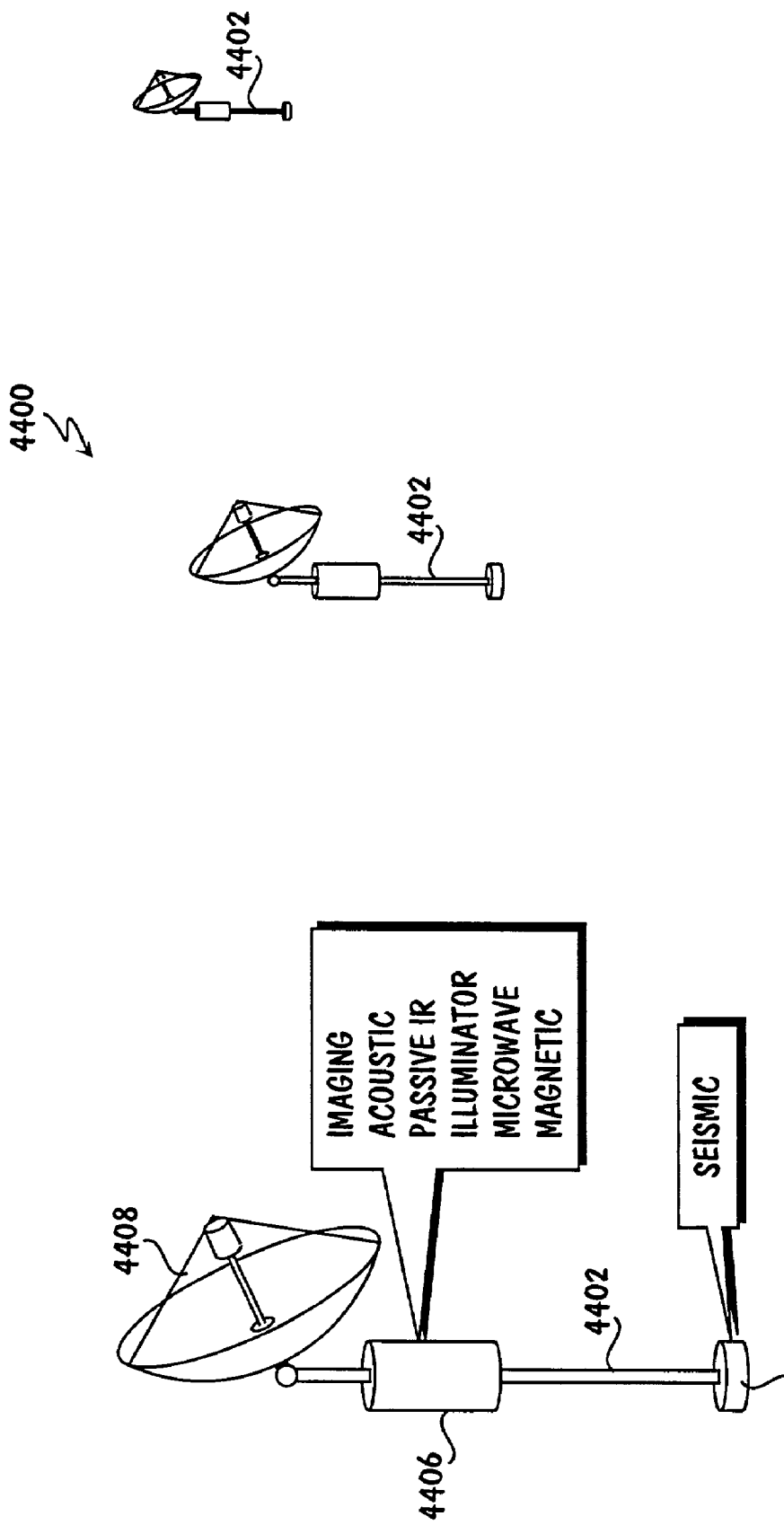
FIG. 44 diagrams a security system using a WINS NG sensor network of an embodiment.

FIG. 44 diagrams a security system 4400 using a WINS NG sensor network of an embodiment. The sensor node 4402 includes seismic sensors 4404 at the base and a sensor suite 4406 on a raised column, for example, for a perimeter defense application. The nodes are compact in volume permitting many to be carried. The column supports imaging, passive IR, active and passive acoustic, active microwave, magnetic, and other sensors as needed. An active illuminator 4408 can also be carried. Solar photovoltaics provide power along with secondary cells for indefinite life. Low operating power permits extended operation without solar illumination.

Figure 45:
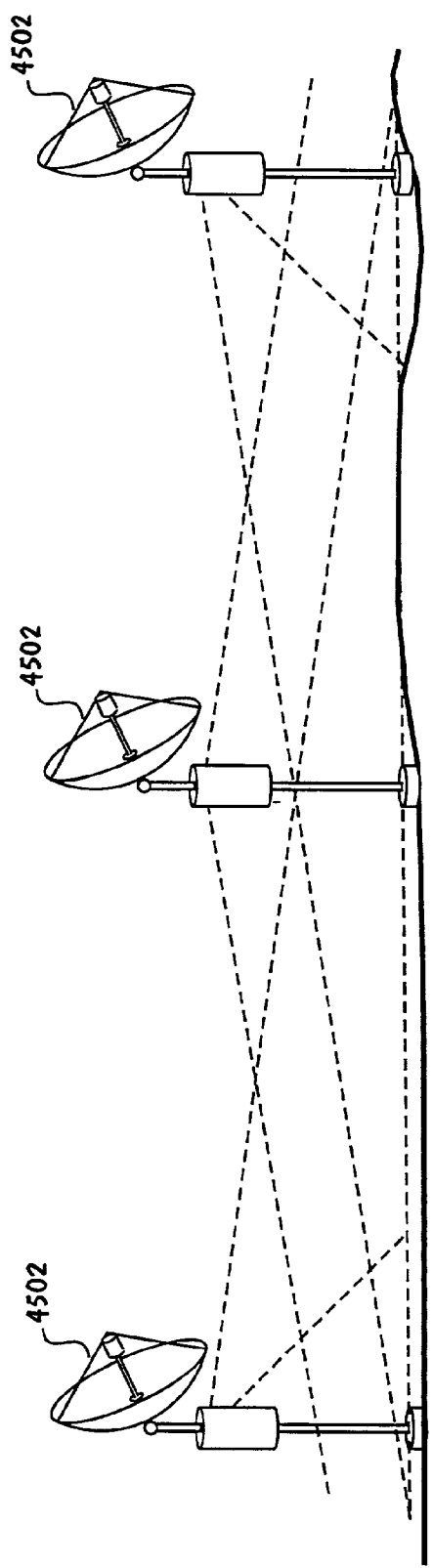
FIG. 45 shows a deployment network architecture of a WINS NG sensor network of an embodiment.

FIG. 45 shows a deployment network architecture 4500 of a WINS NG sensor network of an embodiment. The WINS NG nodes 4502 are located at a small separation of approximately 30 meters. Small separation permits nodes 4502 to operate at low power, and relaxes sensor sensitivity requirements. Moreover, it enables shorter range sensing modes to be used, providing the signal processor with high SNR measurements from many domains, which simplifies identification problems. The nodes 4502 image their neighbors with passive or active elements, thus providing security and redundancy. Both passive and bistatic sensing modes may be employed.

Figure 46:
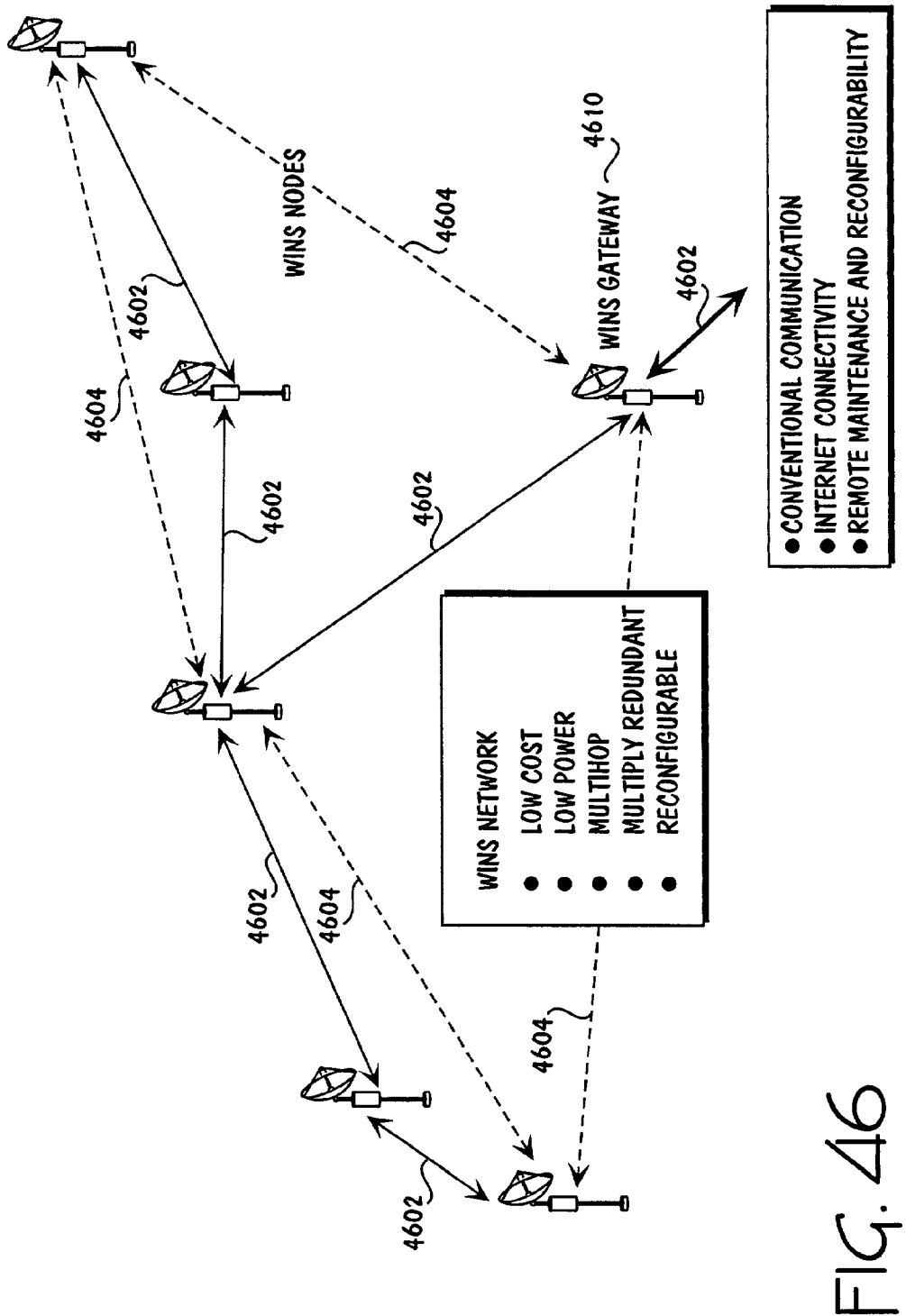
FIG. 46 is a multihop network architecture of a WINS NG sensor network of an embodiment.

FIG. 46 is a multihop network architecture of a WINS NG sensor network of an embodiment. Nearest neighbor, low power multi-hop links 4602 are displayed as solid arrowhead lines. The multi-hop architecture provides redundancy 4604 (dashed, fine arrowhead lines) to hop to next nearest neighbors, or complete long links at high power and in emergency conditions. The WINS NG network terminates at a gateway 4610. The WINS NG gateway 4610 provides protocol translation capability between WINS NG networks and conventional networks including those of existing security systems. Thus, the WINS NG network is backward compatible with existing systems in a transparent fashion. Moreover, gateways 4610 provide ways to connect with wide area networks such as the Internet, so that network resources such as databases and higher levels of computing can be employed in the security task. Gateways further enable remote control and analysis of the sensor network.

The hardware layering of preprocessor/processor together with the set of APIs allows large adaptability. Variable resolution, variable sample rate, variable power dissipation, adaptive signal processing algorithms, and event recognition algorithms that respond to background noise level are all examples of adaptability. The communication physical layer is also adaptive, with variable transceiver power and channel coding. Further, it is responsive to queries in accordance with the local capabilities and connectivity to the Internet or other external networks. For example, data hold times, degrees of signal processing, readiness to communicate and engage in data fusion among nodes, and data aggregation can all be set by user queries, with relative priorities related to the energy costs of communicating, the local storage and signal processing resources, the available energy supply, and the priority of a given task.

Threat assessment is currently implemented with single point, fragile, and expensive cameras operating at long range. These devices are limited to line-of-sight coverage. The WINS NG system, in contrast, delivers compact imaging sensors (camera volume less than 20 cm$^3$) in existing security system platforms or with new dedicated WINS NG imaging nodes. These imaging nodes can provide coverage of all areas between security nodes and the regions beyond the next nearest neighbor node for redundancy. The image sensors are supported by the WINS NG node digital interfaces and signal processing for motion detection and other capabilities. For example, they can be triggered by the other sensors to avoid continuous operation with its relatively costly signal processing and communication requirements. The image sensors may incorporate an infrared or visible flash illuminator, operating at low duty cycle to conserve energy.

The WINS NG network is resistant to jamming. Conventional tactical security communicators support long range single hop links. While this provides a simple network implementation, it requires high operating power (1-10 W or greater), and expensive radios. In addition, the frequency band is restricted for military use. Finally, the allowed operating channels are fixed and narrow. Such links are both susceptible to jamming, and not covert. By contrast, the WINS NG network is implemented with multi-hop power-controlled communicators, and is thus inherently low-power. In addition, for an embodiment operating in the 2.4 GHz ISM band, it uses 80 MHz of bandwidth with a frequency hopped radio, providing a vast increase in jamming resistance. Thus the links are both covert and jam-resistant.

Further protection is provided in an embodiment that provides shielding through distribution of nodes in space, distribution in network routing, and distribution in frequency and time. Each method adds an independent, tall barrier to jamming. The WINS jamming barrier operates by: exploiting multi-hop communication for short-range links and using the severe ground-wave RF path loss as a protective fence; employing multiple decoy wireless channels to attract follower jammers to the decoys, and dividing attention away from the information carrying channels; and adapting communication and network protocols and routing to avoid jammers and to draw jamming power away from the WINS assets.

Figure 47:
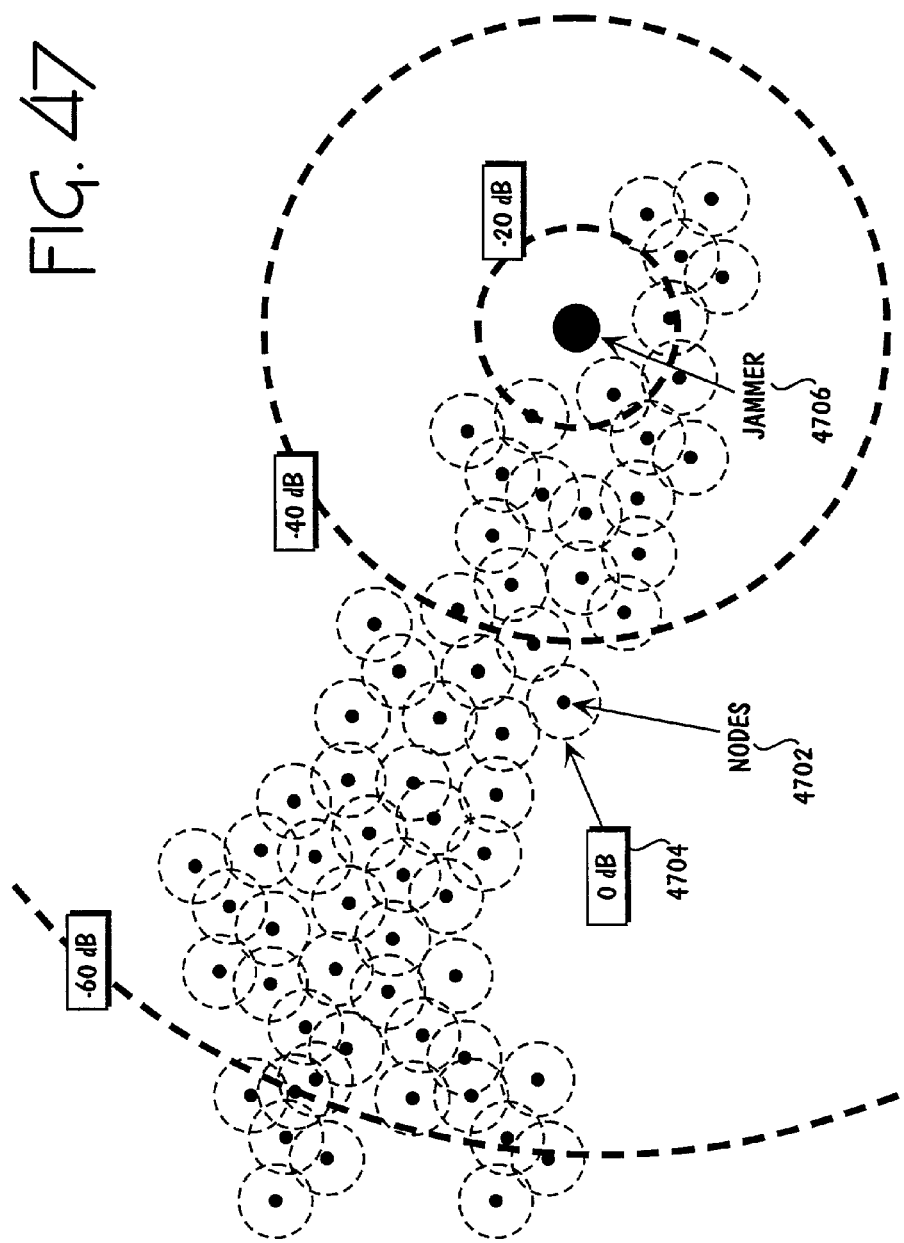
FIG. 47 shows an example of WINS NG system shielding by distribution in space in an embodiment.

FIG. 47 shows an example of WINS NG system shielding by distribution in space in an embodiment. A random distribution of nodes 4702 is displayed, as they may be deployed by various means. Each node 4702 is shown surrounded by a characteristic internode separation 4704. At this reference internode separation 4704, the RF power level received from the node at this radius is assigned a reference value of 0 dB. A jammer 4706 is also shown. From a jammer 4706 operating at the same power level as the node 4702, RF path loss will yield the contours of constant power at −20, −40 and −60 decibels (dB). These contours are drawn to scale for range R, using path loss dependence of $R^{-4}$. This figure graphically illustrates that by implementing multi-hop communication between nearest neighbors, only a few nodes in the immediate vicinity of a ground-based jammer may be affected. Thus, distant jamming of the network will require very high power levels, making the jammer an immediately obvious target.

Figure 48:
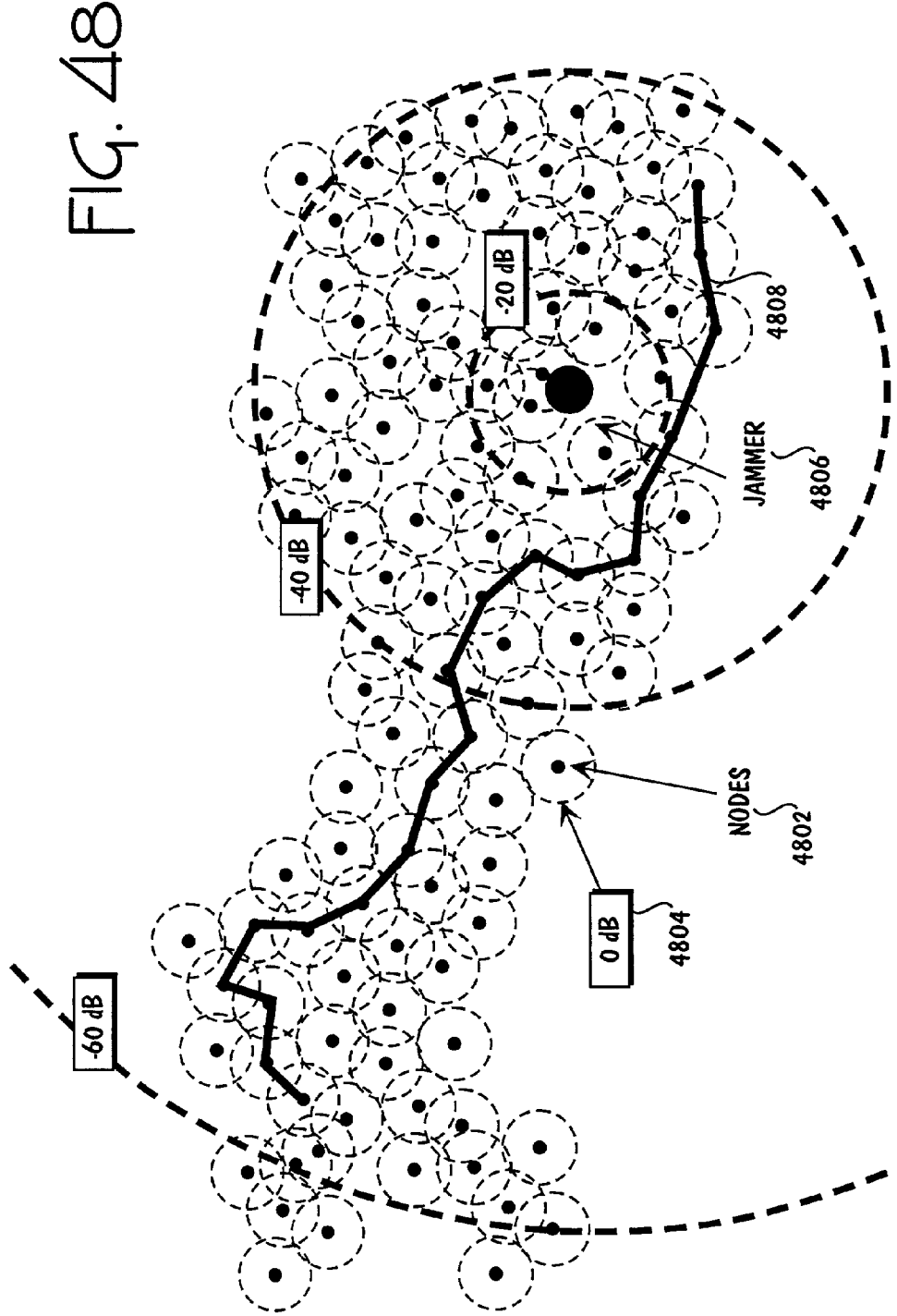
FIG. 48 shows an example of WINS NG system shielding by network routing in an embodiment.

FIG. 48 shows an example of WINS NG system shielding by network routing in an embodiment. The random distribution of nodes 4802 is displayed, as they might be deployed by various methods. Each node 4802 is shown surrounded by a characteristic internode separation 4804. At this reference internode separation 4804, the RF power level received from the node 4802 at this radius is assigned a reference value of 0 dB. A jammer 4806 is also shown. Multi-hop communication protocols may provide paths 4808 through the network that avoid jammers 4806, exploiting the natural RF path loss barrier. At the same time, the network protocols may mask this network link 4808 from the jammer 4806, preventing or spoofing the jammer's ability to detect or measure its effectiveness.

Figure 49:
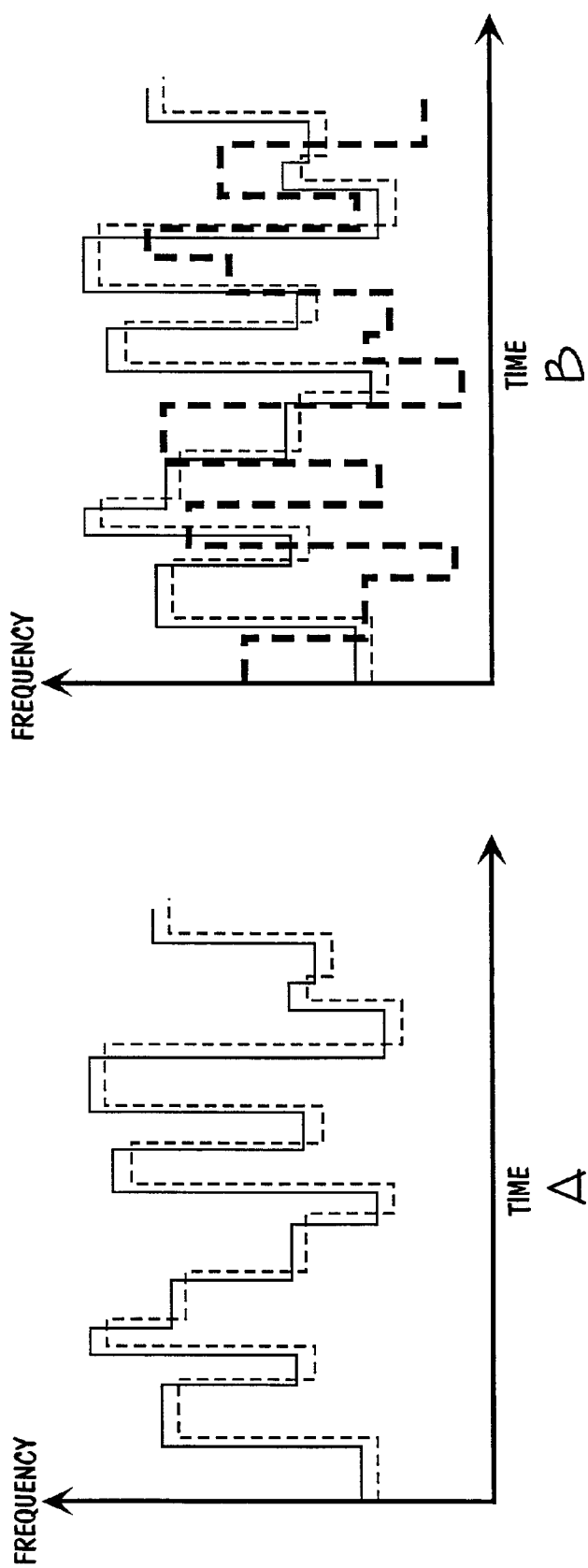
FIGS. 49A and 49B show an example of WINS NG system shielding by distribution in frequency and time in an embodiment.

FIGS. 49A and 49B show an example of WINS NG system shielding by distribution in frequency and time in an embodiment. The jammer can be expected to broadcast in narrowband, broadband, and in follower modes. The WINS NG system uses a concept for decoy signals that distracts the follower jammer using a method that is unique to distributed networks and exploits node distribution to draw the jammer away from links that must be protected. For example, transmission occurs on one channel, with one frequency-hopping pattern, shown in FIG. 49B, at high power. The follower jammer must select and jam this signal. In the process of jamming this signal, the follower jammer effectively jams its own receiver: In addition, transmission occurs on one of many other channels, hopping with different schedules. In addition, the WINS NG system information carrying channels may be low power channels, which are assigned lower priority by a jammer. In the worst case, the follower jammer may only remove some, but not all of the available bandwidth.

In operation, with reference to FIG. 49A, the follower jammer signal (dotted line) tracks a single node signal (solid line). Clearly, the jammer may be readily equipped to detect and jam this frequency-hopped signal. However, with reference to FIG. 49B, the jammer is exposed to a decoy signal (dotted line) that may appear to be carrying information, but is merely a decoy. The dashed line, a covert low power signal, carries WINS NG system information. A multiplicity of decoy and information bearing channels may continuously hop, change roles, and execute random and varying routing paths. The jammer is exposed to many layers of complexity.

Security networks may alternatively and usefully be constructed using combinations of WINS NG and PicoWINS technology. Consider the basic problem of detection and tracking of personnel, in an environment that might also include heavy vehicles or other sources of sensor interference. If sensors are placed very close together, then the personnel tracking problem becomes enormously simplified. Short ranges imply high SNR for the measurements, and more homogeneous terrain between the target and nearby sensors. This reduces the number of features required in making a reliable identification. Further, objects to be detected are within the convex hull of the sensor array, enabling energy-based tracking (as opposed to coherent methods such as beamforming). The short range enables simplified detection and identification algorithms because the targets are few in number and nearby, and the algorithms can specialize on personnel. Finally, identification confidence is high: magnetic, acoustic, seismic, IR all have good performance, and data fusion is simplified.

Considering the tracking problem, three nodes near an object could use TDOA methods for seismic signals to estimate the object's location, or the network could take the energy centroid for all nodes that report an SNR above a certain threshold. This amounts to orders of magnitude less cost in terms of processing and data exchange compared to TDOA methods. Accuracy is not very high, but with such a dense dispersal of nodes it does not have to be high. For example, simply determining the node to which the target is closest is adequate for essentially all military purposes. Thus, a dense deployment of fairly simple nodes does not imply reduced detection capability.

One cost issue is the complexity of the identification algorithms. If every device has to identify every possible target, then the combination of the most difficult identification problem and most difficult detection problem determines cost. However, if each type of sensor is specialized for particular targets, then many economies can be realized. Heavy vehicles can be detected with a much less dense network than is required for personnel; thus, in minefield lay-down there can be sensors designated to deal with vehicles and others designated to deal with personnel. A different mix of sensors is appropriate for the two different classes of target, with different requirements for communication range, and sophistication of signal processing.

At short range, IR is likely to have good field of view, and the other modalities are all likely to have high SNR. The likelihood is high that one target (or target type) will totally dominate the received signal. With high SNR and a few sensing modalities, a small number of features will suffice to make a detection decision on personnel.

The modularity and self-assembly features of the WINS NG and Pico WINS nodes allow convenient mixing of many different types of sensors and sensor nodes in a region, while the capability to download new programming enables tuning of signal processing algorithms to particular types of threats. In an embodiment of a detection network, a dense network of fixed WINS NG sensors is supplemented by an even denser distribution of sticky tags, or Pico WINS nodes, in the same general area. These tags can be attached to moving articles in numerous ways, including magnetic attraction, adhesives, and burrs. They may themselves be active or passive, with an acoustic or RF resonant response. The tags are supplemented by an activation and tracking network.

In one network embodiment, tags are randomly deployed, and are activated whenever a certain range of motion is experienced. These are interrogated by higher power, more widely spaced devices, such as a WINS NG node designed specifically to track the location of moving tags. The tags may be initially activated by passing through a personnel sensor field. If for example the magnetic signature and footstep pattern is within range, there is confidence the target is a soldier, and thus worth tracking. Alternatively, the personnel detection network activates a mechanical device that disperses tags towards the target (e.g., spring launched, "bouncing betty", low-velocity dispersal, etc.). The tag includes at least one supplemental sensor that in one embodiment indicates whether the tags have attached to moving targets, targets which bear metal, and so forth, so that higher confidence is obtained about the type of target which has been tagged.

Tagging also simplifies tracking when the target moves outside the zone of dense detectors. Vehicular tags could be active, emitting specific identification sequences that are tracked at long range with aerial or high-powered ground stations. Personnel tags can be either active or passive, but in any case are much more easily detectable at range than the acoustic, seismic, visual, or heat signatures of humans. The tag dispersal areas need not be coincident with a dense network of personnel detectors. If the tags have sufficient sensing means to determine that they are likely attached to a particular host, they can make a decision to respond to queries or not to respond. Likewise, the devices that query may be distinct from the devices that listen for responses. For example, in one network embodiment, an aerial device with high power emits the interrogation signal over a wide area and ground devices listen for the response. In this way, many lower cost receivers leverage one expensive asset. These receivers are cued to expect possible responses by a preliminary message from a drone, so that they do not have to be constantly vigilant.

Tags can also bind sensor information to an object, whether the information is supplied by the tag, external sensors, the user, or some combination of these things. The purpose is to be able to easily recover some information about the object bearing the tag. Most typically, external means are used to identify the object being tagged, and then information is impressed on the tag (e.g. price tags or baggage). A tag reading system acquires information about the object that would otherwise be extremely difficult to obtain by mechanical sensory examination of the object without a tag. A tag without sensing can still be used as the item that provides the unique identifier for the object it is attached to, in which case all sensor data collected by the network can be properly correlated to make the identification. Alternatively, some of this information is stored on the tag itself.

The tag itself can include some sensors and signal processing, and plays an active role in the identification of the object, either alone or in combination with other tags and sensor nodes. Since the tag has physical contact with the object, very simple sensors and signal processing algorithms lead to high confidence in identification. In this mode of operation, the tag starts with no idea about what the object is, and at each step downloads new software from other nodes (possibly using their information), or performs measurements and processing at their request. The tag thus does not need to carry much software, leading to reduced cost.

The tags placed in the environment determine if they are attached to friendly personnel or vehicles. In one embodiment, at attachment the tags or nodes send out an identification friend or foe (IFF) beacon (short range) and deactivate in response to a positive reply. In an alternative embodiment, they listen for the IFF being emitted by the host for some period before deciding to activate. They may also be commanded not to activate if attached over some period of time by signals sent from some individual such as a platoon leader. Either embodiment can inhibit activation or distribution of tags for some limited geographic area and time span. Additionally, tags issue inhibit signals to prevent multiple tags from being attached to one object, so that it is more difficult for an enemy to clear a path through a region with a high density of tags.

The tags placed in an area do not have to be of the same type. For example, more capable tags can preferentially be induced to attach to targets whose tags indicate that the target is interesting. Thus, grippers or adhesives may become exposed when it is indicated a worthwhile target is coming close. The collection of tags on the object may become a powerful sensor network by the time several iterations of this process are complete. Cumulative exposure to tag and sensor rich areas therefore provides a much greater than linear increase in probability of a target being identified and tagged for long-range tracking, or acquired in imaging systems.

For increased robustness, a sensor network that is subject to localized physical attack whether by human or other agents may be enabled to sow the region of devastation with new tags so that targets can continue to be tracked. The WINS NG and PicoWINS technology provides this self-healing capability. A variety of launchers may be used to disperse sensor nodes, webs, or tags into regions that were previously covered by a sensor network, or initial deployment of sensors. This can be supplemented by an airdrop of new nodes. Network reconfigurability and self-organization technologies make this possible. Temporarily spraying only Pico WINS tags in the region gives a lower level of reliability, but is an economical means of covering a gap until a full mixed PicoWINS and WINS NG network can be re-deployed. If the physical attack is due to personnel, this provides the added benefit of immediately tagging them. The sensor launchers may also serve secondary purposes such as deploying small webs or antennas to tree tops to provide longer range coverage to and over denied areas.

Such a network is maintainable at several levels of operation. Easily arranged and low cost delivery of components assure some minimal level of functionality, with the ability to go to higher levels of functionality given more time and expense. A mix of reliance upon locally cached resources and the possibility of calling in replacements remotely (via artillery or air drops) is more robust against combinations of jamming and physical attacks. This ability is enabled in part by the self-assembling nature of WINS networks, both with respect to physical networks and also complete applications.

To have both robustness and efficient operation, the combined heterogeneous network needs both vertical and horizontal integration. That is, each layer is capable of functioning independently, but higher layers are also able to communicate with and command lower layers for more efficient operation. Loss of these higher layers therefore degrades detection/tracking capability, rather than eliminating it. Loss of a lower layer may also impede detection tracking coverage, but does not eliminate it. When combined with a limited self-healing capability and an ability to request replacement components, the opponent is faced with the need to destroy essentially all the diverse components over a fairly wide area in a short period of time. The resources required to do this are easily detectable at long range.

Further, there is no reason to have all layers in all locations. The different detection layers can be deployed as circumstances warrant, increasing the density or variety of types of sensors over time. This saves costs, leads to improved functionality for old networks, changes the priorities of old networks, and facilitates self-healing. Thus, it is not required that one big sensor do the complete job, nor that sensor networks all have homogeneous components. Rather, in embodiments using the WINS technology, the system is a network of interacting networks which can interoperate for increased robustness and efficiency. This heterogeneity is accomplished using a layered set of APIs such that communication among all nodes is accomplished at the highest common level, with appropriate self-organization protocols for each level.

Asset Tracking and Management/Manufacturing

Conventional asset management technology is based on Radio Frequency Identification Device (RFID) tag systems. The applications for conventional RF tags and asset management systems are constrained, however, by the capabilities of the available technology. For example, low cost RFID tags provide only presence information and capability for recording of limited data records. Typical RFID asset management systems use low cost tags and high cost interrogator instruments. Interrogator instruments typically require an antenna having dimension of 0.4-1 m. The maximum reading distance between the interrogator and the tags varies from 0.6 m for low cost tags, to 2 m for large, high cost tags. Interrogators are typically large, high power instruments. The battery powered tag devices are interrogated with a high power instrument and return data with battery powered transmission. Read range extends to approximately 3 meters. Conventional tags for use in vehicle identification use large, high power, fixed base interrogators. Thus, conventional RFID tag systems have limited capabilities and require large, expensive interrogators and antennae.

The low power networked sensors of the WINS NG and PicoWINS technology are well suited to advance the art of RFID asset management. An embodiment of an asset management system is implemented with intelligent tags in the form of WINS NG sensors or mobile PicoWINS tags, and low cost portable, distributed interrogator gateways in the form of WINS NG gateways. The industries benefiting from the asset management sensor tags include, but are not limited to, aerospace, airlines, apparel, beverages, glass, chemicals, construction, food, food services, forest and paper, health care, industrial equipment, mail and freight, metal products, mining, automotive, oilfield services, refining, pharmaceuticals, publishing, railroads, rubber and plastic, soap, cosmetics, and utilities.

In some embodiments, WINS NG and PicoWINS technology, including continuous low power sensing and event recognition, is integrated with existing RFID systems that have an installed base of RFID interrogators. In other embodiments, WINS devices form the complete system.

In one embodiment, the WINS tag is attached to or integrated with a product or shipping container. Unlike conventional devices, transmission range of the WINS tag is at least 10 meters. In addition, the tag is autonomous and operates continuously. Unlike conventional tags that provide only identification, the WINS tag provides continuous on-board measurement. Thus the WINS tag may record time, time of passing a waypoint, and may carry data among waypoints.

Because the WINS tag is autonomous, it may continuously or periodically sense status, for example, temperature, shock, vibration, motion, tip, light level, and package opening and closing, but is not so limited. Unlike conventional RFID technologies, the WINS NG tag uses only a compact, low power interrogator that may be networked locally, deployed in a distributed network, or deployed as an independent autonomous unit. For example, the WINS NG tag interrogator may communicate by wireless links and may be distributed within a warehouse, shipping vehicle, loading dock, or processing facility. The autonomous interrogator node may monitor the progress of an asset and determine if a sensed condition or progress timing is out of bounds, as per a programmed schedule of sensed variable limits. The interrogator, or WINS NG gateway, may interface with standard LAN, telephony, or wireless resources.

Figure 50:
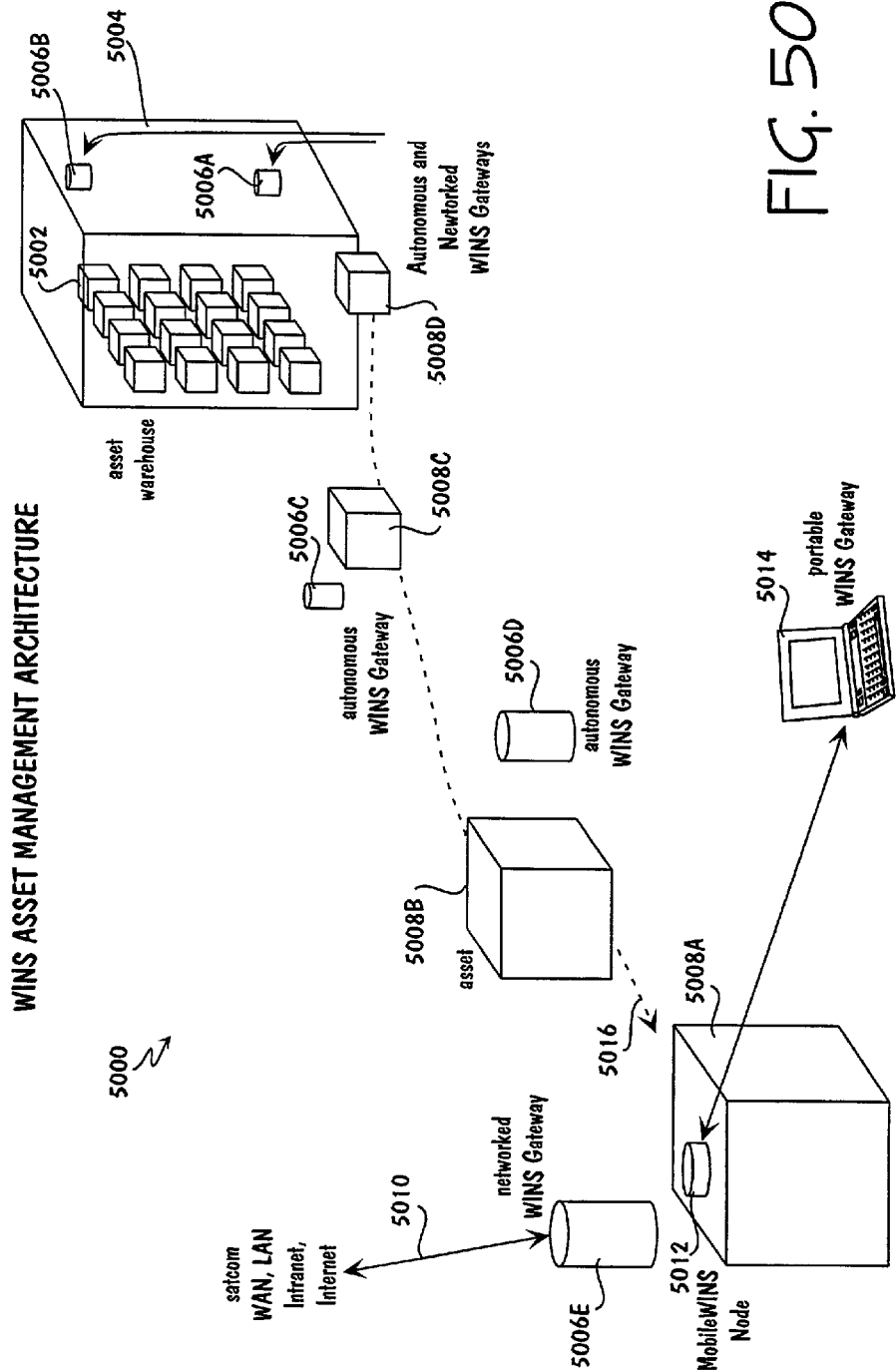
FIG. 50 is an asset management architecture including the WINS NG or PicoWINS tags of an embodiment.

FIG. 50 is an asset management architecture 5000 including the WINS NG or PicoWINS tags of an embodiment. In this architecture 5000, WINS tags, or nodes, are attached to assets or integrated into shipping containers. Assets 5002 are stored in at least one warehouse 5004. Any or all of the assets 5002 may have nodes, or RFID tags (not shown) attached to them. Within a warehouse environment, the nodes attached to the assets 5002 are in network communication with gateway node devices, such as WINS NG gateway nodes 5006A and 5006B within the warehouse structure 5004. The WINS NG gateway nodes 5006 may be variously autonomous or networked. The path for unstored assets 5008A-5008D (shown as a dotted line 5016) carries the asset 5008 past a series of WINS NG gateway nodes 5006, such as autonomous gateways 5006C and 5006D. The gateways 5006C and 5006D serve as waypoints providing time-of-arrival, routing, and destination information for the asset in communication with it through a WINS node attached to the asset. The gateway autonomous interrogators such as gateways 5006C and 5006D are fixed asset base stations distributed at waypoints along the asset path 5016. The gateway 5006 learns and records its position and creates a message. In various embodiments, the gateway 5006 need not be networked and may be an independent device in the field. The gateway 5006, in some embodiments, carries a GPS device to allow its location be recorded and transferred to a passing WINS tag.

Autonomous WINS gateways 5006 are free of any infrastructure. Absolute time and location, either recorded or GPS determined, are available to the gateways 5006. A gateway 5006 compares progress in shipping or in a process line with that expected. The status information may be downloaded to any gateway 5006. Both presence information and sensed asset information are available. At the end of a trip, or at any point, the asset 5008 may encounter a distributed, networked gateway 5006. Here asset information is made available. In addition, a low power, portable gateway 5006 may be used as a handheld device for interrogation of assets.

The WINS tag is integrated or attached to a container or other asset. In contrast to conventional RFID systems, the WINS node continuously samples and records changes in the asset status. In addition, it continuously seeks the presence of WINS NG gateway devices. The gateway devices may be networked by a multihop wireless network, or by conventional wireless or wired services. The gateways may be distributed and operate autonomously, providing waypoint time-of-arrival information to be passed to the WINS NG node for later download. A WINS node may broadcast emergency status information regarding either properties of an asset, delay in the progress of the asset to a destination, or the asset's misrouting.

The WINS NG gateway devices are networked, unlike conventional interrogators, and multiple gateway devices may attempt to acquire nodes or the same node within the same cell. The WINS nodes communicate with efficient codes carrying location, history, and sensor information. The WINS node continuously senses, and operates with compact cells for a life of multiple years, through exploitation of the many energy conserving features of WINS NG and PicoWINS node and network architectures. The WINS node may respond to queries generated by users anywhere within the local or wide area network to which it is connected, and makes full use of the database technology previously described with reference to WINS NG networks.

The connection via gateways to the Internet enables the use of WINS NG servers, web assistants, and database technology to remotely monitor and control the sensor network. For example, nodes may be embedded in rotating machine parts to sense vibration. In this case, the asset being monitored might be a large industrial pump, critical to factory operation. When an alarm condition exists, the node alerts the remote monitor, which may then command reporting of more detailed information. Diagnostic or prognostic algorithms may be run on this more detailed database, or a human expert may view the data from a remote location using standard Web browsing tools. In this way, problems may be quickly identified without the need for experts to travel to a remote site. Shut-downs can be commanded before significant damage takes place and appropriate replacement and repair procedures executed.

In another embodiment, the sensor network is used to examine flow of goods through a warehouse. The database includes information such as location of goods and the time spent in the warehouse. Analysis of this database can reveal patterns of storage time for particular categories of goods, allowing more efficient arrangements to be made with suppliers and customers.

The WINS tags can also be used for monitoring, including applications in monitoring control processes, equipment, and operations. Distributed sensors and controls enable fundamental advances in manufacturing and condition-based maintenance. While conventional sensor systems relying on wireline communication systems suffer from costly installation and maintenance and restricted mobility, these typical systems hinder modification or reconfiguration of facilities and equipment. This is a particularly important problem in high volume production lines where maintenance downtime is prohibitively expensive.

The WINS NG and PicoWINS systems are low cost, mobile systems that cover the entire enterprise. The WINS systems for manufacturing include sensors installed on rotating tool bits, machine tools, workpieces, and assembly machines. Measurements can be made of diverse parameters and operations, including feed forces and vibration, stamping, joining, and other operations. The mobility offered by the WINS NG technology enables operations to be modified dynamically while minimizing downtime. Mobile workers can monitor local operations and examine each operation through a WINS NG system measurement. Further, WINS NG condition-based maintenance provides large operating cost saving by allowing tool and system maintenance to be scheduled in advance of a failure. Furthermore, in the manufacturing environment, the WINS tags can be used as personal devices, as used for example in applications including communication, workplace safety, workflow monitoring, control and verification, and health care.

Suppliers of capital equipment, for example large machine systems, may acquire most or all of their profit from aftermarket service provided on their equipment. Consequently, maintaining a customer service account with both replacement parts and service is critical. Suppliers often find that customers are turning away from their business and replacing their high-quality replacement parts with low quality (and lower price) components from competitors. For example, for high end equipment in the energy industry, replacement part orders may total larger than $1 million for a single case with component costs of $50,000 and greater. This loss of replacement subsystem business erodes the revenue for the capital equipment supplier.

The WINS network of an embodiment provides desired monitoring functions and also manages the capital equipment assets, by performing a continuous inventory of the equipment. This WINS network system includes: the ability to monitor the condition of machinery, equipment, instruments, vehicles, and other assets as well as monitoring the equipment location; the ability to monitor the condition of machinery, equipment, instruments, vehicles, and other assets as well as monitoring the inventory of components on these systems thereby making it possible to determine that the components have originated at a specific supplier and have been installed at a particular time; a WINS network with systems for electronically marking and verifying the presence of components; a WINS network having systems for notifying a remote user when components are installed on a system that do not meet specifications or do not contain the electronic marking; a WINS network that uniquely identifies components that contain a mechanical feature that generates a unique and identifiable vibration pattern; a WINS network that uniquely identifies components by detecting an electromagnetic signal generated by the rotation of the component; a WINS network that derives energy for powering the network from an electromagnetic signal; a WINS network that derives energy for powering the network from unique mechanical fixtures located on moving equipment; a WINS network that enables the operation of equipment when positive identification of components is made and disables the equipment according to a specified protocol when unidentified components are present; a WINS network that enables the operation of equipment when it is located in a specified location or set of locations, disables the equipment when it is located in a specified location or set of locations, and disables the equipment according to a specified protocol when the equipment is removed; a WINS network that enables the operation of equipment when a specified service is performed and disables the equipment according to a specified protocol when the service has not been performed as per a specified protocol; a WINS network that enables the operation of equipment when certain remote signals or messages are received and disables the equipment according to a specified protocol when the signals or messages have not been received; a WINS network that measures, records, and communicates operating parameters that are associated with safe or unsafe operation of equipment or safe or unsafe actions by operators; a WINS network that combines any set of combination of the above capabilities; and a WINS network that combines any set or combination of the above capabilities and is remotely configurable in its protocols that determine the response to any set of conditions.

Wireless Local Area Networks (LANs)

Many technologies are currently used to bring high-bandwidth services into the home and office, including cable television (CATV) modems, digital subscriber lines (DSL) that use ordinary telephone lines, optical fiber to the "curb" supplemented by DSL drop to the home or office, and satellite communications. However, provision of wide-area high-speed wireless services is costly and likely to remain so for some time to come, while there is already a large installed base of CATV and telephone lines available for use. While these typical technologies provide high speed access to one or a few points within the home at relatively low cost compared to wireless solutions, re-wiring within the facility to bring such services to every room, however, remains costly. Consequently, wireless solutions are desired. Likewise, in businesses, there is often a wired local area network, for example an Ethernet network, that provides high-speed connectivity in a substantial fraction of the offices. The WINS NG gateways provides an interfacing among these wired communications services to provide wireless connectivity within a residence, office, or industrial facility.

Home applications of the WINS technology include security networks, health monitoring, maintenance, entertainment system management, vehicle communications, control of appliances, computer networks, location and monitoring of children and pets, and energy and climate management. The self-assembly features, compact size, and efficient energy usage of WINS NG and Pico WINS networks enable low-cost retrofitting for this full range of applications. The modular design of the nodes enables configurations that can interoperate with emerging consumer radio network standards such as Bluetooth or Home RF. Higher-speed protocols such as Bluetooth can be used to multihop information throughout a residence and/or to a vehicle, while lower speed and less costly solutions are adopted for a dense security network. Nodes with higher speed radios can be coupled to a reliable power supply. The WINS NG server and web assistant technology make possible the remote monitoring and control of these systems with standard tools, including archiving of important data and provision of warnings to the current registered communications mode of the users (e.g., pager).

Office applications of the WINS technology include computer and computer peripheral networks, location of objects, smart whiteboards/pens, condition based maintenance of both office and heavy equipment such as photocopiers and elevators, security, health monitoring, and energy and climate management. The same features of self-assembly, compact size, and efficient energy usage enable low-cost introduction of the WINS networks into the office environment. The WINS networks interface to the wired or wireless LAN by means of WINS NG gateways, and to the Internet or other wide area network. The WINS NG and web assistant technology enable remote management of these assets. With the same tools, a user manages assets in the home, vehicle, or office, representing a large saving in learning time.

Wireless Metropolitan Area Networks (MANs)

Typically, wide area wireless networks are constructed using a cellular architecture, either formed by terrestrial basestations which re-use channels, or by the spot beams of satellites which likewise re-use channels in different locales. In cellular systems, all communications flows back and forth between the remote users and the basestations, and never directly between users. The basestations typically have access to a high-speed network using either wires or different frequencies than those used for communication with users. This wide area backbone network may in turn provide access to the Internet. The density of channel re-use depends on the density of basestations, and thus the infrastructure cost scales roughly linearly with the desired re-use density of the channels, which is in turn driven by the number of users and their expected bit rate requirements. Typically, cellular systems are designed to provide a limited number of categories of service, for example, voice and low-speed data, and to have a roughly uniform quality of service within the coverage region. This results in a large infrastructure cost and delay in providing new cellular services.

An alternative architecture known as information service stations has been proposed by D. J. Goodman, J. Borras, N. B. Mandayam, and R. D. Yates, "Infostations: A New System Model for Data and Messaging Services", Proc. IEEE VlC '97, volume 2, pp. 969-973, May 1997. In this architecture, services are available only in the vicinity of basestations, with no requirement for geographically contiguous regions of coverage. This is an extension of the basic architecture used for cordless telephones, with the difference that users who roam between regions are permitted to communicate with any basestation within range. Examples of commercial usage include telepoint services such as CT-2. Such a network can be incrementally deployed, for example, beginning in regions with high expected usage and gradually being constructed to provide greater coverage. It may also be combined with a wide-area cellular network, with the latter providing wide area coverage for low data-rate services, with high speed services available in the vicinity of the information service stations. For example, wide area paging networks can function in a fashion complementary to telepoint networks, serving as the means for alerting telepoint users to make a call at the first opportunity.

The WINS NG and PicoWINS networks of an embodiment offer valuable extensions of capabilities for overlaid information service station and wide area networks. The capability to self-assemble into multi-hop networks enables denser re-use of channels than is implied by the fixed basestation infrastructure. By processing data at the source and enabling data aggregation, many more nodes can be included in the network. Moreover, the multihop communication can reduce power requirements and thus cost for most of the radios in the network, with a smaller fraction of the radios needed to communicate with the basestations, which may for example include WINS NG gateways. The multihop communications can use the same set of channels used in the wide area cellular network, or a different set.

The use of WINS NG gateways enables access to WINS Web servers and database management tools, allowing remote configuration and control of the network, and making these resources available to the remote nodes. Further, these database tools can be used to more tightly manage overlaid networks so that data is routed in the fashion desired by a user (e.g., to meet quality of service requirements or conserve energy). Both high-speed and low-speed services can be managed using the same device, reducing cost. Examples of services enabled with the WINS NG and PicoWINS technology include, but are not limited to, medical informatics, fleet management, and automatic meter reading.

The WINS NG and PicoWINS node, or sensor applications in medical informatics include patient monitors, equipment monitoring, and applications in tracking, tagging, and locating. For example, visits by medical professionals can be automatically captured and logged in a patient's medical history by means of a WINS network and the associated database services. The WINS network can also be used in the clinical environment, as well as for ambulatory outpatients in the home or even at work. Furthermore, the WINS network enables a patient's family to monitor the patient's condition from their home or office, or to monitor sick children from other rooms in a house, and supply appropriate alarms. The components of an embodiment of such a network are body LANs, information islands (home, work, hospital), wide area low-speed networks, and web-based services to link the components.

In all medical applications, there must be a means of gathering information about the state of the body. Typically, medical monitoring devices have proprietary user interfaces, with little attempt to provide commonality across different classes of machines. This results in costly involvement of medical professionals at every step of the examination. By contrast, WINS NG nodes can interface to such devices, performing some combination of processing and logging of data via gateways to the Internet and thus to databases constructed for this purpose. The outputs of many different monitoring devices are linked in a database, leading to improved fusion of data, and more complete histories of the state of the patient. The monitoring devices may be compact devices that directly attach to the body. Embodiments of a PicoWINS network self-assemble and report observations to a device with some combination of longer range communications or mass storage capability (e.g., a WINS NG gateway). In an alternative embodiment, the devices may be stand-alone devices, or a mix of body network and stand-alone devices, which nonetheless are linked in a self-assembling network.

The medical professional may additionally employ wireless personal digital assistants, which become members of the WINS NG network, to annotate or view data. Such a network on its own is useful in home or clinical settings where connectivity to the Internet is made through WINS NG gateways in concert with wide area wired or wireless networks. In one embodiment, the medical informatics network includes monitoring devices, and wireless information islands that connect via the Internet to databases and other remote services. This simplifies collection of medical information from diverse sources, and enables far more complete records to be assembled.

In another embodiment, the monitoring and database query devices also have access to a wide area wireless networks, either on their own or by means of gateways. This has several advantages for ambulatory patients. The body network continuously monitors the state and location of the patient, and reports warnings to both the patient and medical professionals as the situation warrants. Example warnings include warnings for the patient to either cease a risky activity or for assistance to be summoned (e.g., for heart conditions). This may provide additional mobility to patients who otherwise would need close on-site supervision by medical professionals, and allow patients to live fuller lives with limitations on their activities being individualized, rather than being based on conservative assumptions. The body network communicates using short-range and low-power methods, so that each patient may have many sensors without the need for multiple long range radios. The wide area network allows priority messages to be sent even when the patient is out of reach of high-speed connections. In the interim, the body network can log histories, and wait to download this information or receive new programming until the next occasion on which it is in proximity to high-speed connections.

In a further application, the same technology is used for monitoring healthy individuals who may be engaged in hazardous activities (e.g., firefighting, warfare, high-risk sports, childhood), so that assistance can be promptly summoned as needed, and with a prior indication of the state of the patient.

Just as patients can benefit from a variety of devices monitoring status and location, so can large vehicles and fleets of vehicles. A WINS network can be retrofitted to monitor the state of key components, and then to report results via gateways located, for example, in service areas. If supplemented with a lower-speed wide area network, breakdowns or other emergency conditions are reported, and tasks such as snow-removal monitored and controlled. Other functions such as dispatch of emergency vehicles are improved if locations of all vehicles are noted, and travel times for different routes (according to time of day) have been logged in the database. Large transfers of data take place near WINS NG gateways with wired or high-speed wireless Internet access, while command and control information flows through the low speed network, and vehicle component data flows through its local multi-hop network.

In addition to medical applications and vehicle management, a long-standing need exists for fixed wireless data solutions as replacements for hard-to-read utility meters. While these meters represent only 10% of the 220 million meters presently in service, the cost of reading these meters is estimated to be as high as 50% of all meter-reading costs. Utility companies realize that they can cut their operating costs and improve information collection capabilities by adopting automatic meter reading (AMR) technology.

Inherent to any AMR technology is a communications link. Current AMR solutions utilize telephone dial-up, power lines, and low power RF technology in the 928-956 MHz band. Cellular, Personal Communication System (PCS), or specialized mobile radio (SMR) airlinks are more flexible than dial-up or power line links, and they cover a broader geographic area than the 928-956 MHz signals. Despite these comparative advantages, wireless communications carriers will not capture a meaningful share of the AMR market unless they quickly develop and distribute an AMR solution. Present solutions either demand installation of costly new infrastructure or payment of high subscription fees to make use of existing wireless infrastructure.

In contrast, a solution using combinations of Pico WINS and WINS NG technology described herein provides convenient network self-assembly, signal processing at source to reduce communications traffic, multi-hopping using a low density of longer range links, combination with WINS database and Web server technology for remote management of the network, and a simple path towards incremental deployment, in that wide area wireless networks are not required. In another embodiment, wide-area low data rate wireless access is available, and WINS NG technology permits efficient usage through local multihopping, data processing, and data aggregation. Further, WINS NG networks deployed in homes for home networking or vehicle networking purposes can in one embodiment also be shared for the meter reading applications, further reducing costs.

To the extent possible, wireless carriers can combine AMR with demand side management (DSM) capabilities using the WINS NG system of an embodiment, as sensing, signal processing, and control interfaces are all available. Local capabilities greatly diminish the communication required to support the applications. The DSM applications enable a utility company to better manage its aggregate energy requirements through agreements with customers.

Design and Testing of Composite Systems

The provision of networked processors, sensors, and storage in components of systems can greatly reduce the cost of development and testing of composite systems. As in security applications, appropriate interfaces achieve an efficient network with any combination of information processing, collection, and storage elements and without the intervention of a human operator. Such security systems are themselves concerned with data collection and processing, while also being a composite structure. In other applications, the device being assembled may not have a purpose directly related to processing of data about the physical world, but may nevertheless benefit from being networked in such a fashion.

For example, consider production of commercial aircraft, which requires extremely high levels of sensor instrumentation in the design stages, and a very large number of sensors in the finished product to provide for safe operation and assist in maintenance. Conventionally, sensors are individually wired for testing, and in general are in a very different configuration in the final product. The final product requires careful design of the conduits and connections for the sensors and, due to weight considerations, the length of cable and thus the number of sensors is limited. By contrast, using an embodiment of a WINS NG and PicoWINS wireless/wireline network capable of self-assembly, flexible re-routing around failures, data aggregation, and re-prioritization based on maintenance history are greatly simplified both in initial testing and for maintenance support. Moreover, the availability of convenient external interfaces to the Internet through WINS NG gateways affords remote incorporation of data in databases, and remote control of the WINS network using the Web.

In more advanced applications, networks of autonomous or robotic components constitute a system, for example, for dealing with hostile situations such as in battlefield, space, or undersea applications, or the many challenges posed by autonomous manufacturing. Design of a single device that is self-sufficient in energy and also mobile is typically very costly. Current practice in industrial production is to create specialized devices for particular tasks, and coordinate them by a combination of human intervention and separate wired networks for energy, communication, and control. By employing physical, software, and communications interfaces using the WINS NG and PicoWINS systems technology, any device so equipped that is brought into communication range becomes part of the system. The system automatically adjusts as new components are added or old components removed. Further, by means of WINS NG gateways, the database and other resources available through the Internet are accessed by the network and remote users may control the network, for example, by using the WINS web assistant and servers.

Vehicle Internetworking

WINS NG technology provides the first low cost global vehicle internetworking solution. Using embodiments of the wireless sensor network, individual vehicle systems are monitored, queried, and upgraded on a global scale. Internet services provide remote access that is integrated into the operations of a vehicle manufacturer. Vehicle internetworking provides benefits through the entire vehicle life cycle, including manufacturing, distribution, sale, fleet or individual owner information, maintenance, regulatory compliance, and used vehicle sales information.

Figure 51:
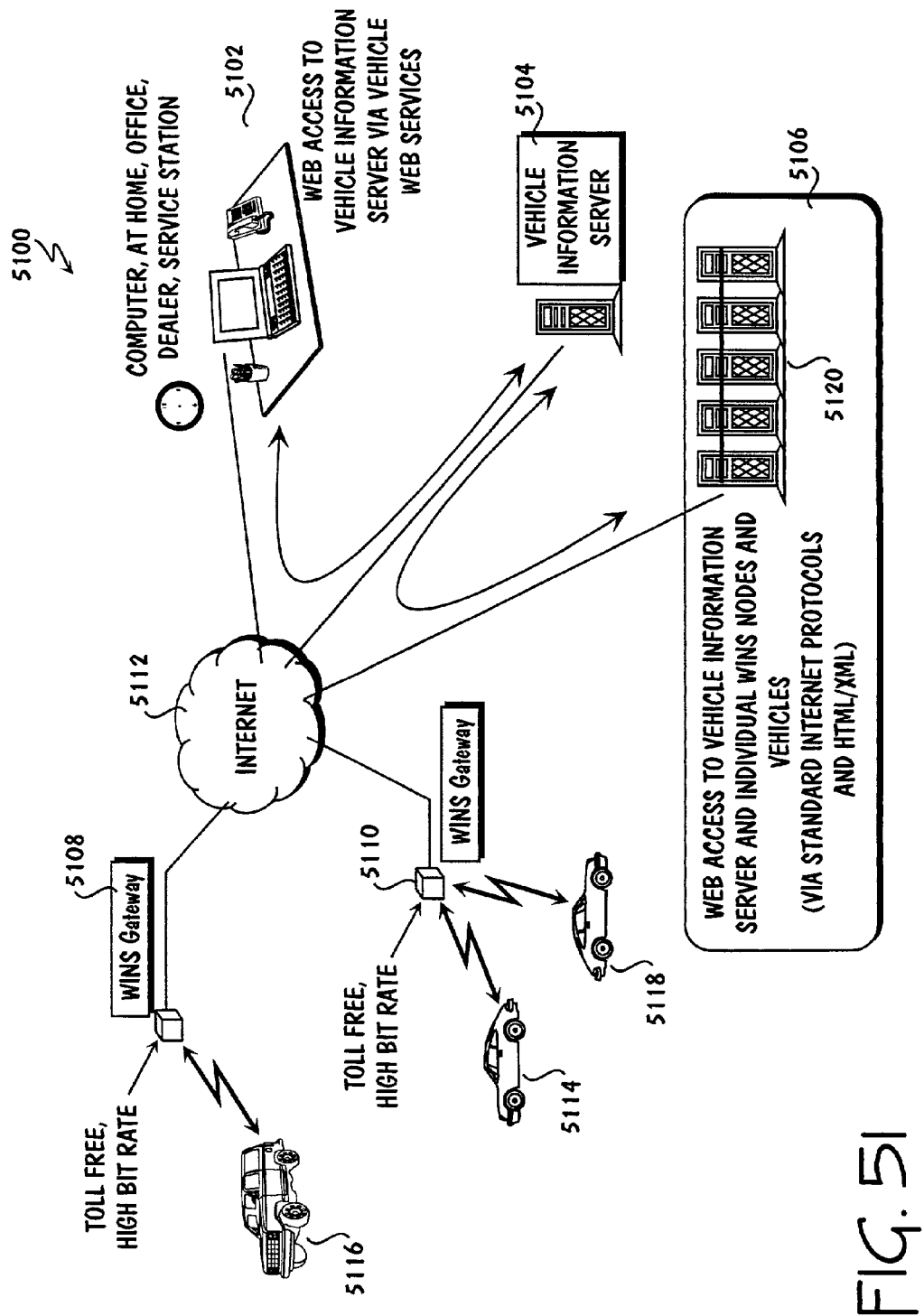
FIG. 51 is a diagram of a vehicle internetworking system of an embodiment.

FIG. 51 is a diagram of a vehicle internetworking system 5100 of an embodiment. In the system 5100, vehicles 5114, 5116, and 5118 are each manufactured by a single manufacturer, although the invention is not so limited. The vehicle manufacturer installs WINS NG system components in the vehicles to allow internetworking throughout the life of each vehicle. Additionally, the WINS NG system can be installed as an aftermarket component. The manufacturer's existing information technology systems 5106, including vehicle information servers 5120, are used to participate in the internetworking system. Through WINS NG gateways 5108 and 5110 and the Internet 5112, world wide web access to vehicle information servers is provided to vehicles 5114, 5116, and 5118. Because communication in the internetworking system is two-way, vehicle information servers can also access individual WINS NG nodes, such as gateways 5108 and 5110, and individual vehicles. Vehicle information servers can also be placed in any location apart from the manufacturer's existing information technology systems 5106. Vehicle information server 5104 is an example of a vehicle information server that may exist at any location.

Computers accessing the world wide web, such as computer 5102, have access to nodes, vehicles, and vehicle information servers. Computer 5102 may, for example, be a home, office, vehicle dealer, or service station computer. Communication between vehicles 5114, 5116, 5118 and any of the gateway nodes, such as gateways 5108 and 5110, in one embodiment, is accomplished through wireless methods that do not require universal high speed services, but can include a mix of low-speed wide area connections (for example, cellular telephones and pagers) and high-speed short range connections (for example, to WINS NG gateways). Communication between gateways 5108 and 5110 and Internet 5112 is, in various embodiments, accomplished using wireless or wireline methods.

The WINS NG technology provides low cost, low power, compact intelligent nodes that are coupled to vehicle diagnostic ports. The WINS NG node can for example communicate via the Federal Communications Commission (FCC) ISM-band spread spectrum channels. These channels, in addition to providing robust communication, are unlicensed, thus eliminating wireless access subscription fees. Power limitations prevent wide area coverage, and so communication over such channels may optionally be supplemented by lower speed access over licensed channels. The WINS NG nodes link to local area WINS NG bi-directional gateways that access Internet services via multiple channels. The WINS NG node manages the vehicle access port, logs and processes vehicle information, finds the lowest cost Internet connection permitted by application latency constraints, and immediately enables a wide range of valuable services at small incremental cost. Thus, for example, a node may process diagnostic port data and transmit a reduced data set to a server if only cellular communications are available during a time window or, application permitting, queue the data until an available WINS NG gateway connection comes into range.

The WINS NG information systems provide benefits at each stage of the vehicle life cycle. Many of these benefits derive from WINS NG monitoring capability. However, additional valuable benefits also result from the ability to upgrade remote vehicles, distributed at any location. This WINS NG application permits remote scheduled, verified upgrade and repair of digital system firmware. In addition to eliminating recalls that require firmware upgrade, this ultimately opens a new market for vehicles system upgrade products supplied through a vehicle manufacturer or their designated agents.

Other WINS NG system benefits apply to vehicle manufacturer fleet customers who can track, locate, monitor, secure and control vehicles in rental and other operations while reducing personnel costs. Access to vehicle manufacturer customers through the life cycle results from personalized, web-based information services. These services include vehicle owner automated help-desk businesses that bring value to a customer and provide information via conventional mail or world wide web-based commerce solutions. The WINS NG vehicle internetworking also provides marketing and business information such as sales information and vehicle usage data that may be used in, for example, formulating targeted advertising.

The vehicle internetworking system of an embodiment includes, but is not limited to, embedded WINS NG nodes, WINS NG gateways, WINS server applications, and WINS web assistants. As a complete, lasting solution for vehicle Internet access, embodiments provide connectivity throughout the life cycle of the vehicle. Connectivity begins in manufacturing and proceeds through testing, distribution, sales, field use, maintenance, recall upgrade, and used vehicle sales. Connectivity of an embodiment includes: availability on a national scale; connectivity to vehicles in all environments where the vehicle will be found using common hardware; connectivity in indoor and outdoor environments; scalability such that only a limited number of transactions are used for access to vast numbers of vehicles; local information processing services at the vehicle internetworking component that reduce the communication payload using reconfigurable systems; a single hardware component solution for vehicle and Internet access to eliminate requirements for distribution and deployment of multiple products; operation with a single national network service provider without the requirement of region-by-region negotiation with subscriber service providers; robust operation with atomic transaction methods to enable deployment on vehicles using available diagnostic port power sources; secure operation that provides privacy and authentication; low component cost at both the vehicle node and the Internet access points; capability for rapid, low cost, after-market deployment of the connectivity solution; and, ability to deploy large (e.g., 100 kb-1 Mb) data sets at a high speed and low cost.

Data access to vehicles includes many measurement capabilities. The On-Board Diagnostics standards, OBD-I and OBD-II, provide access to a wide range of parameters. The information that is derived from data processing at the node is of even greater value than the actual OBD data sets. Because all vehicle data may be aggregated, regardless of where it is collected, new capabilities are enabled. For example, the characteristics of entire vehicle populations and histories are available through the full capability of data technology for information recovery.

WINS networking technology products and information systems of an embodiment related to Internet access to vehicle systems include information technology products, Internet services (enterprise, national, and international) that aggregate all vehicle information, and Internet services for management and information recovery from distributed vehicle monitoring. Information technology products include database systems that recover all needed data in a secure fashion from vehicles that appear at any location within reach of a gateway. Information technology products further include database methods that migrate, in an atomic fashion, entire operating system (OS) and other software components to remote, mobile vehicle systems. These database methods ensure that all vehicles in a population acquire and properly produce the authenticated data needed, and receive the new commands, control, entertainment information, and AutoPC software upgrades. The database system manages the predistribution of code and data to gateway and gateway clusters in anticipation of the arrival of a specific vehicle or a vehicle that is a member of a class.

In one embodiment of the WINS NG system, customers are served by vehicle Internetworking access at low duty cycle. Specifically, continuous access is not required, but access occurs when a vehicle arrives near a gateway. Gateways are at locations including refueling stops, intersections, railroad switch yards, maintenance stations, and loading docks. Gateway connectivity is convenient on a global scale.

Data payloads of an embodiment can be large, and can include lengthy and detailed signal histories, large code components, and entertainment code and information, but are not so limited. Occasional downloads can be larger than 1 Mbyte.

Users benefit from a node that is continuously active with both monitoring and recording of vehicle condition. Data downloads to a vehicle, such as software updates, are beneficial. Preferably, a node falls within the proximity of a gateway for a download, but is not required to be immediately adjacent to a gateway.

Internet access to motor vehicle systems using the WINS NG system of an embodiment provides for the transfer and handling of data products, control products, mobile user services, operator information services, fixed base user services, fleet vehicle owner services, fleet operator services, vehicle vendor services, and security services. The data products include: location; vehicle status; vehicle maintenance information; vehicle component asset management; and shipping vehicle asset management interrogator services. The control products include: authorization; reconfiguration; and upgrade. Mobile user services include entertainment. The operation information services include: vehicle information; maintenance information; upgrade; reconfiguration; and software installation for vehicle PC and information systems.

The fixed base user services include: maintenance and vehicle history information; vehicle purchase and usage history; and vehicle maintenance service negotiation services. The fleet owner services include: location; history;

maintenance; and usage. The fleet operator services include: workflow; scheduling; efficiency; and energy use. The vehicle vendor services include: recall prediction; software upgrade; recall cost elimination; regulatory compliance methods; software/firmware sale channels; vehicle usage data; and warranty repair verification. Security services include: active vehicle identification; vehicle identification combined with WINS imaging and sensing; and vehicle identification combined with WINS Web services.

In one embodiment, the WINS NG vehicle internetworking architecture includes a low cost WINS NG node mounted on the vehicle diagnostic port. The WINS NG node provides local intelligence for recording OBD data histories and provides local event and data recognition capability. The WINS NG node self-assembles its network with WINS NG gateways for bi-directional access. The WINS NG node is reconfigurable via the WINS NG network for new capabilities, and the WINS NG node conveys reconfiguration and programming information to the EEC module. The WINS NG node also carries additional sensor capability. The WINS NG node communicates via local wireless equipment to assets on board the vehicle, including the AutoPC. The WINS NG node communicates with handheld displays at service stations and other areas to provide personalized services.

The WINS NG gateway devices are deployed in environments including assembly areas, distribution centers, shipping facilities, dealerships, maintenance centers, gas stations, and other locations. The WINS NG gateways provide services in support of the WINS NG nodes and capability for local storage and forwarding of individual or collective vehicle data for upload or download from the vehicle.

In an alternate embodiment, the networking is supplemented with low-bit rate communication to wider area networks, to preserve connectivity for high priority messages even when gateways are not in range. This can be by means of a secondary radio within the WINS NG node, or by means of another radio accessed through the vehicular communication network.

In one embodiment, servers aggregate vehicle data and provide WINS NG network management. Servers further provide Web and other Internet services to the vehicle manufacturer for a full range of business benefits. For example, vehicles become automatically registered into the database through the self-assembly features of WINS NG systems. Parameters of the data collection process for the processes available at the OBD port can be selected at a web site, and viewed by both the manufacturer and the vehicle owner. Diagnostic and prognostic algorithms are run using this data, and these algorithms may themselves command changes in the type of data being reported based on the probability of a fault being detected.

If a repair is suggested, the diagnostic information is available to each of the vehicle owner, repair shop, and manufacturer, and data taken after the repair is accomplished is used to verify whether the action taken is effective. The record of repairs made to a fleet of vehicles is used by engineers at the manufacturer to assist in designing new versions of the vehicle, or in suggesting pre-emptive maintenance. Records of the effectiveness of repairs over a range of vehicles is used by manufacturers to assess the quality of work being performed at different shops. This may also be used to suggest improved repair procedures for problems that arise in numerous vehicles.

Alternatively, such diagnostics and quality assessment services are performed by a third party that is given access to the database of performance histories. Thus, convenient web access to a database of the maintenance history of individual vehicles and fleets of vehicles is valuable to many parties, ultimately saving money and improving procedures and products. Furthermore, the ability of WINS NG network servers to issue queries that also affect how the data is collected leads to deeper investigations of priority events, without requiring this level of detail across the whole fleet.

Automotive Multimedia Interface Consortium (AMI-C) Bus

The IDB-C is an auto industry standard being developed to run over control area networks (CANs), thus providing approximately 125 kb/s in a wired local area network. While it is being developed for the consumer applications automotive multimedia interface (AMI), the architecture is also suitable for many aspects of the separate Original Equipment Manufacturer (OEM) network for vehicle-critical operations. With the IDB-C, devices connected to the network contain a device that is responsive to the base protocol that serves to schedule all communications in the network. Further, the responsive device automatically shuts off communications from hosts that are malfunctioning or otherwise not conforming to the network protocol. This can be embedded in connectors, for example as embodiments of PicoWINS devices, or in the devices that are to connect to the network. The base network thus carries all control traffic, with the gateway used to resolve disputes over line access. The network also carries data traffic for devices that do not require high-speed connections.

Figure 52:
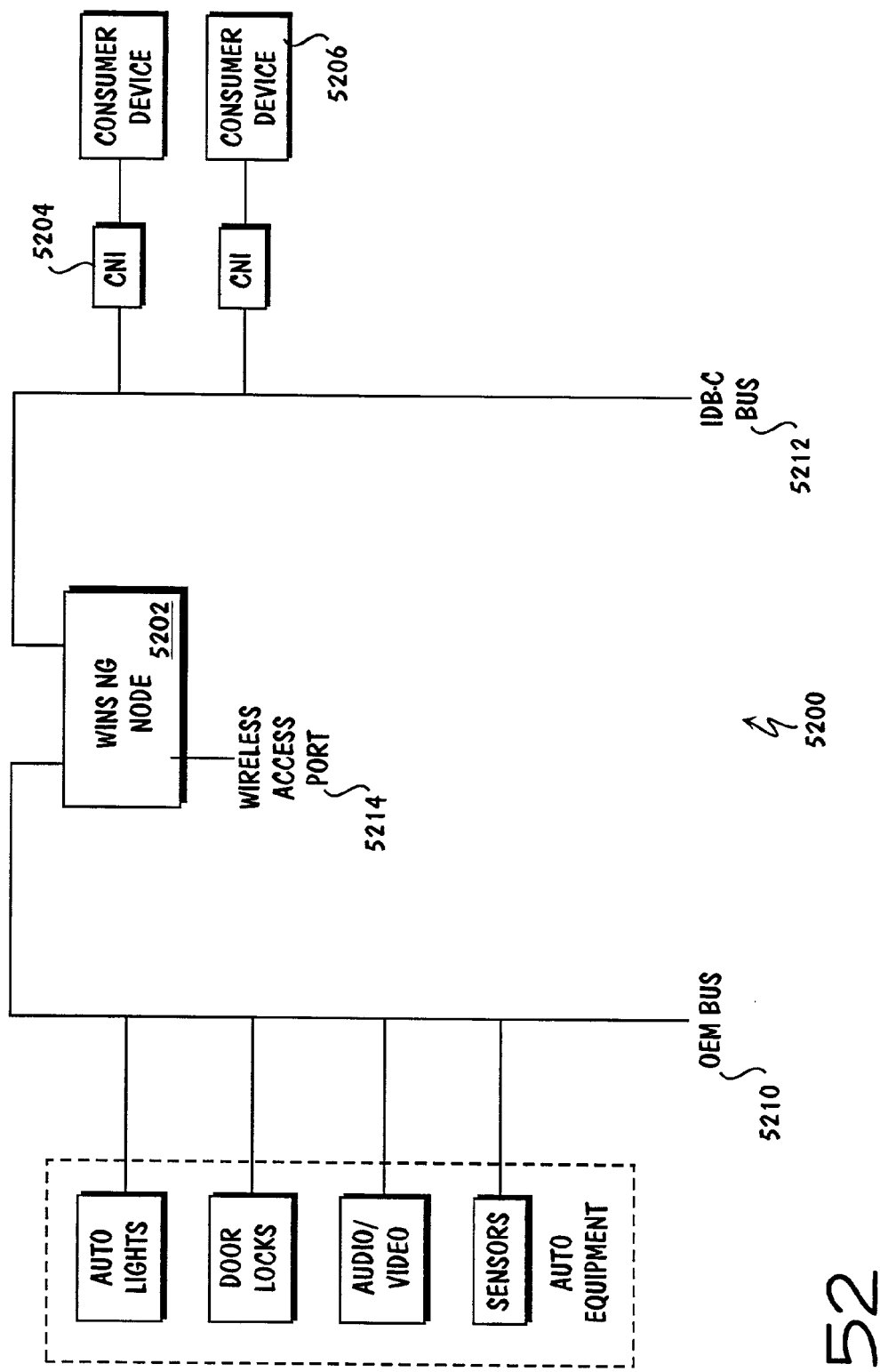
FIG. 52 is a WINS NG network of an automotive embodiment.

FIG. 52 is a WINS NG network 5200 of an automotive embodiment. A WINS NG node 5202 bridges two components of the network, bus 5210 and bus 5212, with intelligent PicoWINS devices used as the Control Network Interface (CNI) devices 5204 that link consumer electronics 5206 to the bus 5212. The CNIs 5204 control access to the bus 5212, and can perform data aggregation or other functions needed to reduce access traffic. They may additionally perform security/authentication functions. Communications to exterior networks for testing can be enabled through an additional wired or wireless port 5214 not connected to either bus 5210 and 5212. This enables rapid download of data in both directions and reprogramming of functions, for example by means of a WINS NG gateway and its connection to the Internet, WINS NG servers, and databases.

A number of embodiments of the WINS NG network enable more efficient usage of the bus. In one embodiment, more signal processing takes place at the source (e.g. for sensors within a PicoWINS or WINS NG device) so that processed rather than raw data is transferred around the network. Also, multiple low speed devices can be coupled on a separate physical wire, with aggregation of their data at an interface device to the IDB-C bus (e.g. a WINS device), thereby lowering the cost of their communications connectors.

In an alternate embodiment, the WINS NG node interfaces to a variety of buses and wireless networks, and there may be a number of WINS NG devices to deal with networks of varying speeds. The WINS NG nodes perform such functions as routing, security, data processing, and management of external communications so that application requirements are met with the lowest cost. New applications may be downloaded using the external networks so that the system may be upgraded over the life of the vehicle. Further, later generation nodes and devices may be added to the network as part of the upgrade, taking advantage of the self-assembly features of WINS NG systems. The layered processing and APIs in WINS NG nodes can present a common interface to other devices that get added to the vehicle, hiding differences in the sensory and control networks among different vehicle makes. Thus, the WINS NG system becomes a universal socket by which devices are added to automotive networks. More broadly, the WINS NG gateways perform a similar function in monitoring and controlling processes in the physical world.

The foregoing description of various embodiments of the invention has been presented for purpose of illustration and description. It is not intended to limit the invention to the precise forms disclosed. Many modifications and equivalent arrangements will be apparent.

What is claimed is:

1. A sensor node comprising:
   at least one processor;
   at least one energy source;
   a multiple-mode radio frequency modem configured to selectively operate in at least a master mode and a slave mode, wherein the modem is configured to operate in the master mode in response to the sensor node having a number of connections to neighbor nodes of the sensor node that exceeds a respective number of connections that each of the neighbor nodes has to its own neighbor nodes by a threshold number of connections, wherein the sensor node is configured to control a frequency hopping pattern for each neighbor node of the sensor node in response to the modem operating in the master mode,
   wherein the modem is configured to operate in the slave mode in response to a neighbor node of the sensor node having a number of neighbor node connections that exceeds the number of connections to neighbor nodes of the sensor node by the threshold number of connections, and wherein the sensor node is configured to acquire and follow a frequency hopping pattern of a neighbor node of the sensor node that operates as a master to the sensor node in response to the modem operating in the master mode; and
   at least one substrate configured to couple the at least one processor, the at least one energy source, and the multiple-mode radio frequency modem,
   wherein the at least one substrate comprises at least one sensor.

2. The sensor node of claim 1, wherein the at least one substrate comprises active and passive substrates.

3. The sensor node of claim 2,
   wherein the at least one substrate comprises at least one thin film substrate,
   wherein the at least one thin film substrate comprises a piezoelectric polymer film, and
   wherein the piezoelectric polymer film is polyvinylidenedifluoride ($PVF_2$).

4. The sensor node of claim 1, wherein the at least one substrate is conformal.

5. The sensor node of claim 1, further comprising at least one communication physical layer including radio frequency (RF) power management.

6. The sensor node of claim 1, wherein the at least one processor is configured to be coupled to at least one component selected from the group consisting of actuators, sensors, signal processors, interfaces, power supplies, data storage devices, and communication devices.

7. The sensor node of claim 1, wherein the at least one sensor comprises at least one sensor selected from the group consisting of passive sensors, active sensors, seismic sensors, acoustic sensors, optical sensors, infrared sensors, magnetic sensors, thermal sensors, accelerometers, and bi-static sensors.

8. The sensor node of claim 1,
   wherein the at least one energy source includes a thin film photovoltaic device, and
   wherein the thin film photovoltaic device comprises an energy source and an optical presence detection sensor.

9. The sensor node of claim 1, wherein the sensor node is configured to be coupled to at least one item selected from the group consisting of machinery components, electronic equipment, mechanical equipment, electro-mechanical equipment, a facility, a structure, a material, a biological system, people, animals, vegetation, clothing, crates, packages, product containers, shipping containers, a transportation system, vehicle components, an outdoor area, and an indoor area.

10. The sensor node of claim 1, wherein the at least one sensor is configured to receive at least one signal type selected from the group consisting of temperature, shock, vibration, motion, acceleration, tip, light, sound, and package opening and closing.

11. The sensor node of claim 1,
    wherein the at least one substrate comprises a thin film tape, and
    wherein the thin film tape includes an adhesive.

12. The sensor node of claim 1, wherein the at least one substrate is configured to operate as an acoustic sensor and source.

13. The sensor node of claim 1, wherein the at least one substrate comprises sensor tape material.

14. The sensor node of claim 1, wherein the at least one energy source is a photovoltaic device incorporated in or mounted on the at least one substrate.

15. The sensor node of claim 1, wherein the at least one substrate is configured to operate as a vibration and acoustic sensor.

16. The sensor node of claim 1,
wherein the at least one substrate is configured to operate as an accelerometer; and
wherein the at least one energy source comprises one or more battery cells that are configured to serve as proof masses for the accelerometer.

17. The sensor node of claim 1, wherein functions of the sensor node are remotely controllable and the sensor node is programmable via wireless internetworking among a plurality of network elements.

18. The sensor node of claim 17,
wherein the plurality of network elements comprises a sensor network including at least one node,
wherein the at least one node is configured to be coupled to a monitored environment and at least one client computer,
wherein the at least one node is configured to be remotely controlled from the at least one client computer,
wherein the at least one node is configured to provide node information including node resource cost and message priority to the plurality of network elements, and
wherein data processing is distributed through the sensor network in response to the node information.

19. The sensor node of claim 17,
wherein the plurality of network elements comprises a sensor network including at least one node and at least one client computer,
wherein the sensor node is configured to be coupled to the at least one client computer through the plurality of network elements,
wherein the at least one node is configured to support at least one communication mode selected from the group consisting of wireless communications, wired communications, and hybrid wired and wireless communications, and
wherein at least one redundant communication pathway is established among the plurality of network elements.

20. The sensor node of claim 17,
wherein the plurality of network elements comprises at least one network,
wherein the at least one network includes a network selected from the group consisting of a wired network, a wireless network, and a hybrid wired and wireless network.

21. The sensor node of claim 17,
wherein the wireless internetworking comprises providing remote accessibility to data, code, management, and security functions,
wherein the data includes signals and images,
wherein the code includes signal processing, decision support, and database elements, and
wherein the management includes operation of the plurality of network elements.

22. The sensor node of claim 17,
wherein the plurality of network elements comprises a layered plurality of network element sets.

23. The sensor node of claim 17,
wherein the plurality of network elements comprises a sensor network including at least one node,
wherein the at least one node plurality of node includes at least one node of a first type and at least one node of a second type,
wherein a first network is configured to be assembled using the at least one node of the first type,
wherein a second network is configured to be assembled using the at least one node of the second type, and
wherein the second network overlays the first network.

24. The sensor node of claim 17,
wherein the plurality of network elements comprises a sensor network,
wherein at least some of the code and data are predistributed through the sensor network using low priority messages, and
wherein the code and the data are downloadable from at least one location selected from the group consisting of storage devices of the plurality of network elements, and storage devices outside the sensor network.

25. The sensor node of claim 1, further comprising:
at least one processing hierarchy configured to control at least one event selected from the group consisting of data classifications, data transfers, data queuing, data combining, processing locations, and communications among the plurality of network elements.

26. The sensor node of claim 1,
wherein data is transferred using message packets,
wherein the message packets are aggregated into compact forms using message aggregation protocols, and
wherein the message aggregation protocols are adaptive to data type, node density, message priority, and available energy.

27. The sensor node of claim 17,
wherein the plurality of network elements comprises a sensor network including at least one node, and
wherein the functions of the at least one node include data acquisition, data processing, communication, data routing, data security, programming, and node operation.

28. The sensor node of claim 17,
wherein the plurality of network elements comprises a sensor network including at least one node,
wherein the at least one node includes an application programming interface (API),
wherein the API is configured to support remote reprogramming and control of at least one device selected from the group consisting of sensors, actuators, communications devices, signal processors, information storage devices, node controllers, and power supply devices.

29. The sensor node of claim 28,
wherein the API is configured to enable distributed resource management by providing network resource information and message priority information to the plurality of network elements, and wherein a synchronism hierarchy established in response to the resource information and message priority information is configured to control information transfer among the plurality of network elements.

30. The sensor node of claim 17,
wherein the plurality of network elements comprises a sensor network including at least one node, and
wherein the at least one node is configured to control data processing and data transmission in response to a probability of a detected event.

31. The sensor node of claim 17,
wherein the plurality of network elements comprises a sensor network including at least one node,
wherein search and acquisition modes of the at least one node are configured to search for participating ones of the plurality of network elements,
wherein a determination is made whether each of the participating ones of the plurality of network elements are permitted to join the sensor network using a message hierarchy, and
wherein the sensor network is configured to be surveyed at random intervals for new nodes and missing nodes.

32. The sensor node of claim 17,
wherein the plurality of network elements comprises a sensor network including at least one node,
wherein the plurality of network elements further includes at least one database, wherein the at least one database includes at least one storage device selected from the group consisting of storage devices coupled to at least one of the plurality of network elements and storage devices of the at least one node, and
wherein the at least one database comprises data-driven alerting methods to recognize data relationships including coincidence in signal arrival, node power status, and network communication status.

33. The sensor node of claim 17,
wherein the plurality of network elements comprises a sensor network including at least one node,
wherein the at least one node is configured to collect data from the sensor node,
wherein at least one operation is performed on the data in response to establish parameters,
wherein the at least one operation is selected from the group consisting of energy detection, routing, processing, storing, and fusing, and
wherein the routing, processing, storing, and fusing are performed in response to at least one result of the energy detection.

34. The sensor node of claim 33,
wherein the routing comprises selecting at least one data type for routing, selecting at least one of the plurality of network elements to which to route the selected at least one data type, selecting at least one route to the selected at least one of the plurality of network elements, and routing the selected at least one data type to the selected at least one of the plurality of network elements.

35. The sensor node of claim 33,
wherein the processing comprises selecting at least one data type for processing, selecting at least one processing type, selecting at least one of the plurality of network elements to perform the selected at least one processing type, and transferring the selected at least one data type to the selected at least one of the plurality of network elements using at least one route, and
wherein the selection of at least one processing type comprises determining at least one probability associated with a detected event and selecting at least one processing type in response to the at least one probability.

36. The sensor node of claim 33,
wherein the storing comprises selecting at least one data type for storage, selecting at least one storage type, selecting at least one of the plurality of network elements to perform the selected at least one storage type, and transferring the selected at least one data type to the selected at least one of the plurality of network elements using at least one route.

37. The sensor node of claim 17,
wherein at least one of the plurality of network elements is configured to determine a position of the sensor node.

38. The sensor node of claim 17,
wherein the sensor node is configured to determine at least one position using location information received from at least one of the plurality of network elements.

39. The sensor node of claim 1, wherein the at least one sensor comprises at least one bi-static sensor.

40. The sensor node of claim 1,
wherein in response to the modem operating in the slave mode, the sensor node is configured to join two clusters of nodes, and
wherein each of the two clusters of nodes comprises a respective neighbor node that operates as a master to the sensor node.

41. The sensor node of claim 1,
wherein the sensor node is configured to be coupled to a package, and
wherein the at least one sensor is configured to sense opening and closing of the package.

42. A sensor node comprising:
a flexible substrate configured to operate as an acoustic sensor and an acoustic source;
a processor incorporated in or mounted on the flexible substrate, wherein the processor is configured to automatically join at least one other node to form a network; and
an antenna, incorporated in or carried on the flexible substrate, configured to be electrically coupled to the processor for wireless communication,
wherein the acoustic sensor is configured to determine a position of the sensor node,
wherein the sensor node is configured to communicate information identifying the determined position of the sensor node to the other node,
wherein the sensor node is configured to synchronize with the at least one other node via radio frequency communications, and
wherein synchronization of the sensor node and the at least one other node allows the sensor node to compensate for wind when determining a range of the sensor node.

43. The sensor node of claim 42, wherein the flexible substrate is configured to operate as a sensor in an accelerometer.

44. The sensor node of claim 42,
further comprising a photovoltaic device incorporated in or mounted on the flexible substrate,
wherein the photovoltaic device is configured to be an energy source for the processor.

45. The sensor node of claim 42, wherein the flexible substrate is configured with an aerodynamic shape.

46. The sensor node of claim 42,
wherein the formed network includes a gateway node configured to link to at least one other network, and
wherein the at least one other network comprises the Internet.

47. The sensor node of claim 42,
wherein the formed network includes a gateway node that is linkable to at least one network,
wherein the at least one other network comprises a client device, and
wherein the sensor node is programmable by the client device.

48. The sensor node of claim 42, wherein the network is configured to detect a second sensor node configured to be attached.

49. The sensor node of claim 42,
wherein the flexible substrate comprises a flexible support material and a layer of polyvinylidenedifloride that is applied to the flexible support material, and
wherein the layer of polyvinylidenedifloride is configured to operate as the acoustic sensor and an acoustic source.

* * * * *

UNITED STATES PATENT AND TRADEMARK OFFICE
CERTIFICATE OF CORRECTION

| | | |
|---|---|---|
| PATENT NO. | : 7,797,367 B1 | Page 1 of 1 |
| APPLICATION NO. | : 09/684387 | |
| DATED | : September 14, 2010 | |
| INVENTOR(S) | : David C. Gelvin et al. | |

It is certified that error appears in the above-identified patent and that said Letters Patent is hereby corrected as shown below:

In the Claims:

Claim 1, column 76, line 13, delete "master" and replace with --slave--.

Claim 23, column 78, line 4, delete "plurality of node".

Claim 33, column 79, line 32, delete "establish" and replace with --established--.

Claim 47, column 80, line 60, delete "one network" and replace with --one other network--.

Signed and Sealed this
Eleventh Day of January, 2011

David J. Kappos
*Director of the United States Patent and Trademark Office*